US008195960B2

(12) United States Patent
Hirai

(10) Patent No.: US 8,195,960 B2
(45) Date of Patent: Jun. 5, 2012

(54) CONTENT DATA MANAGEMENT SYSTEM AND METHOD

(75) Inventor: Tatsuya Hirai, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1041 days.

(21) Appl. No.: 12/156,209

(22) Filed: May 30, 2008

(65) Prior Publication Data
US 2009/0327718 A1 Dec. 31, 2009

(30) Foreign Application Priority Data

May 30, 2007 (JP) ................................. 2007-143396

(51) Int. Cl.
*G06F 12/14* (2006.01)
(52) U.S. Cl. ........................................................ 713/193
(58) Field of Classification Search .............. 726/26–30;
380/200–202; 713/193; 711/100, 145, 152
See application file for complete search history.

(56) References Cited

U.S. PATENT DOCUMENTS

| 6,898,708 | B2 | 5/2005 | Hori et al. | |
|---|---|---|---|---|
| 6,999,948 | B1 | 2/2006 | Hatanaka et al. | |
| 7,181,008 | B1 | 2/2007 | Kamibayashi et al. | |
| 2002/0169960 | A1 | 11/2002 | Iguchi et al. | |
| 2004/0054678 | A1 | 3/2004 | Okamoto et al. | |
| 2004/0177215 | A1 | 9/2004 | Nagamasa et al. | |
| 2004/0250092 | A1 | 12/2004 | Hori et al. | |
| 2005/0005131 | A1* | 1/2005 | Yoshida et al. ............. | 713/183 |
| 2005/0005149 | A1 | 1/2005 | Hirota et al. | |
| 2007/0043667 | A1* | 2/2007 | Qawami et al. ................. | 705/50 |
| 2007/0043769 | A1* | 2/2007 | Kasahara et al. .......... | 707/104.1 |

FOREIGN PATENT DOCUMENTS

| JP | 2000-347851 A | 12/2000 |
|---|---|---|
| JP | 2001-014441 | 1/2001 |
| JP | 2002-229861 | 8/2002 |
| JP | 2004-521414 | 7/2004 |
| JP | 2006-041737 | 2/2006 |

(Continued)

OTHER PUBLICATIONS

Extended European Search Report for EP Application No. 08005858.9-2212, dated Jul. 31, 2008, 7 pages total.

*Primary Examiner* — Nirav B. Patel

(57) ABSTRACT

Embodiments of the present invention allow encrypted data to restrict unlimited output of content data recorded in an area where reading can be performed by standard commands. According to one embodiment, a data storage area of a storage device is provided with an accessible area which can be accessed from the outside of an interface by specifying an address, and a hidden access area which can be accessed from the outside only in a specified case where an authentication condition is satisfied. In the hidden area, a table is recorded in which one entry includes an entry number and a field of a content identifier. An expansion area is provided in each sector of the accessible area, and data output control information and an entry number are recorded. The data output control information indicates information of one of (1) output is allowed only when there is information capable of decrypting the data, and (2) output is allowed without limitation. In the case where data recorded in the accessible area is read by a standard read command, output of content data recorded in the storage device is controlled based on the data output control information recorded in the expansion area.

14 Claims, 31 Drawing Sheets

FOREIGN PATENT DOCUMENTS

| | | |
|---|---|---|
| JP | 2006-059331 A | 3/2006 |
| JP | 2007-096817 | 4/2007 |
| WO | WO02/099742 | 12/2002 |
| WO | WO 2006/008924 | 1/2006 |
| WO | WO-2006/095335 | 9/2006 |
| WO | WO 2006/095335 | 9/2006 |

* cited by examiner

Fig.3

| SYMBOL | NAME | KEY ATTRIBUTE | FEATURE |
|---|---|---|---|
| A\|\|B | DATA CONNECTION | - | CONNECTION OF DATA A AND DATA B |
| E(X,Y) | ENCRYPTION | - | OPERATION OF ENCRYPTING DATA Y WITH DATA X. IN THE CASE WHERE X IS PUBLIC KEY, IT IS PUBLIC KEY ENCRYPTION, AND IN THE CASE OF SYMMETRIC KEY, IT IS SYMMETRIC KEY ENCRYPTION |
| D(X,Y) | DECRYPTION | - | OPERATION OF DECRYPTING DATA Y WITH DATA X. IN THE CASE WHERE X IS PRIVATE KEY, DATA ENCRYPTED WITH PUBLIC KEY IS DECRYPTED WITH PRIVATE KEY, AND IN THE CASE OF SYMMETRIC KEY, DATA ENCRYPTED WITH SYMMETRIC KEY IS DECRYPTED WITH SYMMETRIC KEY |
| H(X) | HASH VALUE CALCULATION | - | CALCULATION OF OBTAINING HASH VALUE OF DATA X |
| DCC | DEVICE CLASS CERTIFICATE | - | CERTIFICATE INDICATING VALIDITY OF $KP_{dc}$. ELECTRONIC SIGNATURE ENCRYPTED BY $K_{CA}$ IS INCLUDED |
| RDCL | DEVICE CLASS CERTIFICATE REVOKED LIST | - | LIST OF DEVICE CLASS CERTIFICATE RECORDED IN PROTECTED INFORMATION STORAGE AND USAGE PASS TRANSFER MODULE AND REVOKED BY CERTIFICATE AUTHORITY |
| RDCL.D | DEVICE CLASS CERTIFICATE REVOKED LIST ISSUE DATE | - | INFORMATION DESCRIBED IN DEVICE CLASS CERTIFICATE REVOKED LIST. INFORMATION OF DATE WHEN DEVICE CLASS CERTIFICATE REVOKED LIST IS ISSUED. |
| $KP_{CA}$ | CERTIFICATE AUTHORITY PUBLIC KEY | PUBLIC KEY | PUBLIC KEY EMBEDDED IN PROTECTED INFORMATION STORAGE AND ISSUED BY CERTIFICATE AUTHORITY. USED FOR DECRYPTION OF ELECTRONIC SIGNATURE UNIT OF DEVICE CLASS CERTIFICATE |
| $K_{CA}$ | CERTIFICATE AUTHORITY PRIVATE KEY | PRIVATE KEY | PRIVATE KEY MANAGED BY CERTIFICATE AUTHORITY. USED FOR ENCRYPTION OF ELECTRONIC SIGNATURE UNIT OF DEVICE CLASS CERTIFICATE |
| $KP_{dc}$ | DEVICE CLASS PUBLIC KEY | PUBLIC KEY | PUBLIC KEY EMBEDDED IN PROTECTED INFORMATION STORAGE. VALIDITY OF EQUIPMENT IN WHICH THE KEY IS EMBEDDED IS INDICATED BY DEVICE CLASS CERTIFICATE INCLUDING THE KEY. ONE KEY CAN BE EMBEDDED IN PLURAL DEVICES |
| $K_{dc}$ | DEVICE CLASS PRIVATE KEY | PRIVATE KEY | PRIVATE KEY EMBEDDED IN PROTECTED INFORMATION STORAGE. USED FOR DECRYPTING DATA ENCRYPTED BY USING $KP_{dc}$ |
| $KP_d$ | DEVICE PUBLIC KEY | PUBLIC KEY | PUBLIC KEY EMBEDDED IN PROTECTED INFORMATION STORAGE. UNIQUE KEY IS EMBEDDED FOR ALL DEVICES. |
| $K_d$ | DEVICE PRIVATE KEY | PRIVATE KEY | PRIVATE KEY EMBEDDED IN PROTECTED INFORMATION STORAGE. USED FOR DECRYPTING DATA ENCRYPTED BY $KP_d$ |
| $*KP_x$ | SHARED DEVICE PUBLIC KEY | SYMMETRIC KEY | x DENOTES dc OR d. SYMMETRIC KEY CREATED IN PROCESS OF ENCRYPTION USING PUBLIC KEY |
| $*K_x$ | SHARED DEVICE PRIVATE KEY | SYMMETRIC KEY | x DENOTES dc OR d. COMMON KEY CREATED IN PROCESS OF DECRYPTION USING SECRET KEY. VALUE IS IDENTICAL TO $*KP_x$. |
| $K_{ch}$ | CHALLENGE KEY | SYMMETRIC KEY | TEMPORAL SYMMETRICAL ENCRYPTION KEY DYNAMICALLY CREATED IN USAGE PASS TRANSFER MODULE. USED FOR ENCRYPTION OF TEMPORAL SYMMETRICAL KEY (SESSION KEY) TO ENCRYPT USAGE PASS. |
| $K_s$ | SESSION KEY | SYMMETRIC KEY | TEMPORAL SYMMETRICAL ENCRYPTION KEY DYNAMICALLY CREATED IN USAGE PASS TRANSFER MODULE. USED FOR ENCRYPTION OF THE DATA AT TIME OF TRANSFER OF USAGE PASS. 0TH-ORDER SESSION KEY IS SHARED BETWEEN PRIMAL DEVICE AND INCEPTIVE DEVICE IN CONNECTION PROCEDURE. |
| $K_c$ | CONTENT KEY | SYMMETRIC KEY | USED FOR ENCRYPTION AND DECRYPTION OF CONTENT |
| [P] | PRIMAL DEVICE CREATION (SUBSCRIPT) | - | IT MEANS DATA CREATED IN PRIMAL DEVICE. PRIMAL DEVICE MEANS DEVICE WHICH STARTS CONNECTION ESTABLISH PROCESS BY VERIFYING DEVICE CLASS CERTIFICATE SENT FROM OTHER DEVICE. |
| [I] | INCEPTIVE DEVICE CREATION (SUBSCRIPT) | - | IT MEANS DATA CREATED IN INCEPTIVE DEVICE. INCEPTIVE DEVICE IS DEVICE TO START CONNECTION ESTABLISH PROCESS BY SENDING ITS OWN DEVICE CLASS CERTIFICATE TO OTHER DEVICE. |

Qualified Access Mode recognition sequence

UT mode: Connection stage

UT mode: Transfer stage

UT mode: Reconnection stage

UT mode: Recovery stage

BT mode: Connection stage

BT mode: Transfer stage

BT mode: Transfer stage

BT mode: Reconnection stage

CONTENT DATA MANAGEMENT SYSTEM AND METHOD

CROSS-REFERENCE TO RELATED APPLICATION

The instant nonprovisional patent application claims priority to Japanese Patent Application No. 2007-143396 filed May 30, 2007 and which is incorporated by reference in its entirety herein for all purposes

BACKGROUND OF THE INVENTION

Where copyright exists on content data such as music data or image data, unless suitable measures for copyright protection are taken, there is a fear that the right of the author is infringed. On the other hand, when first priority is given to the copyright protection and the circulation of the content data is impeded, this becomes contrarily disadvantageous also to the copyright holder who can collect the copyright fee when the copyrighted work is copied.

The distribution of content data as an object of copyright protection is performed mainly through a digital communication network, broadcasting waves or the like. When a user uses such data, the data is usually recorded once on some storage medium and then is played back by a playback device. At present, as a storage device which has large capacity, has high access performance, and has a control function, a magnetic disk device is known. Almost all the magnetic disk devices are fixedly incorporated in recorder/players, and there is no such a magnetic disk device that data recorded thereon can be used by another playback device. However, from the viewpoint of convenience, there is a possibility that the use of a portable storage device grows in future. On the other hand, although the capacity is small as compared with the magnetic disk device, a memory card is known as a portable storage device with a copyright protection function.

As a device to reproduce data, a recorder/player used to receive the delivery of such data, or a portable dedicated playback device is used. In a recorder/player to which a portable storage device can be connected, in order to protect the copyright of data recorded on the storage device, it is important to take security measures for the recorder/player and the storage device, so that the data recorded on the storage device can not be reproduced beyond the scope of conditions insisted by the copyright holder. When the security measures are taken for the equipment, with respect to data exchange performed in an area which can be freely accessed from the inside and outside of the device, it is necessary that an authentication process is performed between the devices in which the data exchange is performed, or an encryption process is performed on the data itself, so that an access to the data is not freely performed in clear text. On the other hand, as the authentication process or the encryption process as stated above becomes strict, many processes are required from the time when the user issues a data use request to the time when the data can be actually used, and resultantly, there is a possibility that a situation occurs in which the reproduction of the data can not be smoothly performed.

For example, Patent Publication No. WO01/013358 and Patent Publication No. WO01/043339 propose that digital data to be used is encrypted, and a key for decrypting it and a use condition at the decryption can not be illegally acquired or falsified, so that the copyright is protected. Japanese Patent Publication No. 2004-302701 discloses a technique relating to a storage device which divides plural encryption input/output processes sent from a host device into plural procedures and processes them in parallel in order to improve tamper resistant features when the data to be concealed is encrypted and is inputted/outputted between the storage device and the host device.

Each of the above patent documents discloses the process in which digital data is encrypted, and the key for decrypting it and the use condition are transferred between the two equipments. However, there is a demand that even if the content is encrypted, the transfer or copy from an equipment in which it is recorded to another equipment without limitation should not be performed.

BRIEF SUMMARY OF THE INVENTION

Embodiments of the present invention allow encrypted data to restrict unlimited output of content data recorded in an area where reading can be performed by standard commands. According to one embodiment, a data storage area of a storage device is provided with an accessible area which can be accessed from the outside of an interface by specifying an address, and a hidden access area which can be accessed from the outside only in a specified case where an authentication condition is satisfied. In the hidden area, a table is recorded in which one entry includes an entry number and a field of a content identifier. An expansion area is provided in each sector of the accessible area, and data output control information and an entry number are recorded. The data output control information indicates information of one of (1) output is allowed only when there is information capable of decrypting the data, and (2) output is allowed without limitation. In the case where data recorded in the accessible area is read by a standard read command, output of content data recorded in the storage device is controlled based on the data output control information recorded in the expansion area.

BRIEF DESCRIPTION OF THE DRAWINGS

FIG. 3—A table showing data, information, notation and the like used in an embodiment.

DETAILED DESCRIPTION OF THE INVENTION

Figure 1:
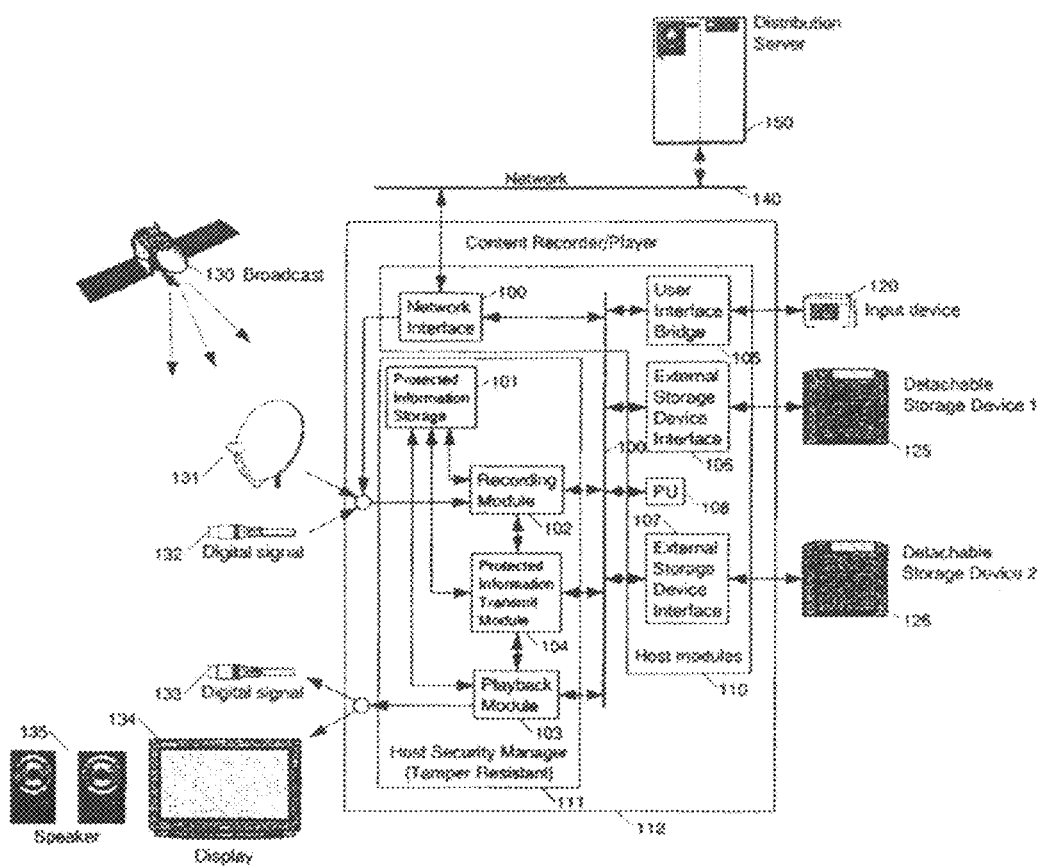
FIG. 1—A schematic structural view showing a data protection system including a recorder/player of an embodiment.

Embodiments of the present invention relate to a content data management system and method, and more particularly to a method in which in a case where encrypted content data is transferred from one device to the other device, information for determining the propriety thereof is recorded and held in a storage device, and a protocol for transferring content data and control information from a transfer source device to a transfer destination device.

An object of embodiments of the invention is to enable control information including a key for decrypting content data and a use condition of the data to be safely transferred between valid devices, and to allow encrypted data to restrict unlimited output of the content data recorded in an area in which reading can be performed by a standard command.

A content data management system of the invention is preferably a content data management system for transferring encrypted content data stored in a storage area of a storage device, the storage area includes an accessible area which can be accessed from outside by address specification, and in which control information to control output of the content data and entry identification information are stored, and a hidden area which can be accessed from outside only in a case where an authentication condition is satisfied, and which includes an entry including entry identification information and a field of a content identifier to identify content, and the control information includes information to control a first mode in which in a case where there is information capable of decrypting content data to an external device, output thereof to the external device is allowed in accordance with a predetermined protocol, and a second mode in which the output is allowed without limitation.

More preferably, according to embodiments of the invention, the content data management system is constructed such that an authentication process of validity is mutually performed between a storage device (second device) and a use device (first device) to use content data outputted from the storage device, key data (symmetric key data) is shared between the first and the second device in a valid case as a result of the authentication process, a processing unit uses the symmetric key data to verify data to be transferred between the first and the second device, and confirms whether there is an entry relating to the content identifier recorded in the hidden area, the second device receives a read command, confirms whether the control information recorded in the accessible area is the first mode or the second mode, aborts the process in a case where the read command is a normal command, calculates a Hash value from the symmetric key data in a case where the read command is a specific command, concatenates the Hash value with the control information, the content identifier, and the content data to be read, and outputs them, the first device receives a write command, confirms the entry including the content identifier in a case where verification of the Hash value included in the received data is successful, correlates the entry identification information with the content identifier and records them in a sector for recording the content data.

Besides, the content data management system may be constructed such that in a valid case as a result of the authentication process, two session keys are shared between the first and the second device, Hash data is created from masked Usage Pass (Masked Usage Pass) including at least the session keys, the entry identification information and the content identifier, and the shared session keys, the Hash data is concatenated with the Masked Usage Pass, and is sent to the first or the second device as a transfer source, the first or the second device as the transfer source verifies the received data, and uses the content identifier included in the Masked Usage Pass to confirm a relation between the entry identification information and the content identifier.

Embodiments of the invention are grasped also as a content data management method for performing the above process operation According to embodiments of the invention, the control information including the key for decrypting plural data and the use condition of the data can be safely transferred between valid devices, and the encrypted data can restrict the unlimited output of the content data recorded in an area in which reading can be performed by a standard command.

The invention is carried out in the particular embodiments described below.

Embodiments of the invention are based on the assumptions that data requiring protection is encrypted, key data necessary for decrypting the data and a condition under which decryption is allowed are integrated into one, and the data is recorded in an area which can not be freely accessed by a user among storage areas in a storage device. What is obtained by integrating the key data and the condition under which the decryption is allowed will be called Usage Pass in following examples.

In embodiments of the invention, there is disclosed a method for determining, in a case where data recorded in a storage device and requiring appropriate Usage Pass for decryption is copied into another storage device, the propriety thereof, and a method for recording information for determining that. Before the details of embodiments of the invention are described, a method for transferring the Usage Pass between storage devices will be described.

There are two types of methods of transferring the Usage Pass from one storage device to the other storage device. One of them is a UT (Unidirectional Transfer mode) mode in which the transfer direction of the Usage Pass is uniquely determined, and the other is a BT (Bidirectional Transfer mode) mode in which the Usage Pass can be transferred bidirectionally. A description will be given to, as a preferable example, a case where this characteristic transfer method of the Usage Pass is applied to the transfer between two equipments, for example, a recorder/player and a storage device.

In order to perform the Usage Pass transfer between the recorder/player and the storage device, first, a processing unit (called Host Modules in the following example) of the recorder/player selects that the Usage Pass transfer is executed in which of the two modes, and performs a process to notify the selected mode to a module of performing Usage Pass sending or receiving process in each of the devices. In the following, a description will be first given to a case where the UT mode is set in the module of performing the Usage Pass sending or receiving process.

When the UT mode is set, the module which finally receives the Usage Pass sends a Device Class certificate embedded in itself to the module which sends the Usage Pass. The Device Class certificate includes a Device Class Public Key. Incidentally, in the UT mode, an equipment including a module of sending the Usage Pass will be hereinafter called a Primal Device, and an equipment including a module of receiving it will be hereinafter called an Inceptive Device. In that meaning, the Device Class certificate will be hereinafter called an Inceptive Device class Certificate, and the Device Class Public Key will be hereinafter called an Inceptive Device class public key.

In the Primal Device, the validity of the received Certificate is verified, and when the validity of the received Certificate is confirmed as a result of the verification, a Primal Challenge key as a key for temporal symmetric key encryption is created. Next, the Primal Challenge key is encrypted by using the received Device Class Public Key, the Primal Device Class Certificate including the Primal Device class public key is concatenated with the created encryption key, and they are sent to the Inceptive Device.

The Inceptive Device uses its own Device Class Private Key to decrypt the received data, and acquires the Primal Challenge key. Next, the Inceptive Device creates a 0th-order Inceptive Session Key as a key for temporal symmetric key encryption. When the creation of the key is completed, it is concatenated with the Inceptive Device public key embedded in itself and is encrypted with the received Primal Device class key. Further, the obtained data is concatenated with a revoked Device Class list (Inceptive RDCL) recorded in itself, and is encrypted with the received Primal Challenge key. When the above process is completed, the obtained data is sent to the Primal Device.

The Primal Device decrypts the received data by the Primal Challenge key, and extracts the inceptive RDCL from the result. Since the RDCL includes issue date information of the data, the issue date information of the inceptive RDCL and the issue date information of the RDCL (Primal RDCL) recorded in itself are compared with each other. As a result, when the issue date of the inceptive RDCL is newer, the primal RDCL is overwritten by the inceptive RDCL. When the comparison of the issue date of the RDCL is completed, the remaining data is decrypted with the Primal Device Private Key. Next, a 0th-order Primal Session Key as a key for temporal symmetric key encryption is created. When the creation of this key is ended, it is encrypted with the previously received 0th-order Inceptive Session Key. Here, in the result of comparison of the issue date information of the RDCL previously performed, in the case where it is found that the issue date of the Primal RDCL is newer, the previously encrypted data is concatenated with the primal RDCL. The obtained data is encrypted with the previously received Inceptive Device public key. When the encryption is ended, the data is sent to the Inceptive Device.

The Inceptive Device decrypts the received data by the Inceptive Device Private Key. In the case where the primal RDCL is included in this decryption result, the inceptive RDCL is overwritten by the primal RDCL. Next, the remaining data is decrypted with the 0th-order Inceptive Session Key, and the 0th-order Primal Session Key is obtained.

The above is the authentication process in the UT mode. This will be hereinafter called a UT Connection Stage. When the UT Connection Stage is completed, the 0th-order Primal Session Key, the 0th-order Inceptive Session Key, and the Shared Inceptive Device Key obtained in the process of the decryption by the Inceptive Device public key and the decryption by the Private Key are shared.

When the authentication process is ended, the Usage Pass transfer can be executed. The Usage Pass transfer in the UT mode is performed as follows. Incidentally, the Usage Pass transfer in the UT mode is performed only from the Primal Device to the Inceptive Device.

First, the Primal Device prepares an objective Usage Pass in the Usage Pass transfer module. Next, the Host Module sends an identifier (UPID) for identifying the objective Usage Pass to the Inceptive Device.

The Inceptive Device creates an nth-order Inceptive Session Key for encrypting the Usage Pass, and records it, together with the UPID, into a log called an Inceptive Transaction Log. A transfer process stage (RP) is also recorded in the log. The log is used for recovering the Usage Pass into the original state in the case where the Usage Pass transfer process is not normally completed. When the creation of the nth-order Inceptive Session Key is ended, it is encrypted with the Inceptive Session Key (n−1th order Inceptive Session Key) created at the time of the immediately preceding Usage Pass transfer and the 0th-order Primal Session Key, and is sent to the Primal Device.

The Primal Device decrypts the received data by the 0th-order Primal Session Key and the n−1th order Inceptive Session Key. Then, the UPID of the transfer object Usage Pass, partial parameters included in the Inceptive Device Class Certificate, the Inceptive Device public key received in the Connection Stage, the nth-order Inceptive Session Key obtained from the decryption result, the transfer process stage (SP), the decryption enabling condition of the data included in the transfer object Usage Pass, and the address where the Usage Pass is recorded are recorded in the Primal Transaction Log.

Next, after the actually sent Usage Pass is created from the Usage Pass prepared in the Usage Pass sending module, the Usage Pass is concatenated with a parameter indicating the use object (one of copy, movement, and playback) and Checksum, and is encrypted with the nth-order Inceptive Session Key and the Shared Inceptive Device Key. When the encryption is ended, transfer process stage elements in the Primal Transaction Log are updated to SC, and the data is sent to the Inceptive Device.

The Inceptive Device decrypts the received data by the Shared inceptive Device key and the 0th-order Inceptive Session Key. The transfer process stage elements in the Inceptive Transaction Log are updated to RC, the record destination address of the Usage Pass is recorded in the Inceptive Transaction Log, and the data is recorded in the Usage Pass storage area.

The above is the Usage Pass transfer process in the UT mode. This will be hereinafter called a UT Transfer Stage. As described above, in the UT mode, the transfer direction of the Usage Pass is fixed to the direction from the Primal Device to the Inceptive Device.

During the execution of the transfer process of the Usage Pass, in the case where an abnormality such as power shutdown occurs in the recorder/player and the Usage Pass is lost from both the Usage Pass transfer source and the Usage Pass transfer destination, the Usage Pass can be recovered by performing the following process.

At the time of the abnormality, since the 0th-order Primal Session Key, the 0th-order Inceptive Session Key, and the Shared Device Key shared in the UT Connection Stage are lost from the recorder/player and the storage device, these keys must be newly shared. However, it is unnecessary to execute the UT Connection Stage, but a process described below has only to be executed.

First, the Host sends the UPID of the Usage Pass of the recovery object to the Primal Device. The Primal Device uses the UPID to search for the Primal Transaction Log. As a result, when the Primal Transaction Log including the UPID is found, a new 0th-order Primal Session Key is created. The created Session Key is encrypted with the Session Key and the Inceptive Device Public Key recorded in the found Primal Transaction Log, and is sent to the Inceptive Device. The Inceptive Device decrypts the received data, and obtains a new 0th-order Primal Session Key and a Shared Device key.

The above is a re-authentication process in the UT mode. This will be hereinafter called a UT Reconnection Stage. When the UT Reconnection Stage is completed, the new 0th-order Primal Session Key, and the new symmetric Inceptive Device key obtained in the process of encryption by the Inceptive Device Public Key and decryption by the Private Key are shared.

When the UT Reconnection Stage is ended, in the Primal Device, the recovery process of the Usage Pass is performed as described below.

The Host Module sends the UPID of the Usage Pass of the recovery object to the Inceptive Device. The Inceptive Device uses the UPID to search for the Inceptive Transaction Log. As a result, when the Inceptive Transaction Log including the UPID is found, the process stage information recorded in the Transaction Log and the existence state information of the Usage Pass are concatenated with each other, and are sent to the Primal Device. The data sent at this time is also concatenated with a Hash value calculated from the data, the 0th-order Primal Session Key, and the Inceptive Session Key recorded in the Inceptive Transaction Log.

The Primal Device verifies the received Hash value, and confirms that no falsification is made on the received data. When this verification is ended, a searched is made for the Primal Transaction Log including the received UPID. When the Log is found, the decryption enabling condition before the transfer recorded in the Log is overwritten on the presently existing Usage Pass.

The above is the recovery process of the Usage Pass in the UT mode. This will be hereinafter called a UT recovery stage. When this stage is completed, the Usage Pass before sending comes to exist in the Primal Device.

Next, a description will be given to a case where the BT mode is set in the module of performing the Usage Pass sending or receiving process.

In the BT mode, the direction in which the Usage Pass is transferred is not fixed, and both the Primal Device and the Inceptive Device can perform sending and receiving of the Usage Pass. In the BT mode, a module of executing a mutual authentication process and a sending and receiving process of Usage Pass in a recorder/player will be hereinafter called a Primal Device, and a module of executing a mutual authentication process and a sending and receiving process of Usage Pass in a storage device will be hereinafter called an Inceptive Device. A Device Class Certificate will be hereinafter called an Inceptive Device Class Certificate, and a Device Class Public Key will be hereinafter called an Inceptive Device Class Public Key.

The Primal Device verifies the validity of the received Certificate, and when the validity of the received Certificate is confirmed as a result of the verification, a Primal Challenge key as a key for temporal symmetric key encryption is created. Next, the Primal Challenge key is encrypted by using the received Device Class Public Key, the created encrypted data is concatenated with the Primal Device Class Certificate including the Primal Device Class Public Key, and is sent to the Inceptive Device.

The Inceptive Device decrypts the received data by using its own Device Class Private Key, and acquires a Primal Challenge key.

Next, the Inceptive Device creates an Inceptive Session Key as a key for temporal symmetric key encryption. When the creation of this key is ended, it is concatenated with the Inceptive Device Public Key embedded in itself, and is encrypted with the received Primal Device Class Public Key. Further, the obtained data (that is, the data encrypted with the Primal Device Class Public Key) is concatenated with a revoked Device Class list (Inceptive RDCL) recorded in itself, and is encrypted with the received Primal Challenge Key. When the above process is ended, the obtained data is sent to the Primal Device.

The Primal Device decrypts the received data (that is, the encrypted data) by the Primal Challenge Key, and extracts the inceptive RDCL from the result. Since the RDCL includes issue date information of the data, the issue date information of the inceptive RDCL and the issue date information of the RDCL (primal RDCL) recorded in itself are compared with each other. As a result, when the issue date of the inceptive RDCL is newer, the primal RFCL is overwritten by the inceptive RDCL. When the issue date comparison of the RDCL is ended, the remaining data is decrypted with the Primal Device Private Key. Next, a 0th-order Primal session key as a key for temporal symmetric key encryption is created. When the creation of the key is ended, it is encrypted with the previously received Inceptive Device public key. Here, in the comparison result of the issue date information of the RDCL previously performed, in the case where it is found that the issue date of the primal RDCL is newer, the previously encrypted data is concatenated with the primal RDCL. The obtained data is encrypted with the previously received Inceptive Challenge key. When the encryption is ended, the data is sent to the Inceptive Device.

The Inceptive Device decrypts the received data by the Inceptive Challenge key. In the case where the primal RDCL is included in this decryption result, the Inceptive RDCL is overwritten by the primal RDCL. Next, the remaining data is decrypted with the Primal Device public key, and the 0th-order Primal Session Key is obtained.

The Primal Device decrypts the received data by the Primal Device Private Key and the 0th-order Primal Session Key, and obtains the 0th-order Inceptive session key. Next, the Inceptive Device Public Key, the 0th-order Inceptive Session Key, the 0th-order Primal Session Key, and partial parameters included in the Inceptive Device Class Certificate are recorded in the Primal Connection Log.

The above is the authentication process in the BT mode. This will be hereinafter called a BT Connection Stage. When the BT Connection Stage is completed, the 0th-order Primal session key, the 0th-order Inceptive session key, the Shared Primal Device Key obtained in the process of encryption with the Primal Device Public Key and decryption with the Private Key and the Shared Inceptive Device Key obtained in the process of encryption with the Inceptive Device Public Key and decryption with the Private Key are shared.

When the authentication process is ended, the Usage Pass transfer can be executed. First, a description will be given to the Usage Pass transfer from the Primal Device to the Inceptive Device.

First, in the Primal Device, the objective Usage Pass is prepared in the Usage Pass transfer module.

Next, the Inceptive Device creates an nth-order Inceptive Session Key for encrypting the Usage Pass. When the creation of this key is ended, it is encrypted with an Inceptive Session Key (n−1th order Inceptive Session Key) created at the time of the immediately preceding Usage Pass transfer from the Primal Device to the Inceptive Device, and the newest Primal Session Key at the time point, and is sent to the Primal Device. The Primal Device decrypts the received data by the newest Primal session key at the time point and the n−1th order Inceptive Session Key. The UPID of the transfer object Usage Pass, its own role (transfer source) in the transfer, and the Usage Pass scheduled to be sent are recorded in the Transaction Log. Incidentally, in the BT mode, the recording of the Transaction Log is performed by only the Primal Device.

Next, Usage Pass to be actually sent is created from the Usage Pass prepared in the Usage Pass sending module. Then, after the record destination address of the Usage Pass in the Inceptive Device is recorded in the Transaction Log, the Usage Pass is concatenated with a parameter indicating the use object (one of copy, movement, and playback) and Checksum, and is encrypted with the nth-order Inceptive Session Key and the Shared Inceptive Device key. When the encryption is ended, the data is sent to the Inceptive Device.

The Inceptive Device decrypts the received data by the Shared Inceptive Device Key and the nth-order Inceptive Session Key. Then, the data is recorded in the Usage Pass storage area in the Inceptive Device.

The above is the Usage Pass transfer process from the Primal Device to the Inceptive Device in the BT mode. This will be hereinafter called a BT PI Transfer Stage.

First, a description will be given to Usage Pass transfer from the Primal Device to the Inceptive Device. First, in the Inceptive Device, objective Usage Pass is prepared in the Usage Pass transfer module.

Next, with respect to the Usage Pass, the Inceptive Device replaces a data encryption key portion by 0, and concatenates it with the state information of the Usage Pass (the data will be called a Masked Usage Pass), and then, the data is concatenated with the newest Primal Session Key and the Inceptive Session Key, and a Hash value is calculated. The obtained Hash value is concatenated with the Masked Usage Pass, and is sent to the Primal Device.

The Primal Device verifies the received Hash value, and confirms that no falsification is made on the received data. When this verification is ended, the UPID of the received Usage Pass, the decryption enabling condition of the data, and the address where the Usage Pass is recorded in the Inceptive Device are recorded in the Transaction Log. Next, an mth-order Primal Session Key is created, is encrypted with a Primal Session Key (m−1th order Primal Session Key) created in the immediately preceding Usage Pass transfer from the Inceptive Device to the Primal Device, and the newest Inceptive Session Key at the time point, and is sent to the Inceptive Device.

The Inceptive Device decrypts the received data by the newest Inceptive Session Key at the time point and the m−1th order Primal Session Key. Next, Usage Pass to be actually sent is created from the Usage Pass prepared in the Usage Pass sending module. Then, the Usage Pass is concatenated with a parameter indicating the use object (one of copy, movement, and playback) and Checksum, and is encrypted with the mth-order Inceptive Session Key and the SharedShared Primal Device Key. When the encryption is ended, the data is sent to the Primal Device.

The Primal Device decrypts the received data by the Shared Primal Device Key and the mth-order Primal Session Key.

The above is the Usage Pass transfer process from the inceptive Device to the Primal Device in the BT mode. This will be hereinafter called a BT IP Transfer Stage.

Similarly to the UT mode, in the case where an abnormality occurs in the recorder/player and the Usage Pass is lost from both the Usage Pass transfer source and the Usage Pass transfer destination, the Usage Pass can be recovered by performing the following process. A re-authentication process in the BT mode is slightly different from that in the UT mode, and it is not necessary that the BT PI Transfer Stage or the BT IP Transfer Stage was executed in the past, but it is sufficient if only the BT Connection Stage is completed.

At the time of the abnormality, since the 0th-order Primal Session Key, the 0th-order Inceptive Session Key, the Shared Primal Device Key, and the Shared Inceptive Device Key shared in the BT Connection Stage are lost from the recorder/player and the storage device, these keys must be newly shared. However, the BT Connection Stage is not required to be executed, but a process described below has only to be executed.

First, in the Primal Device, a new 0th-order Primal Session Key is created, and the created key is encrypted with the Inceptive Session Key recorded in the Primal Connection Log and the Inceptive Device Public Key. The obtained data is sent to the Inceptive Device.

The Inceptive Device decrypts the received data by the Inceptive Device Private Key recorded in the inceptive Connection Log and the Inceptive Session Key. A new 0th-order Inceptive Session Key is created, and the created key is encrypted with the Primal Session Key recorded in the inceptive Connection Log and the Primal Device Public Key. Next, the received 0th-order Primal Session Key and the created 0th-order Inceptive Session Key are overwritten and recorded in the inceptive Connection Log, and the previously encrypted data is sent to the Primal Device.

The Primal Device decrypts the received data by the Primal Device Private Key and the 0th-order Primal Session Key recorded in the Inceptive Connection Log. The obtained new 0th-order Inceptive Session Key and the previously created 0th-order Primal Session Key are overwritten and recorded in the Primal Connection Log.

The above is the re-authentication process in the BT mode. This will be hereinafter called a BT Reconnection Stage. When the BT Reconnection Stage is completed, the new 0th-order Primal Session Key, the 0th-order Inceptive Session Key, the new Shared Primal Device Key obtained in the process of encryption with the Primal Device Public Key and decryption with the Private Key, and the new Shared Inceptive Device Key obtained by the process of encryption with the Primal Device Public Key and decryption with the Private Key are shared.

When the BT Connection Stage or the BT Reconnection Stage is completed, the Usage Pass in which the transfer process could not be completed in the past can be recovered to the state before the transfer process by a method described below. A description will be first given to a recovery process for the BT PI Transfer Stage, and next given to a recovery process for the BT IP Transfer Stave.

When the process is performed to recover the Usage Pass transferred in the BT PI Transfer Stage to the state before the transfer process execution, first, the host sends the UPID of the Usage Pass as the recovery object to the Primal Device.

The Primal Device uses this UPID and searches for the Primal Transaction Log. As a result, when the Primal Transaction Log including the UPID is found, the record destination address (address where the received Usage Pass is to be recorded) of the Usage Pass in the Inceptive Device recorded in the Log is sent to the Inceptive Device.

The Inceptive Device accesses the Usage Pass storage area which can be accessed by the received address, and checks the record state of the Usage Pass. The result thereof is set in the Usage Pass status. Next, the UPID, the decryption enabling condition of the searched Usage Pass, the created Usage Pass status, and the record destination address of the Usage Pass are concatenated, and are sent to the Primal Device. The data to be sent at this time is also concatenated with a Hash value calculated from the data, the mth-order Primal Session Key, and the nth-order Inceptive Session Key.

The Primal Device verifies the received Hash value, and confirms that no falsification is made on the received data and the previously transferred Usage Pass does not exist in the Inceptive Device. When the verification is ended, a search is made for the Primal Transaction Log including the received UPID. When the Log is found, the decryption enabling condition before the transfer, which is recorded in the Log, is overwritten on the Usage Pass prepared in the present Usage Pass sending module.

The above is the recovery process of the Usage Pass for the BT PI Transfer Stage in the BT mode. This will be called a BT PI recovery stage. When this stage is completed, the Usage Pass before sending comes to exist in the Primal Device.

Next, the recovery process of the Usage Pass for the BT IP Transfer Stage will be described.

When the process is performed to recover the Usage Pass transferred in the BT PI Transfer Stage to the state before the execution of the transfer process, first, the Host Module sends the UPID of the Usage Pass of the recovery object to the Primal Device.

The Primal Device uses this UPID to search for the Primal Transaction Log. As a result, when the Primal Transaction Log including this UPID is found, the record destination address (address indicating the area where the Usage Pass of the transfer object is originally recorded) of the Usage Pass in the Inceptive Device recorded in the LOG is sent to the Inceptive Device.

The Inceptive Device accesses the Usage Pass storage area which can be accessed by the received address, and checks the record state of the Usage Pass. Then, the result is set in the Usage Pass Status. Next, the UPID, the decryption enabling condition of the searched Usage Pass, the created Usage Pass Status, and the record destination address of the Usage Pass are concatenated, and are sent to the Primal Device. At this time, the data to be sent is also concatenated with a Hash value calculated from the data, the mth-order Primal Session Key, and the n−1th order Inceptive Session Key. Incidentally, it is assumed that the newest Inceptive Session Key shared at this time point is the n−1th one.

The Primal Device verifies the received Hash value, and confirms that no falsification is made on the received data, and whether the Usage Pass previously transferred to the Inceptive Device has been modified by the past transfer (sending) process.

In parallel to the verification, the Inceptive Device creates the nth-order Inceptive Session Key. When the creation of this key is ended, it is encrypted with the n−1th order Inceptive Session Key and the mth-order Primal Session Key, and is sent to the Primal Device.

In the Primal Device, after the data is received, when it is confirmed from the foregoing verification process that the Usage Pass has been modified by execution of the sending process, the recovery process of the Usage Pass described below is executed. First, the received data is decrypted with the mth-order Primal Session Key and the n−1th order Inceptive Session Key. Next, the decryption enabling condition recorded in the Transaction Log previously found as a result of the search is concatenated with the UPID of the Usage Pass, and is encrypted with the nth-order Inceptive session key and the Shared Inceptive Device Key. When the encryption is ended, the data is sent to the Inceptive Device.

The Inceptive Device decrypts the received data by the Shared Inceptive Device Key and the nth-order Inceptive Session Key. Then, it is confirmed whether the UPID included in the decryption result is consistent with the UPID of the Usage Pass of the recovery object. When the coincidence of the UPID is confirmed, the decryption enabling condition included in the decryption result is overwritten and recorded in the Usage Pass existing in the Inceptive Device.

The above is the recovery process of the Usage Pass for the BT IP Transfer Stage in the BT mode. This will be called a BT IP recovery stage. When this stage is completed, the Usage Pass before sending comes to exist in the Inceptive Device.

When the verification is ended, a search is made for the Primal Transaction Log including the received UPID. When the Log is found, the decryption enabling condition before the transfer, which is recorded in the Log, is overwritten on the Usage Pass presently prepared in the Usage Pass sending module.

The above is the recovery process of the Usage Pass for the BT PI Transfer Stage in the BT mode. This will be called a BT PI Recovery Stage. When this Stage is completed, the Usage Pass before sending comes to exist in the Primal Device.

Hereinafter, embodiments of the invention will be described with reference to the drawings.

System Structure

First, the whole structure of a system including a data recorder/player of an embodiment and a storage device which can be connected thereto will be described by use of FIG. 1 and FIG. 2.

In this embodiment, a description will be given to a record/playback system in which broadcasted digital image data, digital data distributed by a distribution server, or digital data sent through a digital signal line connected to another equipment is recorded in a detachable and attachable storage device, and digital data stored in the storage device is played back by a display device or a speaker of a recorder/player. In the following, a digital data recorder/player will be simply referred to as a recorder/player, and digital data, such as image, music or text, received by the recorder/player will be referred to as content data. Here, the detachable and attachable storage device to record the content data is, for example, a magnetic disk device or a semiconductor memory device, and each of them has a characteristic control function of the invention. In the following, although a description will be made while using the magnetic disk device as an example of the storage device, no limitation is made to this. Embodiments of the invention can be applied to a well-known storage device other than the magnetic disk device as long as it has the characteristic function of the invention as described below.

Content data whose copyright protection is required is received by an antenna 131 through broadcast waves, or what is distributed from a distribution server 150 is received through a network interface 100, and is captured by a recorder/player 1112. The distributed content data is encrypted in a broadcast wave transmission source 130 or the distribution server 150 by a specified encryption system. The encryption system may be uniquely regulated according to individual content protection specifications. At that time, key data (hereinafter called a content key) for decrypting the content data and a use condition of the content data are also separately sent to the recorder/player 112. The information for decrypting the content data will be hereinafter called decryption control information of the content data. There is a case where this decryption control information is sent from the same transmission source as the transfer source of the content data, or a case where it is sent from another transmission source.

The recorder/player 112 has a structure in which a detachable and attachable storage device, for example, a magnetic disk devices 125, 126 can be connected. The encrypted content data sent through the broadcasting waves or sent from the distribution server 150 and the decryption control information of the content data are recorded in the magnetic disk devices 125 and 126 through a recording module (Recording Module) 102 and a protected information transmit module (Protected Information Transmit Module) 104. Besides, the encrypted content data and the decryption control information of the content data are sent from the detachable and attachable magnetic disk devices 125 and 126 to a playback module (Playback Module) 103 through the protected information transmit module 104. The decryption and playback of the content data are performed in the playback module 103 in the recorder/player 112.

In order to prevent the illegal use of content data, it is necessary to prevent that the content key included in decryption control information is illegally extracted, or the use condition is illegally copied or rewritten. For that purpose, it is important that in the recorder/player 112 or the detachable and attachable magnetic disk devices 125 and 126, a portion which sends and receives the decryption control information, or records and reads the information is mounted so as to have high tamper resistant features. Further, the storage device of the embodiments of the invention has a function to prevent unlimited copy even in the case where the content data is encrypted, and in order to correctly realize that, a portion to record and read the encrypted data has also tamper resistant features. Here, the portion to send and receive the decryption control information, or to record and read the information will be called a host security manager (Host Security Manager) 111 in the recorder/player 112, or a storage security manager (Storage Security Manager) 225 in the magnetic disk device. Besides, in the magnetic disk device, a portion having a function to control reading and writing of data recorded on a medium 200 and to be capable of temporally holding data will be called a storage device control unit (Storage Controller). The storage controller 230 is provided with a storage controller temporal data storage area (SC buffer) 231 in which data is temporally stored in order to hold data recorded in a hidden area (Hidden area) on the medium 200 among data read from the medium 200 or in order to record specific data recorded in the area into the hidden area. The definition of the hidden area and the data recorded in the area will be described later by use of FIG. 28, FIG. 29 and FIG. 30. Incidentally, the specific role of a protected information area (Protected Information Storage) 101 in the Host Security Manager 1121, and the specific roles of a Usage Pass transfer module 221 (Usage Pass Transfer Module), a qualified storage controller (qualified storage Controller) 222, and a qualified storage (Qualified Storage) 223 in the storage security manager 225 will be described later. This embodiment of the invention relates to a transfer protocol for sending and receiving decryption control information between modules in the Host Security Manager 111 and the storage security manager 225. Incidentally, here, as means for realizing the functions of the respective modules, the security managers and the like in the recorder/player 112 and the magnetic disk devices 125 and 126 may be configured by hardware or software (program).

On the other hand, in the recorder/player 112, the network interface 100 to the network, an interface bridge unit 105 to an input device, interfaces (Host Interface Unit) 106 and 107 to the magnetic disk devices, a processor (PU) 108 to control these, and the like has, as a whole, a function to control the process and transfer of data flowing through the inside of the system. In that meaning, in the following, these will be collectively called a Host Module (Host Modules) 110.

Outline of Mutual Authentication Between Modules and Usage Pass Transfer System

Content data sent through broadcasting waves, or content data recorded on another medium is generally encrypted by a uniquely regulated system. Besides, the data often includes decryption control information thereof. In the case where this data is captured by the recorder/player 112 through the antenna 131 or a digital signal line 132, the recording module 102 decrypts the content data in accordance with the regulated system, and extracts the decryption control information. The extracted decryption control information is collected into one piece of data having a specific format determined in this embodiment. This will be hereinafter called Usage Pass. The specific structure of the Usage Pass will be described later by use of FIG. 4.

When creating the Usage Pass, the recording module 102 sends it to the magnetic disk device 125 or 126. However, in order to complete the sending, before that, mutual authentication must be completed between the recording module 102 or the protected information transmit module 104 and the Usage Pass transfer module 221. When the authentication process is completed, some key data is shared. The Usage Pass of the transfer object is encrypted by using the shared keys, and then is sent from the recording module 102 to the Usage Pass transfer module 221.

First, a description will be given to an authentication process method up to the sharing of keys and a process method for encrypting the Usage Pass by using the keys shared by the authentication process and transferring it. There are two kinds of process methods. One of them is a method in which when the mutual authentication is ended between the two modules, the transfer direction of the Usage Pass is uniquely decided, and the other is a method in which the Usage Pass can be transferred bidirectionally. In the following, the mutual authentication and the Usage Pass transfer system according to the former will be called a unidirectional transfer mode (abbreviated to a UT mode), and the mutual authentication and Usage Pass transfer system according to the latter will be called a bidirectional transfer mode (abbreviated to a BT mode). These modes are generically called a qualified access (Qualified Access) mode. When the Usage Pass is transferred between modules, when the recorder/player is started, the Host Module 110 determines as to which mode is used for execution of the mutual authentication and the Usage Pass transfer.

In the magnetic disk device, when the Usage Pass transfer module 221 receives the Usage Pass, it is sent to the qualified storage controller 222. The qualified storage controller is the module of controlling the qualified storage 223. The main body of the Usage Pass is finally stored in the qualified storage 223. Incidentally, in the case where the distribution server 150 sends the Usage Pass to the magnetic disk device, or in the case where the Usage Pass is transferred from one magnetic disk to the other magnetic disk device, the module as the transfer source of the Usage Pass may directly send the Usage Pass to the Usage Pass transfer module in the magnetic disk device as the transfer destination in accordance with the system determined in embodiments of the invention. In this case, the network interface 100 and the recording module 102 in the recorder/player 112 merely control the transfer of the data from one module to the other module, and do not directly relate to the mutual authentication process and the encryption of the Usage Pass.

Next, the structure of the magnetic disk device will be described with reference to FIG. 2.

Data is inputted to and outputted from the magnetic disk device through an interface unit 220. In the case where data other than data requiring protection, such as the Usage Pass, is inputted from outside, it is recorded on the magnetic disk 200 from a head unit 202 through the controller 230. The encrypted content data is also recorded on the magnetic disk 200 in accordance with this flow. In the case of reading, the data flows reversely to the foregoing. In this embodiment, the controller 230 performs specific control at recording or playback of the content data. The detailed operation of the controller 230 will be described later by use of FIG. 28 to FIG. 32. Incidentally, similarly to the Usage Pass transfer module 221 or the qualified storage controller 222, the controller 230 is controlled also by a processor (PU) 231.

Figure 2:
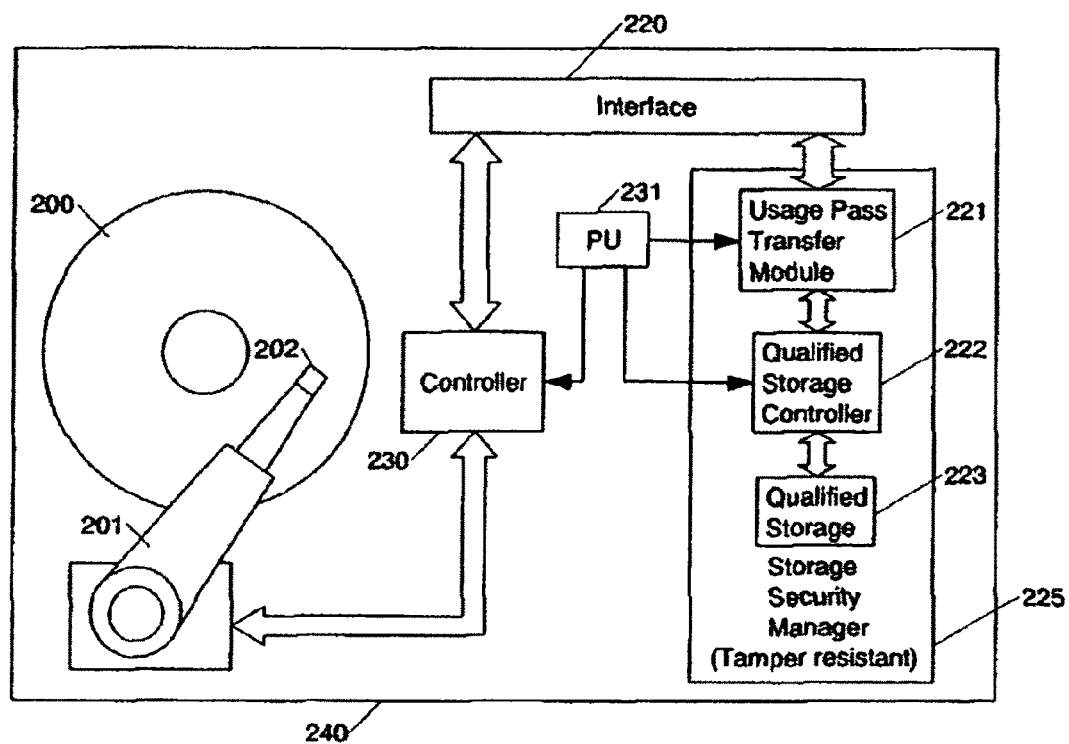
FIG. 2—A structural view of a detachable and attachable magnetic disk device according to an embodiment.

In FIG. 2, although the qualified storage 223 is provided separately from the magnetic disk 200, the qualified storage may be provided on the magnetic disk 200 as long as an access is allowed only by a specific access method different from reading and writing of the encrypted content data, and the structure is such that it is impossible to decompose the device to directly read the inside data.

Keys of System and Structure of Data

FIG. 3 shows a list of key data used for encryption when Usage Pass transfer is executed among the recording module 102, the playback module 103 and the Usage Pass transfer module 221 in the equipments shown in FIG. 1 and FIG. 2, and data to be distributed.

In general, in the case where key data X is key data for symmetrical encryption, the objective data is encrypted by using the key data X, and the decryption thereof is also performed by using the same key data X. On the other hand, in the case where the key data X is a private key or a public key for asymmetrical encryption, the data of the encryption object is encrypted by using a public key or a private key Y corresponding to these, which is different from X. The data encrypted by using Y is decrypted by using X. In the following, public key data for asymmetrical encryption is abbreviated to a public key, private key data for asymmetrical encryption is abbreviated to a private key, and key data for symmetrical encryption is abbreviated to a symmetric key.

In the case where an electronic signature is attached to the data, this means that a Hash value of a data set including the data as a part is encrypted with the private key Y corresponding to the public key X.

Incidentally, with respect to a denotation such as $K\_x$ in the present specification, x is shown as a subscript in all drawings.

As keys relating to the encryption, decryption and playback process of content data, the encryption and decryption of the Usage Pass, and the authentication of the recording module 102, the playback module 103, the magnetic disk devices 125 and 126, and the distribution server 150, there are the following ones.

A key for encrypting and decrypting the content data is a content key K_c. Public keys KP_dc with electronic signatures for individually mutually performing authentication are assigned to the distribution server 150, the recording module 102, the playback module 103, and the Usage Pass transfer module 221, respectively. However, in the case where the Host Security Manager 111 as a whole is mounted as one functional unit having tamper resistant features, one KP_dc may be assigned to the Host Security Manager 111.

The data encrypted with the public key KP_dc can be decrypted with the private key K_dc corresponding thereto. With respect to these serest keys, one piece of data is assigned to a finite number of pieces with respect to each of the distribution server 150, the recording module 102, the Usage Pass transfer module 221, and the playback module 103. The finite number means one or not smaller than two. A unit of sharing between KP_dc and K_dc will be called a Class. The level of safety which a portion to transfer the Usage Pass or to record it must satisfy when it is mounted, and one Usage Pass transfer system are regulated for one Class. That is, plural modules belonging to a Class are mounted in the form of satisfying the level of safety regulated in the Class, and have a function to realize one common Usage Pass transfer method. Incidentally, in the following, such equipments and modules will be generically called Devices.

KP_dc is concatenated with other general information, and then is given an electronic signature by a specified certificate authority, and functions as a certificate for each device. A public key of the certificate authority to give the electronic signature is denoted by KP_CA, and a private key corresponding thereto is denoted by K_CA. In the following, these will be called a certificate authority public key and a certificate authority Private Key. General information written in the certificate is the issue source of the certificate, the serial number of the certificate, and the like. In the following, the certificate for indicating the validity of KP_dc will be called a Device Class Certificate, the public key KP_dc will be called a Device Class Public Key, and the private keyPrivate Key used for decrypting the data encrypted with the key will be called a Device Class Private Key. The Device Class Certificate and the Device Class Private Key are embedded in the respective devices at the time of shipment.

A public key KP_d to be individually embedded and a private key K_d for decrypting data encrypted with a key are also embedded in each device. In the following, these are called a Device Public Key and a Device Private Key. Different Device Public Keys and Device Private Keys are embedded in all devices.

Incidentally, in the process of encryption with a public key, one symmetric key is created based on the public key used for the encryption. This is denoted by *KP_d. Similarly, in the process of decryption with a Private Key, one symmetric key is created based on the private key used for the decryption. This is denoted by *K_d. *KP_d and *K_d are actually the same value, and the data encrypted with the *KP_d can be decrypted with *K_d. These symmetric keys are respectively called a Shared Device Public Key and a Shared Device Private Key. A creation method of these keys will be described later in more detail when a public key encryption method is described.

Further, in the system shown in FIG. 1, as keys to be used, there are the following ones. There are a symmetric key K_sn ($n \geq 0$) created in the Usage Pass transfer destination to encrypt the Usage Pass each time the Usage Pass transfer is performed between two different devices, and a symmetric key K_ch created to encrypt K_s0 shared between both devices at the final stage of the mutual authentication process between the devices. K_ch and K_s0 are keys shared in the mutual authentication process between the devices, and are not used for encryption at the time of transfer of the Usage Pass. On the other hand, K_sn ($n \geq 1$) is always used after being updated from K_sn to K_sn+1 each time the Usage Pass transfer is executed. Hereinafter, K_ch will be called a Challenge key, and K_sn ($n \geq 0$) will be called a Session Key. Especially, a session key in the case where n is 0 will be called a 0th-order Session Key.

A subscript of [P] or [I] is given to each key. This indicates that the key is created by (or embedded in) which of the Primal Device and the Inceptive Device. Here, the Primal Device is the device which performs, in the case where mutual authentication is performed between one device and the other device, verification of the Device Class Certificate sent from the partner device in the first process. On the other hand, the Inceptive Device is the device which performs, in the same case, sending of its own Device Class Certificate to the partner device in the first process. The encryption performed by using the keys described above is denoted by $E(X, Y)$. This means that data Y is encrypted by using key data X. Similarly, the decryption is denoted by $D(X, Y)$. This means that data Y is decrypted by using key data X. Besides, $H(X)$ denotes a Hash value of data X, $X \| Y$ denotes concatenating data X with data Y. The notation of these is common to both cases of the UT mode and the BT mode.

Incidentally, it has been described that the transfer direction of the Usage Pass is uniquely determined in the UT mode, and the direction is always from the Primal Device to the Inceptive Device. Accordingly, in the UT mode, the recording module 102 always becomes the Primal Device, and the playback module 103 always becomes the Inceptive Device. On the other hand, the magnetic disk device becomes the Inceptive Device in the case where the Usage Pass sent from the recording module is recorded, and becomes the Primal Device in the case where the Usage Pass is sent from itself to the playback module for the purpose of decrypting or playing back the content data.

On the other hand, in the BT mode, a device having the Host Security Manager always becomes the Primal Device, and the magnetic disk device always becomes the Inceptive Device, however, the transfer of the Usage Pass can be performed from the Primal Device to the Inceptive Device or from the Inceptive Device to the Primal Device.

Structure of Usage Pass

Figure 4:
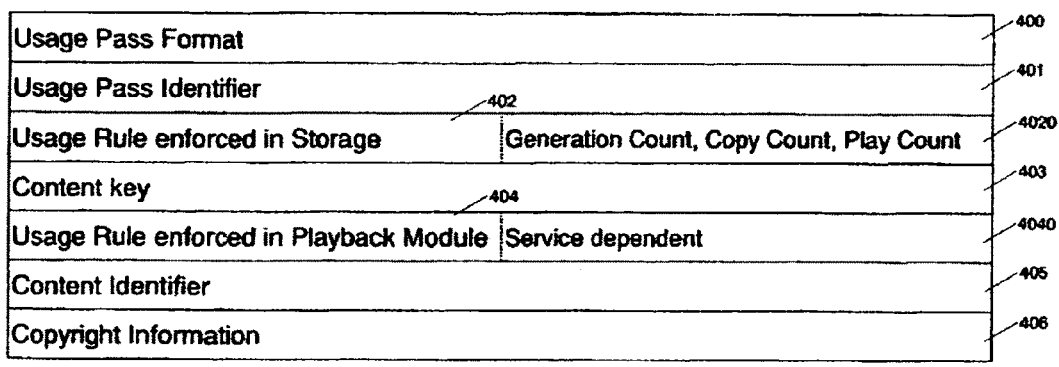
FIG. 4—A data (Usage Pass) structural view in which decryption conditions of data and decryption keys used in an embodiment are summarized.

The structure of the Usage Pass will be described by use of FIG. 4.

The Usage Pass includes a Usage Pass Format 400 indicating that itself can be outputted to what kind of module, an identifier UPID 401 uniquely assigned to each, conditions 402 and 404 for limiting the use of the object content data, key data K_c 403 for resolving the encrypted content data, an identifier CID 405 for specifying the corresponding content data, and copyright information 406 of the content. The conditions to limit the use of the object content data include control information UR_s 4020 for interpreting the content at the transfer source of the Usage Pass and for controlling the output (the recording module or the magnetic disk device can normally become the transfer source of the Usage Pass), and limiting information UR_p 4040 for controlling the decryption process of the content data in the module after the playback module 103 receives the Usage Pass and the content data. UR_s 4020 includes a Generation Count to indicate generation information in the case where the Usage Pass is copied, a Copy Count to indicate the number of times the Usage Pass can be copied from itself, a Play Count to indicate the number of times the content data can be decrypted using its own Usage Pass, and the like.

Figure 5:
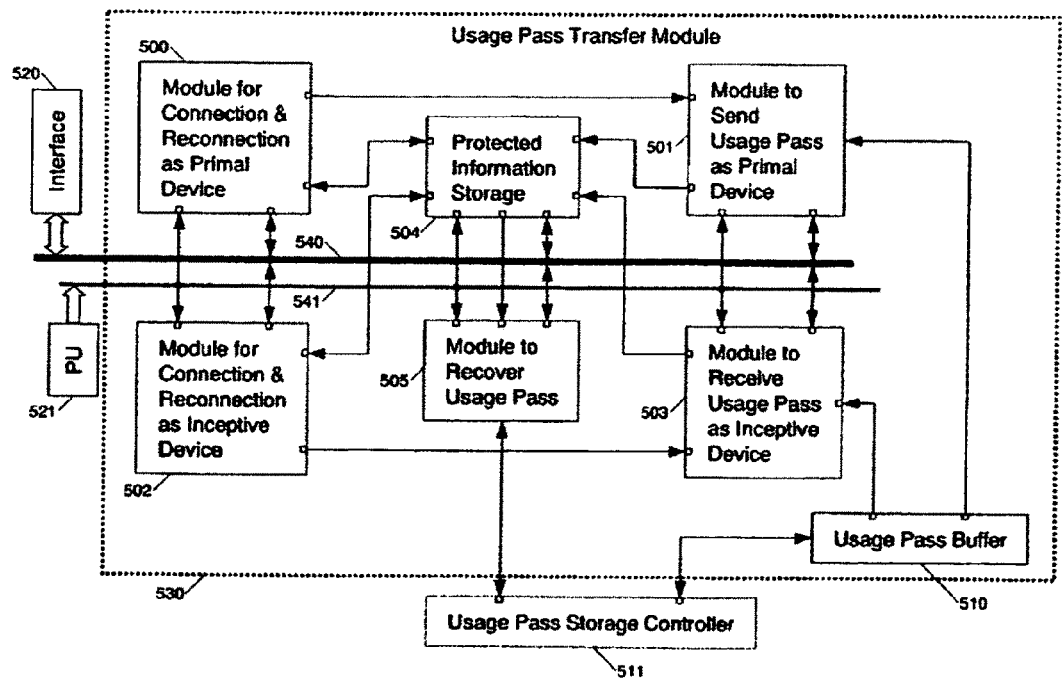
FIG. 5—A view showing a Usage Pass Transfer module 530 to realize Unidirectional Transfer (UT) mode in the magnetic disk device of FIG. 2 of one embodiment.

Structure of Usage Pass Transfer Module which can Execute Usage Pass Transfer in UT Mode The structure of the Usage Pass transfer module 221 which can execute the Usage Pass transfer in the UT mode will be described by use of FIG. 5.

A Usage Pass transfer module 530 includes a module 500 which has a function to perform, as a Primal Device, a necessary process in the case where mutual authentication is performed with respect to another device, a module 501 which has a function to transfer, as a Primal Device, the Usage Pass, a module 502 which has a function to perform, as an Inceptive Device, a necessary process, a module 503 which has a function to transfer, as an Inceptive Device, the Usage Pass, a static storage area 504 which can not be rewritten by the intention of a user, a module 505 which has a recovery function to avoid that when Usage Pass transfer is executed and the process is not normally ended, the objective Usage Pass is lost from both the transfer source device and the transfer destination device, and a Usage Pass Buffer 510 which temporally stores the Usage Pass before it is sent to the qualified storage controller 222 or temporally stores the Usage Pass read from the qualified storage unit. The authentication modules 500 and 502, the Usage Pass encryption and sending module 501, the Usage Pass reception and decryption module 503, the Usage Pass recovery module 505 and the like access the storage area 504 as the need arises. The storage area 504 will be called a protected information area.

The exchange of data between the outside of the magnetic disk device and each module is performed through a Storage Interface Unit 520 and a bus 540. A PU 521 is the same as that denoted by 231 in FIG. 2.

Functions actually owned by the respective modules will be described in detail when a mutual authentication process and a Usage Pass transfer process are specifically described by use of FIG. 17 to FIG. 20. Besides, the kind of data recorded in the protected information area 504 will be described later by use of FIG. 9.

Figure 6:
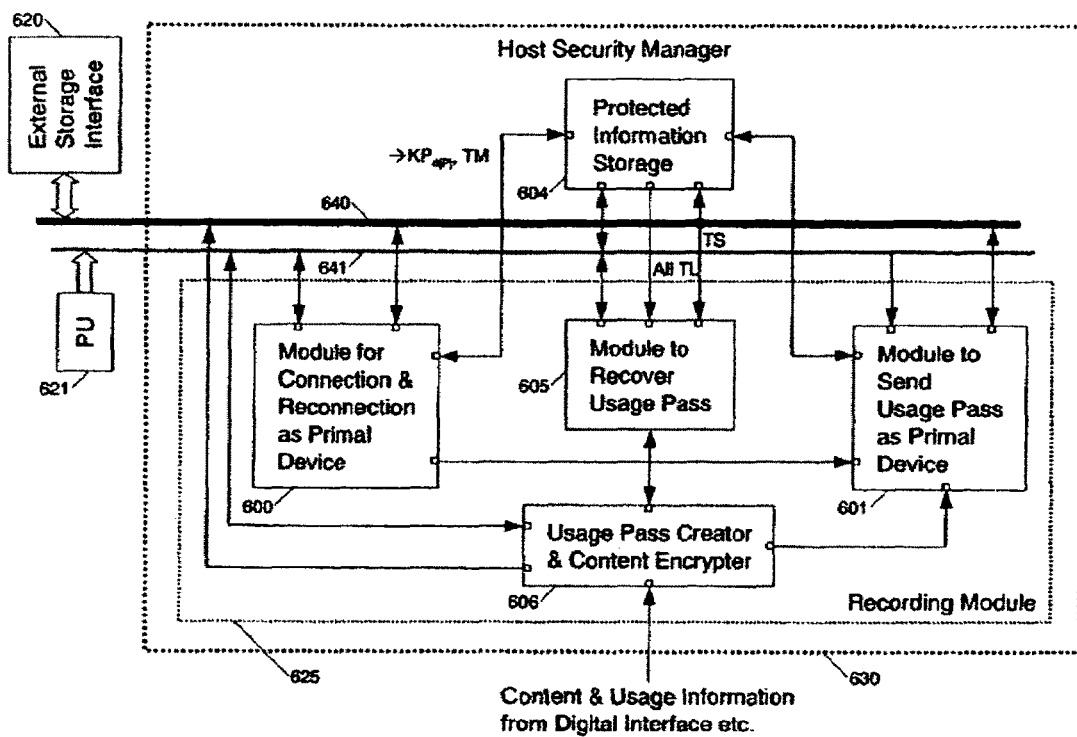
FIG. 6—A view showing a record-only function module to realize UT mode in a recorder/player of an embodiment.

Structure of Recording Module in Recorder/Player which can Execute Usage Pass Sending in UT Mode The structure of the recording module 102 in the recorder/player which can execute the Usage Pass sending in the UT mode will be described by use of FIG. 6. Incidentally, in the case where the function to perform the transfer of the Usage Pass in the UT mode is realized in the recorder/player, since the protected information transmit module 104 in FIG. 1 is not particularly required, it is not shown.

In the UT mode, the recording module always becomes the Primal Device. Then, the recording module 625 includes a module 600 which has a function to perform, as a Primal Device, a necessary process in the case where mutual authentication is performed with respect to another device, a module 601 which has a function to send, as a Primal Device, a Usage Pass, a module 605 which has a recovery function of the Usage Pass to avoid that when the Usage Pass sending process is executed and the process is not normally ended, the objective Usage Pass is lost from both the transfer source device and the transfer destination device, and a module 606 which has a function to acquire content data and use right information from outside, to create a content key, to encrypt the content with the key, and to create the Usage Pass including the key. The encrypted content is recorded in the magnetic disk device from the module 606 through a data bus 640 and Host Modules 620.

A Host Security Manager 630 including the recording module is provided with a static storage area 604 which can not be rewritten by the intention of a user, and the authentication module 600, the Usage Pass encryption and sending module 601, the Usage Pass recovery module 605 and the like access the storage area as the need arises. The storage area 604 will be called a protected information area.

Functions actually owned by the respective modules will be described in detail when the mutual authentication process and Usage Pass transfer process are specifically described by use of FIG. 17 to FIG. 20. Besides, the kind of data recorded in the protected information area 504 will be described later by use of FIG. 8.

Figure 7:
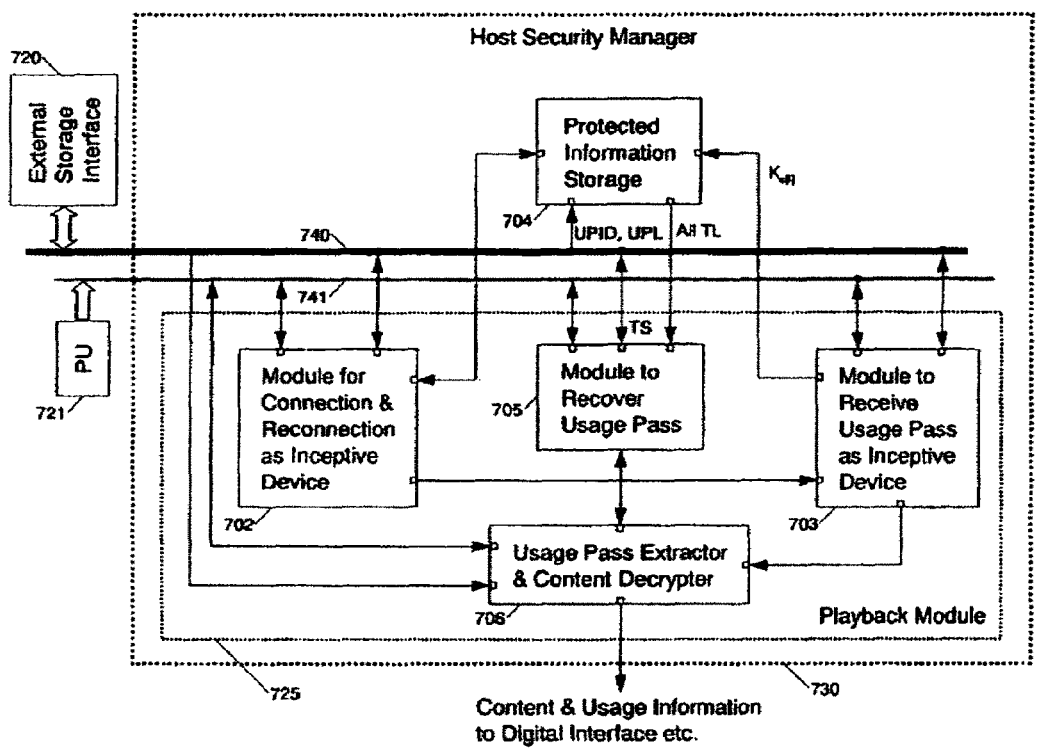
FIG. 7—A view showing a decryption-only function module to realize UT mode in the recorder/player of an embodiment.

Structure of Playback Module in Recorder/Player which can Execute Usage Pass Reception in UT Mode The structure of the playback module 103 which can execute the Usage Pass reception in the UT mode will be described by use of FIG. 7. Similarly to the recording module, in the case where the function to transfer the Usage Pass in the UT mode is realized by the recorder/player, since the protected information transfer module 104 in FIG. 1 is not particularly required, it is not shown.

In the UT mode, the Playback Module always becomes the Inceptive Device. Then, the Playback Module 725 includes a module 702 which has a function to perform, as an Inceptive Device, a necessary process in the case where mutual authentication is performed with respect to another device, a module 703 which has a function to receive, as an Inceptive Device, the Usage Pass, a module 705 which has a recovery function of Usage Pass to avoid that when a Usage Pass reception process is executed and the process is not normally ended, the objective Usage Pass is lost from both the transfer source device and the transfer destination device, and a module 706 which has a function to interpret the content described in UR_p included in the Usage Pass from the received Usage Pass, and to decrypt the encrypted content data in accordance with that. At this time, the encrypted content data is sent to the module 706 through Host Modules 720 and a data bus 740. The decrypted content data is directly outputted from the module 706 to the outside of the playback module through a protected data communication path and the like.

A Host Security Manager 730 including the playback module is provided with a static storage area 704 which can not be rewritten by the intention of a user, and the authentication module 702, the Usage Pass reception and decryption module 703, the Usage Pass recovery module 705 and the like access this storage area as the need arises. The storage area 704 will be called a protected information area.

Functions actually owned by the respective modules will be described in detail when the mutual authentication process and the Usage Pass transfer process are specifically described by use of FIG. 17 to FIG. 20. Besides, the kind of data recorded in the protected information area 504 will be described later by use of FIG. 8.

Structure of Protected Information Area for UT Mode in Host Security Manager

The structure of the protected information area for UT mode in the recorder/player will be described by use of FIG. 8. A storage area 819 is an area which the recording module 102 accesses. On the other hand, a storage area 839 is an area which the playback module 103 accesses. The same kind of data is held or recorded in the storage areas 819 and 839. Those are as follows.

Reference numerals 801 and 821 denote Device Class Certificates. The Device Class Certificate 801 includes a Device Class Public Key 800, and similarly, the Device Class Certificate 821 includes a Device Class Public Key 820. The Device Class Certificate is for certifying the validity of an included Device Class Public Key, and includes an electronic signature. An electronic signature unit is encrypted with a Certificate authority Private Key K_CA.

Reference numerals 803 and 823 denote certificate authority public keys, 804 and 824 denote Device Class Private Keys, 805 and 825 denote Device public keys, and 806 and 826 denote Device Private Keys.

The above certificates and key information are embedded at the time of initial mounting, and are not updated later.

On the other hand, 802 and 822, 810, 811, 830 and 831 denote information to be updated in the mutual authentication process or the Usage Pass transfer process. Here, 802 and 822 denote lists of revoked Device Class. This list will be hereinafter called RDCL. When the safety of a Device Class Public Key KP_dc is lost, the intrinsic number of the certificate including KP_dc is registered in this list. When the verification of the Device Class certificate sent from another device is performed, the electronic signature unit is used to confirm that no falsification is made on the certificate, and it is also confirmed whether or not the intrinsic number of the certificate is registered in the list. Besides, 810, 811, 830 and 831 denote storage areas called Transaction Log. As the Transaction Log, UPID of the transfer object Usage Pass, "information relating to the Usage Pass Format which can be received" (recoded by only the Primal Device, and in the following, this will be called Type Map) included in the Device Class certificate sent from the authentication partner. the device public key (recorded by only the Inceptive Device) of the partner executing the mutual authentication, a Session Key created in the transfer process, a progress status of the Usage Pass transfer process called Session Status, UR_s (recorded by only the Primal Device) before the execution of the transfer, the address where the Usage Pass is recorded or the address of the recording destination are recorded when the Usage Pass transfer is executed. The data is recorded at the respective stages at the time of execution of Usage Pass transfer, so that the Usage Pass can be recovered even in the case where the Usage Pass is lost from both the transfer source and the transfer destination because of an unexpected accident. The timing when the data is recorded will be described in detail when the mutual authentication process and the Usage Pass transfer process are specifically described by use of FIG. 17 to FIG. 20.

Here, the Type Map will be described. As described before, the Type Map indicates "information relating to Usage Pass format which can be received". This information is included in the Device Class certificate, and in the meaning, it is sent to a device as an authentication partner during the authentication process. The device of the authentication partner uses the Type Map to determine that when itself is a Usage Pass transfer source, the partner device can receive what kind of Usage Pass. For example, in the case where the Usage Pass format of a certain Usage Pass indicates "type 0" and in the case where the Type Map in the certificate sent from the authentication partner device indicates "type 0 reception impossible", the transmission source device of the Usage Pass does not perform the transfer process of the Usage Pass.

Figure 8:
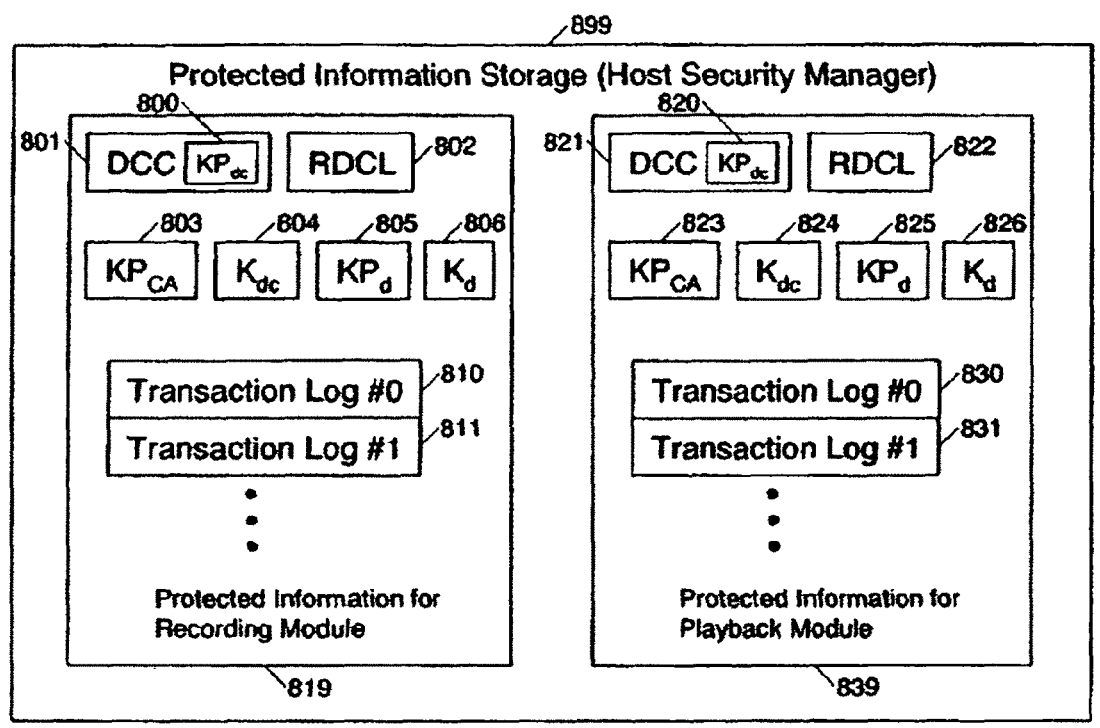
FIG. 8—A view showing a static storage area having tamper resistant features, which is used in UT mode in the recorder/player of the embodiment and in which secret information, such as a certificate, a public key, a private key, and log information of Usage Pass transfer process, is recorded.

Incidentally, in FIG. 8, in the protected information area, the storage area for the recording module and the storage area for the playback are separated, and the Device Class certificate and the certificate authority public key, the Device Class Private Key, the Device public key, the Device Private Key, the Transaction Log recording area, the list of the revoked Device Class and the like are recorded in each of the storage areas, however, it is not always necessary to perform mounting as stated above. That is, one Device Class certificate and one certificate authority public key, one Device Class Private Key, one device public key, and one device Private Key are used by both the recording module and the playback module, and the Transaction Log recording area and the recording area of RDCL may be mounted as the common areas.

Structure of Protected Information Area in the Usage Pass Transfer Module 221

Figure 9:
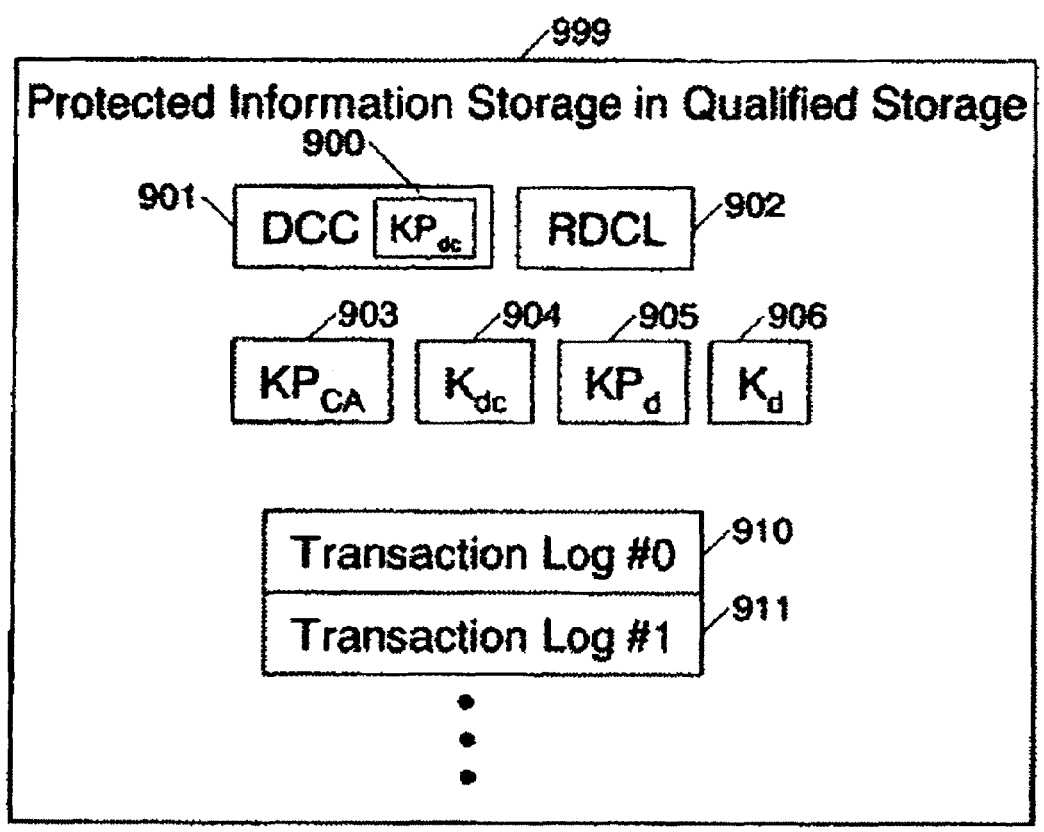
FIG. 9—A view showing a static storage area having tamper resistant features, which is used in UT mode in the magnetic disk device of the embodiment and in which secret information, such as a certificate, a public key, a private key, and log information of Usage Pass transfer process, is recorded.

The structure of the protected information area for UT mode in the magnetic disk device will be described by use of FIG. 9. As shown in the drawing, data recorded in the protected information area 504 provided in the Usage Pass transfer module 221 is the same as the Protected Information 819 held or recorded for the recording module, or the Protected Information 839 held or recorded for the playback module, in FIG. 8. That is, one Device Class certificate 901, one certificate authority public key 903, one Device Class Private Key 904, one device public key 905, and one device Private Key 906 are embedded, and besides, an area 902 for recording one RDCL, and areas for recording a suitable number of Transaction Logs are provided. The Device Class certificate 901 and the respective keys 903, 904, 905 and 906 are used in both the case where the magnetic disk device becomes the Primal Device and the case where it becomes the Inceptive Device. The same applies to the Transaction Log recording area. The update of the RDCL can be performed in both the case where the magnetic disk device becomes the Primal Device and the case where it becomes the Inceptive Device. The update standard of the RDCL will be described later by use of FIG. 17.

Structure of Qualified Storage 223

Figure 10:
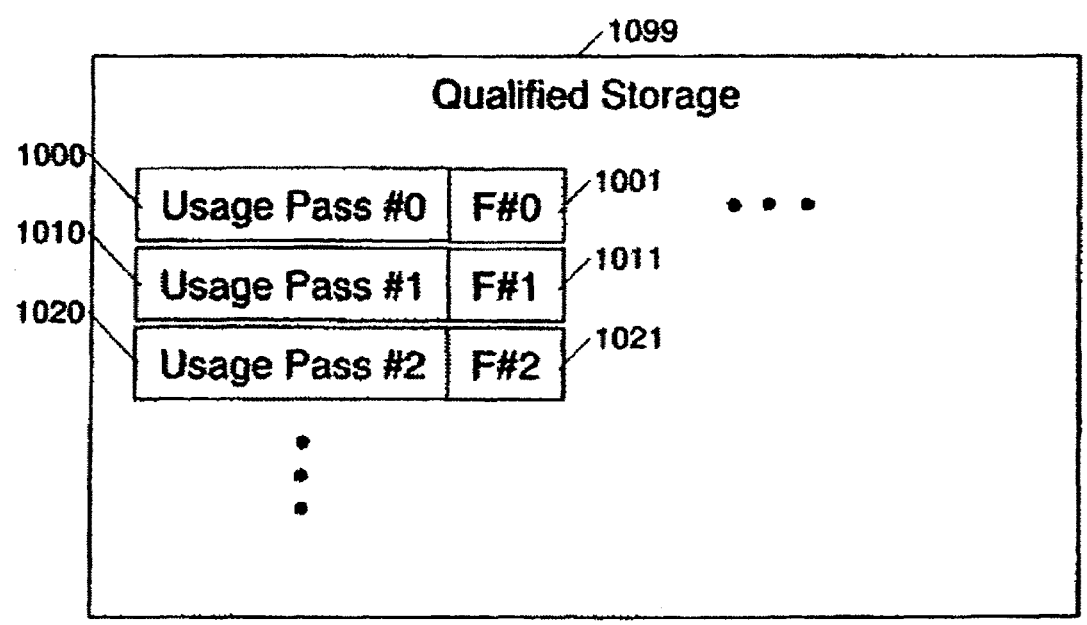
FIG. 10—A view showing a static storage area in the magnetic disk device of the embodiment, which has tamper resistant features and in which Usage Pass is recorded.

The structure of the qualified storage 223 will be described by use of FIG. 10. The qualified storage 223 is a portion in the magnetic disk device, which records and holds the Usage Pass sent from the recording module or another magnetic disk device. The recording of the Usage Pass is limited by the qualified storage controller 222. The qualified storage 223 includes areas 1000, 1010, 1020 and the like where the main bodies of the Usage Pass are recorded, and areas 1001, 1011, 1021 and the like where flags indicating the effectiveness of the Usage Pass are recorded. In the following, the flag will be called an effectiveness indication flag. The effectiveness indication flag written in 1001 indicates the effectiveness of the Usage Pass written in the area 1000, the effectiveness indication flag written in 1011 indicates the effectiveness of the Usage Pass written in the area 1010, and the effectiveness indication flag written in 1021 indicates the effectiveness of the Usage Pass written in the area 1020. The areas for recording the Usage Pass and the effectiveness indication flag constitute a pair as described before, and similarly to the above, many areas are provided in the qualified storage 223. In each of the effectiveness indication flag areas, when an effective Usage Pass is written in an area paired with the flag, a value indicating "effectiveness" is recorded by the qualified storage controller 222. On the other hand, after the once written Usage Pass is outputted to the playback module or another magnetic disk device, a value indicating "ineffectiveness" is recorded in the area. Besides, in the completely initial state, a value indicating "non-record" is recorded. Incidentally, reading of the Usage Pass recorded in the qualified storage unit is performed by the qualified storage controller 222.

Structure of Usage Pass Transfer Module which can Execute Usage Pass Transfer in BT Mode The structure of the Usage Pass transfer module which can execute the Usage Pass transfer in the BT mode will be described by use of FIG. 11.

In the BT mode, the magnetic disk device always becomes the Inceptive Device. Then, the Usage Pass transfer module 1130 includes a module 1102 which has a function to perform, as an Inceptive Device, a necessary process in the case where mutual authentication is performed with respect to another device, a module 1103 which has a function to perform, as an Inceptive Device, transfer of the Usage Pass, a static storage area 1104 which can not be rewritten by the intention of a user, a module 1105 which has a recovery function of Usage Pass to avoid that when the Usage Pass transfer is executed and the process is not normally ended, the objective Usage Pass is lost from both the transfer source device and the transfer destination device, and a Usage Pass Buffer 1110 which temporally stores the Usage Pass before it is sent to the qualified storage controller 222 or temporally stores the Usage Pass read from the qualified storage unit. Besides, the static storage area 1104 will be called a protected information area similarly to the case of the UT mode. However, data stored here is slightly different from the data stored in 504. An authentication module 1100 accesses the storage area as the need arises.

Exchange of data between the outside of the magnetic disk device and each modules is performed through a Storage Interface Unit 1120 and a bus 1140. A PU 1121 is the same as that denoted by 231 in FIG. 2. Functions actually owned by the respective modules and the kind of data recorded in the protected information area 1104 will be described later by use of FIG. 15 and FIG. 21 to FIG. 26.

Structure of Recording Module in Recorder/Player which can Execute Usage Pass Sending in BT Mode The structure of the recording module 102 which can execute Usage Pass sending in the BT mode will be described by use of FIG. 12.

In the BT mode, the whole Host Security Manager 111 always operates as the Primal Device, and the Usage Pass flows bidirectionally with respect to the Host Security Manager 111. Then, it is more appropriate to adopt such a structure that a recording module 1225 includes only functions necessary for outputting the Usage Pass, and the protected information transmit module 104 includes functions for performing mutual authentication with respect to the Inceptive Device. Then, the recording module includes a module 1201 which has a function to perform, as a Primal Device, sending of Usage Pass, a module 1205 which has a recovery function of Usage Pass to avoid that when a Usage Pass sending process is executed and the process is not normally ended, the objective Usage Pass is lost from both the transfer source device and the transfer destination device, and a module 1206 which has a function to acquire content data and use right information from the outside, to create a content key, to encrypt the content by key, and to create Usage Pass including the key. The encrypted content data is recorded into the magnetic disk device from the module 1206 through a data bus 1240 and Host Modules 1220.

A Host Security Manager 1230 including the recording module is provided with a static storage area 1204 which can not be rewritten by the intention of a user, and the authentication module 1200, the Usage Pass encryption and sending module 1201, the Usage Pass recovery module 1205 and the like access the storage area as the need arises. The storage area 1204 will be called a protected information area. Functions actually owned by the respective modules will be described in detail when the mutual authentication process and the Usage Pass transfer process are specifically described by use of FIG. 22 to FIG. 27. Besides, the kind of data recorded in the protected information area 1204 will be described later by use of FIG. 15.

Structure of Playback Module in Recorder/Player which can Execute Usage Pass Reception in BT Mode The structure of the playback module 103 which can execute the Usage Pass reception in the BT mode will be described by use of FIG. 13.

In the BT mode, similarly to the recording module, the playback module always becomes the Primal Device. As stated in the description of the recording module, the protected information transmit module 104 has the function by which the Host Security Manager becomes the Primal Device and performs mutual authentication with respect to the Inceptive Device. Then, a playback module 1325 includes a module 1303 which has a function to receive, as a Primal Device, the Usage Pass, modules 1305 and 1301 which have a recovery function of Usage Pass to avoid that when a Usage Pass reception process is executed and the process is not normally ended, the objective Usage Pass is lost from both the transfer source device and the transfer destination device, and a module 1306 which has a function to interpret, from the received Usage Pass, the content described in UR_p included in the Usage Pass and to decrypt the encrypted content data in accordance with that. At this time, the encrypted content data is sent to the module 1306 through Host Modules 1320 and a data bus 1340. The decrypted content data is outputted from the module 1306 directly to the outside of the playback module through a protected data communication path and the like.

A Host Security Manager 1330 including the playback module is provided with a static storage area 1304 which can not be rewritten by the intention of a user, and an authentication module 1302, the Usage Pass reception and decryption module 1303, the Usage Pass recovery modules 1305 and 1301 access the storage area as the need arises. The storage area 1304 will be called a protected information area.

Functions actually owned by the respective modules will be described in detail when the mutual authentication process and the Usage Pass transfer process are specifically described by use of FIG. 22 to FIG. 27. Besides, the kind of data recorded in the protected information area 1304 will be described later by use of FIG. 15.

Structure of Protected Information Transfer Module for BT Mode

Figure 14:
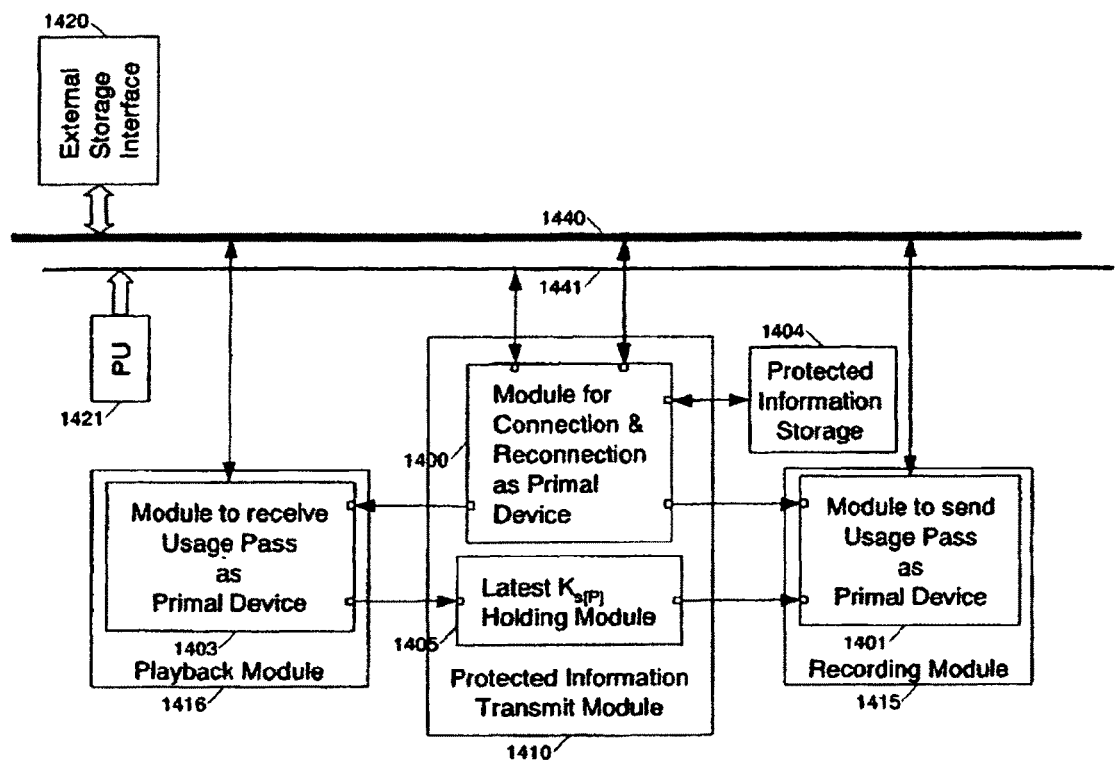
FIG. 14—A view showing a function module to realize a mutual authentication process with respect to the magnetic disk device in accordance with BT mode in the recorder/player.

The structure of the protected information transfer module for BT mode will be described by use of FIG. 14.

As stated in the description of the recording module and the playback module, in the BT mode, it is more appropriate to adopt such a structure that the protected information transfer module executes mutual authentication with respect to the Inceptive Device. Then, a protected information transfer module 1410 includes a module 1400 which becomes a Primal Device and executes a mutual authentication process with respect to the Inceptive Device, and a module 1405 which temporally holds a newest Session Key created by a Usage Pass reception module 1403 in a playback module 1416, and sends it to a Usage Pass sending module in a recording module as the need arises. Incidentally, the timing of creation of the newest Session Key in the Usage Pass reception module 1403, and the use method of the Session Key in the Usage Pass sending module 1401 will be described in detail when the process sequence is described by use of FIG. 23 and FIG. 24.

Structure of Protected Information Area for BT Mode in Host Security Manager

The structure of the protected information area for BT mode in the recorder/player will be described by use of FIG. 15.

The BT mode is a system contrived such that independently of the direction of transfer of the Usage Pass, the Host Security Manager 111 as a whole always becomes the Primal Device, and the magnetic disk device always becomes the Inceptive Device, and the Usage Pass transfer can be executed in both directions. Therefore, in general, when the recording module 102 and the playback module 103 are mounted in the form of sharing one protected information area, the static storage area provided in the recorder/player can be made small.

Figure 15:
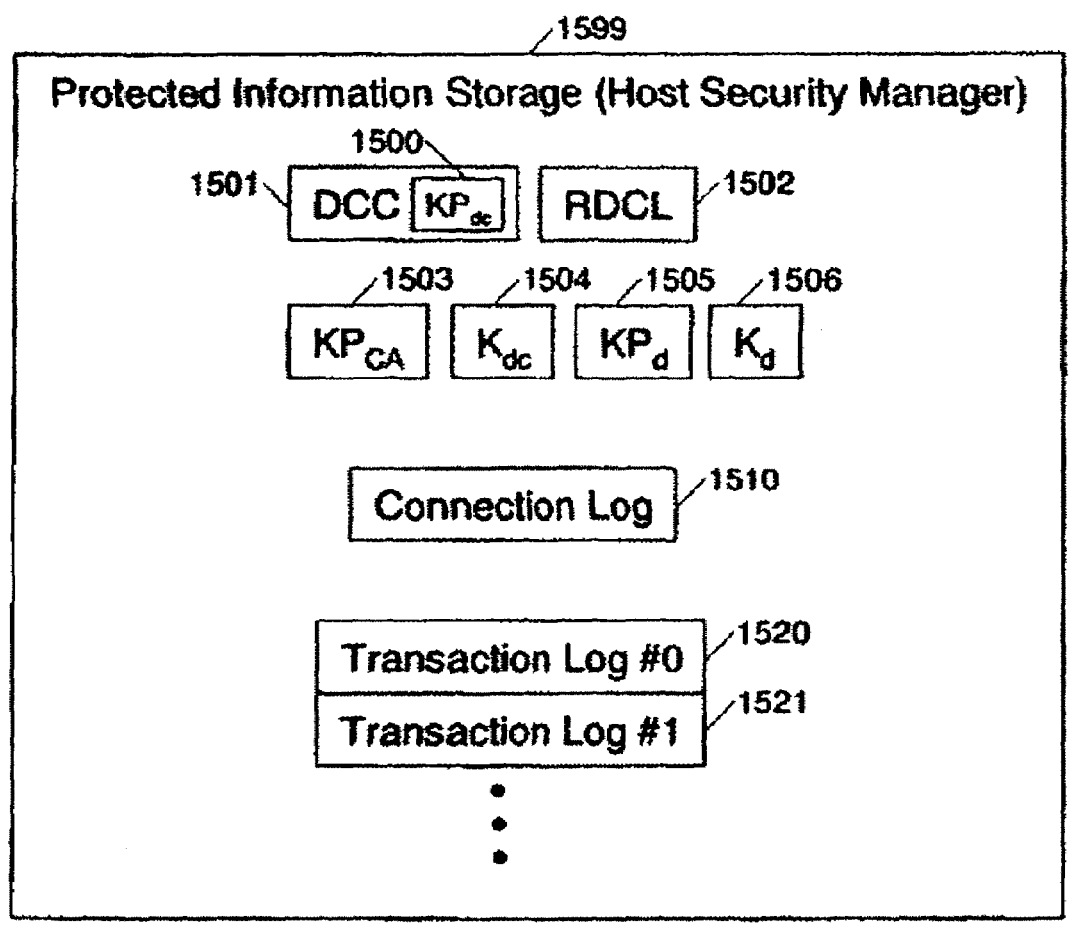
FIG. 15—A view showing a static storage area having tamper resistant features, which is used in BT mode in the recorder/player and in which secret information, such as a certificate, a public key, a private key, log information of mutual authentication process, and log information of Usage Pass transfer process, is recorded.

FIG. 15 shows an inner structure in a case where the protected information area is mounted on the supposition of such a status. Incidentally, as described in the case of the UT mode, separate storage areas for the recording module 102 and the playback module 103 are prepared, and the Device Class certificate and the key necessary for mutual authentication may be stored in each of them. In this case, the recording module and the playback module must respectively include the mutual authentication execution module. Such a case is not described in this embodiment.

Reference numeral 1501 denotes a Device Class certificate. The Device Class certificate 1501 includes a Device Class Public Key 1500. The Device Class certificate is for certifying the validity of the included Device Class Public Key, and includes an electronic signature. An electronic signature unit is encrypted with a certificate authority private key K_CA.

Reference numeral 1503 denotes a certificate authority public key, 1504 denotes a Device Class Private Key, 1505 denotes a Device public key, and 1506 denotes a Device Private Key.

The above certificate and key information are embedded at the time of initial mounting, and are not updated later.

On the other hand, information recorded in areas 1502 and 1510 is RDCL and Connection Log, and these are information to be updated in the mutual authentication process. The meaning of data included in the RDCL and its role are the same as those of the case of the UT mode. On the other hand, the Connection Log is log information intrinsic to the BT mode. A Device public key of a device as an authentication partner, a 0th-order Session Key created by itself and the partner during the execution of the authentication process, and a Type Map are recorded in the log. As shown in the drawing, the Connection Log does not have plural entries. After a mutual authentication process is executed between two certain devices, when one of them is reconnected to a different device, the Connection Log is overwritten.

The Transaction Log is recorded in areas 1520 and 1521. Although the Transaction Log is information to be updated in the Usage Pass transfer process, the content recorded is different from that in the case of the UT mode. In the BT mode, the following are recorded as the Transaction Log. That is, the UPID of the transfer object Usage Pass, the kind of the transfer (whether itself is the transfer source of the Usage Pass or the transfer destination), UR_s before the transfer is executed (only in the case where the Primal Device is the transfer destination of the Usage Pass), Usage Pass before the transfer is executed (only in the case where the Primal Device is the transfer source of the Usage Pass), an address where the Usage Pass is recorded (only in the case where the Primal Device is the transfer source), or an address of the recording destination (only in the case where the Primal Device is the transfer destination of the Usage Pass) is recorded at the time when the Usage Pass transfer is executed. This data is recorded when the Usage Pass transfer is performed, so that even in the case where the Usage Pass is lost from both the transfer source and the transfer destination by an unexpected accident or the like, it can be recovered. The timings when the data is recorded will be described in detail when the Usage Pass transfer process is specifically described by use of FIG. 23, FIG. 24, FIG. 26 and FIG. 27.

Structure of Protected Information Area in Usage Pass Transfer Module

Figure 16:
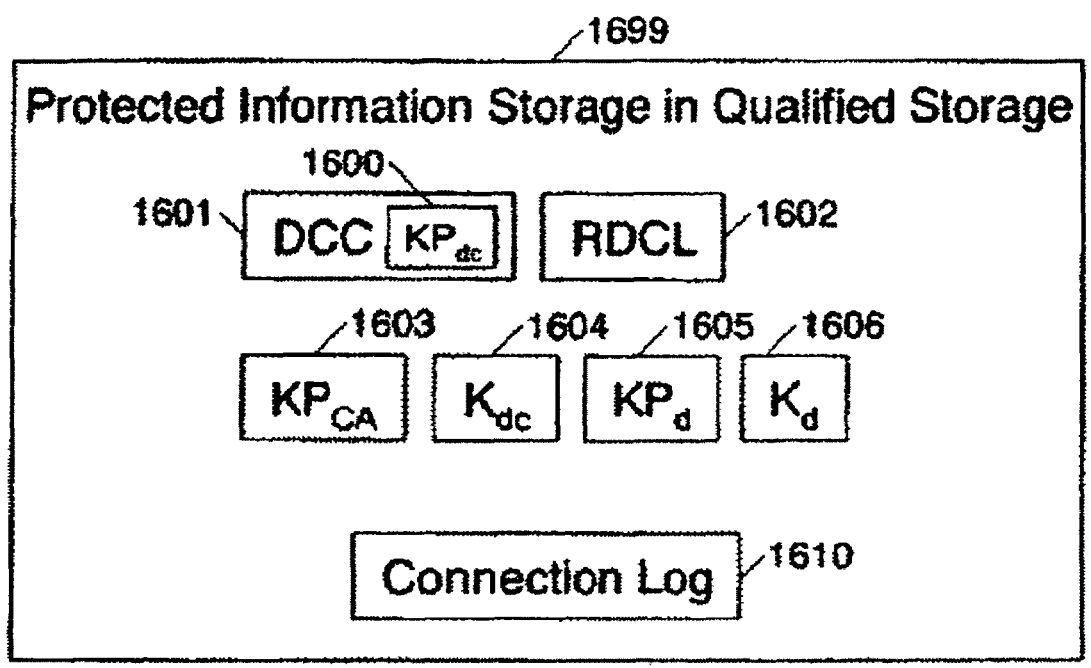
FIG. 16—A view showing a static storage area having tamper resistant features, which is used in UT mode in the magnetic disk device and in which secret information, such as a certificate, a public key, a private key, and log information of mutual authentication, is recorded.

The structure of the protected information area for the BT mode in the magnetic disk device will be described by use of FIG. 16.

As described before, the BT mode is a system contrived such that independently of the direction of transfer of the Usage Pass, the Host Security Manager 111 as a whole always becomes the Primal Device, and the magnetic disk device always becomes the Inceptive Device, and the Usage Pass transfer can be executed in both directions.

As shown in the drawing, data recorded in the protected information area provided in the Usage Pass transfer module is equal to the data recorded in the Host Security Manager 111 except for the Transaction Log. That is, 1601 denotes a Device Class certificate including a Device Class Public Key 1600, 1603 denotes a certificate authority public key, 1604 denotes a Device Class Private Key, 1605 denotes a Device public key, 1606 denotes a Device Private Key, and 1610 denotes a recording area of Connection Log.

Besides, as shown in the drawing, the protected information area in the qualified storage 223 is not provided with a recording area of Transaction Log. This means that at the time of execution of the Usage Pass transfer, the magnetic disk device does not perform recording of the Transaction Log. There is a feature that since the recording process of the log is not performed, the process load of the magnetic disk device at the time of the Usage Pass transfer in the BT mode becomes low as compared with that in the UT mode.

The certificate and key information are embedded at the time of initial mounting and are not updated later, and the Connection Log is updated in the mutual authentication process performed between devices which attempt to execute the Usage Pass transfer, and the points as stated above are the same as those of the protected information area 101 in the Host Security Manager 111.

Next, the details of the mutual authentication process and the Usage Pass transfer process performed among three parties of the Host Module 110, the Primal Device and the Inceptive Device will be described with reference to FIG. 17 to FIG. 27. These drawings show commands issued by the Host Module, data accompanying those and flowing through the data bus, and processes and functions required in the respective devices or modules to receive or send the commands and data and to execute mutual authentication or Usage Pass transfer.

Setting Process of Usage Pass Transfer Mode

Figure 17:
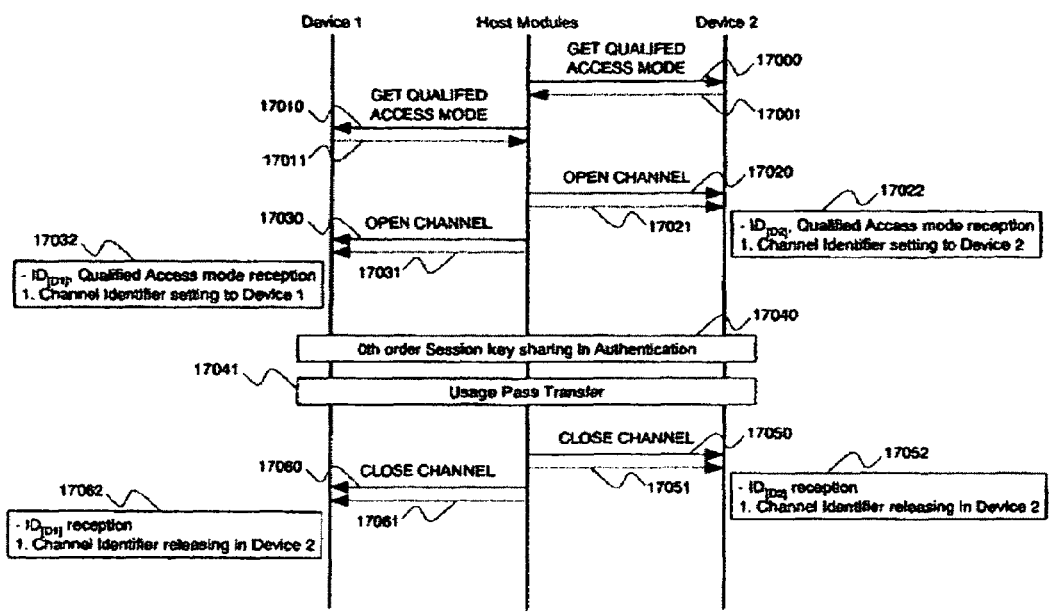
FIG. 17—A view showing a process sequence for access mode recognition and setting in Usage Pass transfer process of an embodiment.

In order to execute the Usage Pass transfer, first, it is necessary to set that in the form of mediation of the Host Module 110, the Usage Pass transfer is executed in which of systems of the UT mode and the BT mode with respect to the detachable and attachable storage device 125, 126 connected to itself and the Host Security Manager 111 provided in itself. FIG. 17 shows the processes and functions requested in the respective devices or modules in order to realize this from the viewpoint of commands issued by the Host Module and the flow of data accompanying those.

Incidentally, in FIG. 17, interfaces of two Devices connected through the Host Module are denoted by a Device 1 Interface and a Device 2 Interface for convenience. In the case where the Device 1 or the Device 2 is the recorder/player, it is a module in the Host Security Manager 630 or 1230, and in the case of the storage device, the Storage Interface Unit corresponds thereto.

First, the Host Module issues GET QUALIFIED ACCESS MODE command 17000 to the Device 2. On the other hand, the Device 2 issues a response 17001 to the Host Module 110 to notify whether it has one of or both of a function to execute the Usage Pass transfer in the UT mode and a function to execute the Usage Pass transfer in the BT mode.

Next, the Host Module 110 issues similar command 17010 to the Device 1 as well. Similarly to the Device 2, the Device 1 issues a response 17011 to the Host Module 110 to notify whether it has one of or both of a function to execute the Usage Pass transfer in the UT mode and a function to execute the Usage Pass transfer in the BT mode.

In this way, the Host Module 110 can know the kind of the Usage Pass transfer mode mounted in each of the Device 2 and the Device 1, and the Host Module 110 selects the modes mounted in both the Devices, and sets the modes in both the devices. OPEN CHANNEL command 17020 is for setting them in the Device 2, and OPEN CHANNEL command 17030 is for setting them in the Device 1. With these commands, that the Usage Pass transfer is executed in which qualified access mode, and identifiers to make plural transfer processes separable when they are executed simultaneously and in parallel are sent to both the Devices by data 17021 and data 17031. In the following, the identifier will be called a Channel identifier. In FIG. 17, a Channel identifier which is set for the Device 1 is denoted by ID_[D1], and a Channel identifier which is set for the Device 2 is denoted by ID_[D2]

Here, the words "simultaneously and in parallel" mean, for example, a status as follows. In the case where Usage Pass transfer is executed after the authentication is established, a channel ID is specified, and the transfer is performed only under the channel ID. Especially, in the case of the UT mode, in the case where reading is performed while writing is performed to the Device 2 (magnetic disk device), there is a case where commands issued by the Host Module become interleaved.

The description will be returned to FIG. 17. The Channel identifier is specifically used as follows.

For example, it is assumed that only one detachable and attachable storage device is connected to the recorder/player. In such a state, in the case where, while writing of the Usage Pass is performed in the UT mode from the recording module 102 to the storage device (125, for example, and the same applies hereinafter), reading of the already recorded Usage Pass is similarly performed in the UT mode from the storage Device 125 to the playback module 103, it is necessary to enable the storage Device 125 to separate the respective Usage Pass transfer processes and to manage them. Different Channel identifiers are assigned to the two process series, so that the detachable and attachable storage device can determine that the command sent from the Host Module 110 is relevant to which of the process series.

When receiving data 17021 and 17031, the Device 2 and the Device 1 execute processes to set Channel identifiers and qualified access modes related to the identifiers in 17022 and 17032.

When the Channel identifiers and the qualified access modes are set, a mutual authentication process 17040 and an actual Usage Pass transfer process 17041 subsequent thereto are executed between the Device 1 and the Device 2. The details of these will be described later in detail by use of FIG. 18 to FIG. 27.

When the required Usage Pass transfer process is ended, the Host Module 110 issues CLOSE CHANNEL commands 17050 and 17060 to the Device 2 and the Device 1, respectively. With the commands, Channel identifiers 17051 and 17061 are sent to the respective devices. When receiving the commands, the respective devices reset the state information relating to the process series specified by the Channel identifiers received subsequently to the commands, and open also the Channel identifiers. When the Channel identifier is once opened, unless a Channel identifier and a qualified access mode are again set by the OPEN CHANNEL command, even if the Channel identifier is specified in the command issued by the Host Module in order to execute the authentication process or Usage Pass transfer, the Device aborts the process relating to the command.

Sharing Method of Shared Device Public Key Through Public Key Encryption

Before the detailed process sequence relating to the mutual authentication and Usage Pass transfer is described, the method of public key encryption used in the embodiments of the invention will be described.

In this embodiment, as a method of public key encryption, an elliptic curve cryptosystem is used. The elliptic curve cryptosystem is such that with respect to a fixed point (this will be called a base point $G=(Gx, Gy)$) on a curved line expressed by an equation of a two-dimensional elliptical curve, the n-times point, that is, an operation to repeat the addition of G n times is used at the encryption. The addition method used here is different from the normal addition system of the decimal number system, and the result obtained by repeating the addition of G integer times becomes a point on the elliptical curve different from G.

Two Devices of Device 1 and Device 2 are supposed in the description. Then, it is assumed that a message M to be encrypted is recorded in the Device 1, and a private key KPr paired with a public key KPu is recorded in the Device 2. Here, KPr is a natural number, KPu is a coordinate point (KPux, KPuy) on an elliptic curve, and both and the base point are connected by the relation of $KPu=KPr\times G$. In other words, KPu is a point obtained by repeating the addition of the base point KPr times.

First, the encryption process in the Device 1 will be described.

(E1) KPu is sent from the Device 2 to the Device 1.
(E2) A random natural number r is created in the Device 1.
(E3) $r\times G=R=(Rx, Ry)$ is calculated.
(E4) $r\times KPu=P=(Px, Py)$ is calculated.
(E5) A natural number *KPu is created by using Px and Py: *KPu=f(Px, Py). Here, the function f may be arbitrary in case it is previously determined.
(E6) *KPu is used as a symmetric key, and the message M as an encryption object is symmetrically encrypted: E(*KPu, M)
(E7) Data obtained in (6) is concatenated with data obtained in (3), and is sent to the Device 2. The data to be sent is Rx∥Ry∥E(*Kpu, M). Here, *KPu will be called a Shared Device Public Key.

Next, the decryption process in the Device 2 will be described.

(D1) Rx, Ry and KPr are used to calculate P: $KPr\times R=KPr\times r\times G=r\times(KPr\times G)=r\times KPu=P=(Px, Py)$
(D2) Px and Py are used to obtain *KPr. Here, *KPr and *KPu are quite the same number. The former is expressed as *KPr in the meaning that it is obtained by using KPr: *KPr=f(Px, Py)
(D3) $r\times KPu=P=(Px, Py)$ is obtained.
(D4) *KPr is used as a symmetric key, and received data is symmetrically decrypted: D(*KPr, E(*KPu, M)). In embodiments of the invention, this is denoted as D(KPr, E(KPu, M)). Here, *KPr will be called a Shared Device Private Key.

The algorithm to share the symmetric keys KPu and KPr as described above is generally called ECDH algorithm.

Incidentally, in the present specification, the encryption to perform all of the process E2 to the process E7 is denoted as E(KPu, M). In the case where *KPu is already obtained and only the process E6 is performed, it is denoted as E(*KPu, M). Similarly, decryption to perform all of the process D1 to the process D4 is denoted as D(KPr, E(KPu, M)). In the case where *KPr is already obtained and only the process D4 is performed, it is denoted as D(*KPr, E(*KPu, M)).

Description Relating to Abbreviations Appearing in FIG. 18 to FIG. 32

FIG. 18 to FIG. 27 show a mutual authentication process sequence in the UT mode and the BT mode and a Usage Pass transfer process sequence, and FIG. 28 to FIG. 32 show a read and write sequence of data with a copy condition, which is the essence of the embodiments of the invention. In these drawings, as abbreviations, the following notation is used.

ID: Usage Pass Identifier (identifier)
DCC: Device Class Certificate
PD.C.key: Challenge key created by Primal Device
ID.C.Key: Challenge key created by Inceptive Device
PD.S.key: Session key created by Primal Device
ID.S.key: Session key created by Inceptive Device
RDCL: Revoked Device Class List
UP: Usage Pass
UPL: Abbreviation of Usage Pass Location, and the address of Usage Pass recorded in Primal Device or to be recorded in Inceptive Device. Since methods of addressing are different among various equipments, they are not specified here.
MUP: Masked Usage Pass. What is obtained by concatenating Usage Pass Status with Usage Pass in which a portion of a content key in Usage Pass is replaced by 0.
AI: Action Indicator. It indicates which command of ENCRYPT USAGE PASS COPY/MOVE/PLAY is received. The details will be described in the description of FIG. 19, FIG. 23 and FIG. 24.
CKS: Checksum. When data is transferred from one Device to the other Device, it is concatenated with the data at the transfer source for the purpose of ensuring completeness of the data. The details will be described in the description of FIG. 19, FIG. 23 and FIG. 24.
TL: Transaction Log
CL: Connection Log
TS_UT: Transaction Status used in the UT mode. The details will be described in the description of FIG. 21.
TS_BT: Transaction Status used in the BT mode. The details will be described in the description of FIG. 21.
Status:
SS: Session Status. This is a stage of a transfer process of Usage Pass. The details will be described in the description of FIG. 21.
UPS: Usage Pass Status. This is a state of recorded Usage Pass, which is known as a result of search for Usage Pass or reading. This is the same as the value indicated in the effectiveness indication flag in FIG. 10. There are three states of effectiveness, ineffectiveness and non-record.

In FIG. 18 to FIG. 27, entities of receiving commands or data sent by Host Modules are simply designated as Primal Device and Inceptive Device. This is the same as that described in FIG. 17, and in the case where the Primal Device or the Inceptive Device is the recorder/player, it is a module in the Host Security Manager 630 or 1230, and in the case of the storage device, the Storage Interface Unit corresponds to these.

Mutual Authentication Process Sequence Between Devices in UT Mode

The process sequence in the case where mutual authentication is performed between the Primal Device and the Inceptive Device in the UT mode will be described by use of FIG. 18.

Incidentally, the mutual authentication process stage in the UT mode is hereinafter called a UT Connection Stage. The Usage Pass is transferred between two detachable and attachable storage devices in such a case that the Primal Device is the module 500 in the storage Device 125, and the Inceptive Device is the module 502 in the storage Device 126. In the case where the Usage Pass newly created in the recording module or the like is recorded in the detachable and attachable storage device, the Primal Device is the module 600, and the Inceptive Device is the module 502. In the case where the Usage Pass recorded in the magnetic disk device is sent to the playback module, and decryption or playback of content data is performed, the Primal Device is the module 500, and the Inceptive Device is the module 702. The relation of these is the same also in the description of the respective process sequences in the UT mode in FIG. 19 to FIG. 21.

First, the Host Module issues GET DEVICE CLASS CERTIFICATE command 18000 to the Inceptive Device. Then, the Inceptive Device sends a Device Class certificate embedded in itself to the Host Module 110 (18001). The Device Class certificate will be hereinafter designated as DCC (K_CA, KP_dc[1]). This represents that the certificate indicates the validity of KP_dc[1]), and an electronic signature part is encrypted by using K_CA.

When receiving DCC(K_CA, KP_dc[1]), the Host Module 110 issues VERIFY DEVICE CLASS CERTIFICATE command 18010 to the Primal Device, and next sends DCC (K_CA, KP_dc[1]) to the Primal Device (18012).

When receiving DCC(K_CA, KP_dc[1]), the Primal Device executes one process (process UT1.1.1) indicated by 18012.

Process UT1.1.1: Verification of DCC(K_CA, KP_dc[1]) is performed. The verification is achieved by inspecting whether or not falsification is made on the data in the certificate, and whether or not the number to specify the included certificate is put on RDCL_[P] recorded in itself. The presence or absence of the falsification is determined in such a manner that after the Hash value of data except the electronic signature part including KP_dc[1] is calculated, a check is made whether it is consistent with the result obtained by decrypting the electronic signature part in DCC(K_CA, KP_dc[1]) by KP_CA. In the case where both are consistent with each other, no falsification is made. In the case where the number to specify the certificate is put on RDCL_[P], the authentication process is aborted.

When the Primal Device is verifying DCC(K_CA, KP_dc [1]), the Host Module 110 estimates a timing when the process is ended, and issues GET PRIMAL CHALLENGE KEY UT CONNECTION command 18020 to the Primal Device. When receiving the command, the Primal Device executes the following three processes indicated by 18021.

Process UT1.2.1: Challenge key K_ch[P] is created.
Process UT1.2.2: K_ch[P] created in process UT1.2.1 is encrypted with KP_dc[1] in DCC(K_CA, KP_dc[1]. The obtained data is E(KP_dc[1], K_ch[P]).
Process UT1.2.3: The Device Class certificate embedded in itself is concatenated with the data obtained by process UT1.2.2. The obtained data is E(KP_dc[1], K_ch[P])||DCC (K_CA, KP_dc[P]).

When the creation of E(KP_dc[1], K_ch[P])||DCC(K_CA, KP_dc[P]) is ended in process UT1.2.3, the Primal Device sends the data to the Host Module (18022).

When receiving E(KP_dc[1], K_ch[P])||DCC(K_CA, KP_dc[P]), the Host Module issues PUT PRIMAL CHALLENGE KEY UT CONNECTION command 18030 to the Inceptive Device, and then sends the received data to the Inceptive Device (18031).

When receiving E(KP_dc[1], K_ch[P])||DCC(K_CA, KP_dc[P]), the Inceptive Device executes the following three processes indicated by 18032.

Process UT1.3.1: DCC(K_CA, KP_dc[P]) is verified. Verification means is the same as the method described in process UT1.0.1. However, RDCL to be referred to is RDCL__[1]

Process 1.3.2: E(KP_dc[1], K_ch[P]) is extracted from the received data and is decrypted. The decryption is performed by using K_dc[1] embedded in its own protected information area.

Process 1.3.3: As a result of process UT1.3.2, it is confirmed whether K_ch[P] has been included in a valid form. The confirmation is performed as follows. First, in process UT1.3.2, it is previously regulated that when K_ch[P] is encrypted, an intrinsic number is concatenated with K_ch[P] and the encryption is performed. Then, when the data received in process UT1.3.2 is decrypted, when the regulated number is obtained in the result, it is determined that the corruption or the like of the data is not caused.

During the execution from process UT1.3.1 to process UT1.3.3, the Host Module 110 estimates a timing when the process is ended, and issues GET INCEPTIVE SESSION KEY UT CONNECTION command 18040 at a suitable timing. When receiving the command, the Inceptive Device executes the following two processes indicated by 18041.

Process UT1.4.1: 0th-order Session Key K_s[1]0 is created.

Process UT1.4.2: K_s[1]0 created in process UT1.4.1 is concatenated with Device public key KP_d[1] embedded in itself, and is encrypt with KP_dc[P] received in process UT1.3.1. The data obtained by the encryption is concatenated with RDCL__[1] recorded in itself, a Checksum of the whole obtained data is calculated, and the Checksum is concatenated with the data. Then, the whole obtained data is encrypted with K_ch[P] obtained in process UT1.3.3. The finally obtained data is E(K_ch[P], E(KP_dc[P], K_s[1]0∥KP_d[1])∥RDCL__[1]∥CKS).

In the Inceptive Device, when E(K_ch[P], E(KP_dc[P], K_s[1]0∥KP_d[1])∥RDCL__[1]∥CKS) is created, the device sends the created data to the Host Module (18042).

When receiving E(K_ch[P], E(KP_dc[P], K_s[1]0∥KP_d[1])∥RDCL__[1]∥CKS), the Host Module issues PUT INCEPTIVE SESSION KEY UT CONNECTION command 18050 to the Primal Device, and then sends the received data to the Primal Device (18051).

When receiving E(K_ch[P], E(KP_dc[P], K_s[1]∥KP_d[1])∥RDCL__[1]∥CKS), the Primal Device executes the following five processes indicated by 18052.

Process UT1.5.1: The received data is decrypted with K_ch[P]. K_ch[P] is a key created by itself in process UT1.2.1.

Process UT1.5.2: RDCL__[1] is separated from the result of process UT1.5.1, and it is confirmed whether RDCL__[1] has been included in the valid form. Means for confirmation is the same as the structure confirmation by the Checksum calculation and that described in process UT1.3.3.

Process UT1.5.3: With respect to RDCL_[P] recorded in itself and the sent RDCL__[1], issue date information of those are compared with each other. It is assumed that the issue date information of RDCL is included in RDCL. As a result of the comparison, in the case where the issue date information of the received RDCL__[1] is newer than the issue date information of RDCL_[P] recorded in itself, RDCL_[P] is overwritten by RDCL__[1]

Process UT1.5.4: The remaining data E(KP_dc[P], K_s[1]0∥KP_d[1]) is decrypted with K_dc[P].

Process UT1.5.5: With respect to the data obtained by process UT1.5.4, it is confirmed whether K_s[1]0∥KP_d[1] has been included in the valid form. Means for confirmation is the same as that described in process UT1.3.3.

When the Primal Device is executing process UT1.5.1 to process UT1.5.5, the Host Module estimates a timing when the process is ended, and issues GET PRIMAL SESSION KEY UT CONNECTION command 18061 at a suitable timing. When receiving the command, the Primal Device executes the following two processes indicated by 18061.

Process UT1.6.1: 0th-order Session Key K_s[P]0 is created.

Process UT1.6.2: K_s[P]0 created in process UT1.6.1 is encrypted with the 0th-order Session Key K_s[1]0 received in process UT1.5.5. The obtained data is E(K_s[1]0, K_s[P]0). Here, as a result of the comparison of the issue date information of RDCL_[P] and RDCL__[1] in process UT1.5.3, in the case where the issue date of RDCL_[P] is newer, RDCL_[P] is concatenated with E(K_s[1]0, K_s[P]0), and further, a Checksum of the whole obtained data is calculated and is concatenated. Thereafter, the whole obtained data is encrypted with KP_d[1] obtained in process UT1.5.5. The finally obtained data is E(K_Pd[1], E(K_s[1]0, K_s[P]0∥KP_d[P])∥RDCL_[P] ∥CKS).

In the Primal Device, when creation of E(K_Pd[1], E(K_s[1]0, K_s[P]0∥KP_d[P])∥RDCL_[P]∥CKS) is ended, the Device sends the data to the Host Module 110 (18062).

When receiving E(K_Pd[1], E(K_s[1]0, K_s [P]0∥KP_d[P])∥RDCL_[P]∥CKS), the Host Module 110 issues PUT PRIMAL SESSION KEY UT CONNECTION command 18070 to the Inceptive Device, and then sends the received data to the Device (18071).

When receiving E(K_Pd[1], E(K_s[1]0, K_s[P]0∥KP_d[P])∥RDCL_[P]∥CKS), the Inceptive Device executes the following five processes indicated by 18072.

Process UT1.7.1: The received data is decrypted with K_d[1]. K_d[1] is embedded in its own protected information area.

Process UT1.7.2: In the case where RDCL_[P] is included in the result of process UT1.7.1, the data is separated, and it is confirmed whether the data has been included in the valid form. Means for confirmation is the same as the structure confirmation by the Checksum calculation and that described in process UT1.3.3.

Process UT1.7.3: As a result of process UT1.7.1 and process UT1.7.2, in the case where RDCL_P] is included in the received data and confirmation can be made that it has been included in the valid form, RDCL__1] recorded in itself is overwritten by the received RDCL_P].

Process UT1.7.4: The remaining data E(K__[1]0, K_[P]0) is decrypted with K__[1]0. K__[1]0 is the key data created by itself in process UT1.4.1.

Process UT1.7.5: With respect to the data obtained in process UT1.7.4, it is confirmed whether K_[P]0 has been included in the valid form. Means for confirmation is the same as that described in process UT1.3.3.

When the processes up to process UT1.7.5 are completed, sharing of Shared Device Public Key *KP_d[1] (identical to Shared Device Private Key *K_d[1]), K_s[P]0 and K_s[1]0 is completed.

Usage Pass Transfer Process Sequence Between Devices in UT Mode

When the mutual authentication between the Primal Device and the Inceptive Device is completed in the UT mode, the Usage Pass can be transferred from the Primal Device to the Inceptive Device. Next, the transfer process sequence of the Usage Pass will be described by use of FIG. 19. Incidentally, the Usage Pass transfer process stage in the UT mode will be hereinafter called a UT Transfer Stage.

First, the Host Module 110 issues READ USAGE PASS command 19000 to the Primal Device. Subsequently to the command, a place where the Usage Pass is recorded and the number of Usage Passes to be read are notified to the Primal Device in 19001. When receiving the command and the information as to the place where the Usage Pass is recorded and the number of Usage Passes to be read, the Primal Device executes the following process indicated by 19002.

Process UT2.1.1: The Usage Pass of a transfer object is prepared in the Usage Pass sending module. For example, in the case where the Primal Device is the magnetic disk device, it corresponds to such a process as to send the objective Usage Pass from the qualified storage 223 into the module 501 through the Usage Pass buffer 510. Similarly, in the case where the Primal Device is the recording module, it corresponds to such a process as to send the objective Usage Pass from the Usage Pass Creator and Content Encrypter 606 to the module 601.

When the objective Usage Pass is prepared in the Usage Pass sending module, the Host Module 110 issues GET MASKED USAGE PASS command 19010 to the Primal Device. When receiving this command, the Primal Device creates Masked Usage Pass, and sends the data to the Host Module 110 in 19011. As described before, the Masked Usage Pass is obtained by concatenating Usage Pass Status with what is obtained by replacing the content key data portion in the Usage Pass by 0. When receiving the Masked Usage Pass, the Host Module 110 analyses UR_s in the data, and determines whether the Usage Pass read in the Usage Pass sending module can be transferred. In the case where it is determined that the transfer can be performed, the subsequent Usage Pass transfer process is continued.

In the case where the Usage Pass transfer process is continued, next, the Host Module 110 issues CREATE INCEPTIVE DEVICE SESSION KEY UT TRANSFER command 19020 to the Inceptive Device. Subsequently to the command, the Usage Pass identifier of the Usage Pass as the transfer object is sent to the Inceptive Device (19021). When receiving the Usage Pass identifier of the reception object Usage Pass, the Inceptive Device executes the following three processes indicated by 19022.

Process UT2.2.1: Session key $K\_s[1]n$ is created. The Session Key is a symmetric key created each time the Usage Pass transfer is performed, and in that meaning, n means that it is created for the nth Usage Pass transfer. Where, $n \geq 1$ is established.

Process UT2.2.2: Transaction Log is created. The Usage Pass identifier of the transfer object Usage Pass and the Session Key $K\_s[1]n$ created in process UT2.2.1, and the Session Status are recorded here. For an element, in the meaning that preparation of reception of the Usage Pass is completed, RP (Receive Prepared) is set. For a remaining element, U (Unspecified) is recorded.

Process UT2.2.3: $K\_s[1]n$ created in process UT2.2.1 is encrypted by using the Session Key $K\_s[1]n-1$ created at the time of the immediately preceding Usage Pass transfer execution and the 0th-order Session Key $K\_s[P]0$ created in the Primal Device in the Connection Stage. In the case where the Usage Pass transfer has never performed before this process, the 0th-order Session Key created by itself in process UT1.4.1 in the Connection Stage is used. The obtained data is $E(K\_s[P]0, E(K\_s[1]n-1, K\_s[1]n))$.

When the Inceptive Device is executing process UT2.2.1 and process UT2.2.2, the Host Module estimates a timing when the process is ended, and issues GET INCEPTIVE DEVICE SESSION KEY UT TRANSFER command 19030 at a suitable timing. When receiving this command, the Inceptive Device sends the data created in process UT2.2.3 to the Host Module 110 (19031).

When receiving $E(K\_s[P]0, E(K\_s\{1\}n-1, K\_s[1]n))$, the Host Module 110 issues PUT INCEPTIVE SESSION KEY UT TRANSFER command 19040 to the Primal Device, and then concatenates the Usage Pass identifier with the received data, and sends them to the Primal Device (19041). The data to be sent is $UPID\|E(K\_s[P]0, E(K\_s[1]n-1, K\_s[1]n))$.

When receiving $UPID\|E(K\_s[P]0, E(K\_s[1]n-1, K\_s[1]n))$, the Primal Device executes the following five processes indicated by 19042.

Process UT2.3.1: It is checked whether the received UPID is consistent with the UPID of the Usage Pass prepared in the Usage Pass sending module in process UT2.1.1. When they are not consistent with each other, the Usage Pass transfer process is aborted here.

Process UT2.3.2: The received data is decrypted with $K\_s[P]0$ and $K\_s[1]n-1$. $K\_s[P]0$ is created by itself in process UT1.6.1, and $K\_s[1]n-1$ is the same as that described in process UT2.2.3.

Process UT2.3.3: With respect to the data obtained in process UT2.3.2, it is confirmed whether $K\_s[1]n$ has been included in the valid form. Means for confirmation is the same as that described in process UT1.3.3.

Process UT2.3.4: Transaction Log is created. The Usage Pass identifier of the transfer object Usage Pass, Type Map included in the Device Class certificate of the Inceptive Device obtained in process UT1.1.1, the Session Key $K\_s[1]n$ obtained in process UT2.3.3, Session Status, UR_s of the transfer object Usage Pass, and Usage Pass Location of the Usage Pass read in process UT2.1.1 are recorded here. In the meaning that preparation of sending the Usage Pass is completed, SP (Send Prepared) is set in the Session Status.

When the Primal Device is executing process UT2.3.1 to process UT2.3.4, the Host Module estimates a timing when the process is ended, and issues ENCRYPT USAGE PASS COPY or ENCRYPT USAGE PASS MOVE or ENCRYPT USAGE PASS PLAY command 19050 at a suitable timing. Incidentally, as to which Usage Pass of UR_s is sent in a case where which command is received, and how UR_s of Usage Pass remaining in the Primal Device must be modified in the case of copy or playback, it is assumed that all such things are regulated in advance. Then, when receiving the command, the Primal Device executes the following two processes indicated by 19051.

Process UT2.4.1: Usage Pass to be sent to the Inceptive Device is created based on the Usage Pass prepared in the Usage Pass sending module in process UT2.1.1. In general, UPID, K_c and the like are copied as they are, and only UR_s is modified in accordance with the regulation.

Process UT2.4.2: An identifier information Action Indicator to indicate that for the sending Usage Pass created in process UT2.4.1, the received command is which of ENCRYPT USAGE PASS COPY/MOVE/PLAY, and a Checksum on Usage Pass‖Action Indicator are calculated and concatenated. After the concatenation process, the obtained data is encrypted by using $K\_s[1]n$ and $*KP\_d[1]$). That is, double encryption with the symmetric key is performed. The obtained data is $E(*KP\_d[1]. E(K\_s[1]n, Usage Pass\|Action Indicator\|Checksum))$. Incidentally, the calculation of the Checksum may be performed as follows.

First, Usage Pass‖Action Indicator of calculation object data is divided at intervals of fixed length. After all obtained block data are added, all bit values are inverted, and further, 1 is added. This is identical to obtaining the two's complement of Usage Pass‖Action Indicator. At the time of verification, after the whole data Usage Pass||Action Indicator||Checksum including the Checksum is divided at intervals of the same fixed length as the above one, all block data are added. When the result becomes 0, the data is not modified halfway.

When the Primal Device is executing process UT2.4.1 and process UT2.4.2, the Host Module 110 estimates a timing when the process is ended, and issues GET USAGE PASS command 19060 at a suitable timing. When receiving the command, the Primal Device executes the following three processes as indicated by 19062.

Process UT2.5.1: Session Status in Transaction Log is updated. When sending of the Usage Pass is completed, the Session Status is set to SC (Send Completed).

Process UT2.5.2: The data E(*KP_d[1], E(K_s[1]n, Usage Pass||Action Indicator||Checksum)) created in process 2.4.2 is sent to the Host Module.

Process UT2.5.3: UR_s in the original Usage Pass is modified in accordance with the regulation. In the case where the Primal Device is the magnetic disk device, the Usage Pass in which UR_s is modified is overwritten in the place where the Usage Pass is originally recorded in the qualified storage unit. Incidentally, in the case where the command 19050 is ENCRYPT USAGE PASS MOVE, the value of the effectiveness indication flag is made "ineffectiveness".

When receiving E(*KP_d[1], E(K_s[1]n, Usage Pass||Action Indicator||Checksum)), the Host Module 110 issues PUT USAGE PASS command 19070 to the Inceptive Device, and sends E(*KP_d[1], E(K_s[1]n, Usage Pass||Action Indicator||Checksum)) to the Device (19071). When receiving the command and the data, the Inceptive Device executes the following three processes indicated by 19072.

Process UT2.5.1: The received data is decrypted with *k_d [1] and K_s[1]n. *k_d[1] is a symmetric key obtained in process UT1.7.1. K_s[1]n is a Session Key created by itself in process UT2.2.1.

Process UT2.5.2: With respect to the data obtained in process UT2.5.1, it is confirmed whether Usage Pass||Action Indicator||Checksum has been included in the valid form. The confirmation is performed by verifying the Checksum and by use of means described in process UT1.3.3. The verification method by the Checksum is described in process UT2.4.2.

Process UT2.5.3: The Session Status and the Usage Pass Location in the Transaction Log are updated. RC (Receive Completed) to indicate that the reception of the Usage Pass is completed is set in the Session Status. The record destination address of the Usage Pass is written in the Usage Pass Location.

Incidentally, in the case where the Inceptive Device is the magnetic disk device, after process UT2.5.3, the received Usage Pass is recorded in the qualified storage 223. When the Usage Pass is recorded, the effectiveness indication flag is set to "effectiveness".

Thereafter, in order to confirm whether the reception of the Usage Pass in the Inceptive Device or the recording in the qualified storage 223 has been normally ended, the Host Module 110 may issue CHECK EXECUTION STATUS command 19080 to the Inceptive Device. An execution status is sent in 19081 from the Inceptive Device to the Host Module. As stated above, by repeating the UT Transfer Stage, even if the Connection Stage is not repeated, the Usage Pass transfer can be continuously executed.

Mutual Re-Authentication Process Sequence Between Devices in UT Mode

At least one UT Transfer Stage is performed between the Primal Device and the Inceptive Device, and after sharing of the Session Key K_s[1]n between both the Devices and recording of the key into the Transaction Log are ended, in the case where an abnormality occurs in the recorder/player and the Session Key is lost from the Usage Pass sending module and the receiving module, mutual authentication can be again completed by a small number of processes as compared with the Connection Stage.

Figure 20:
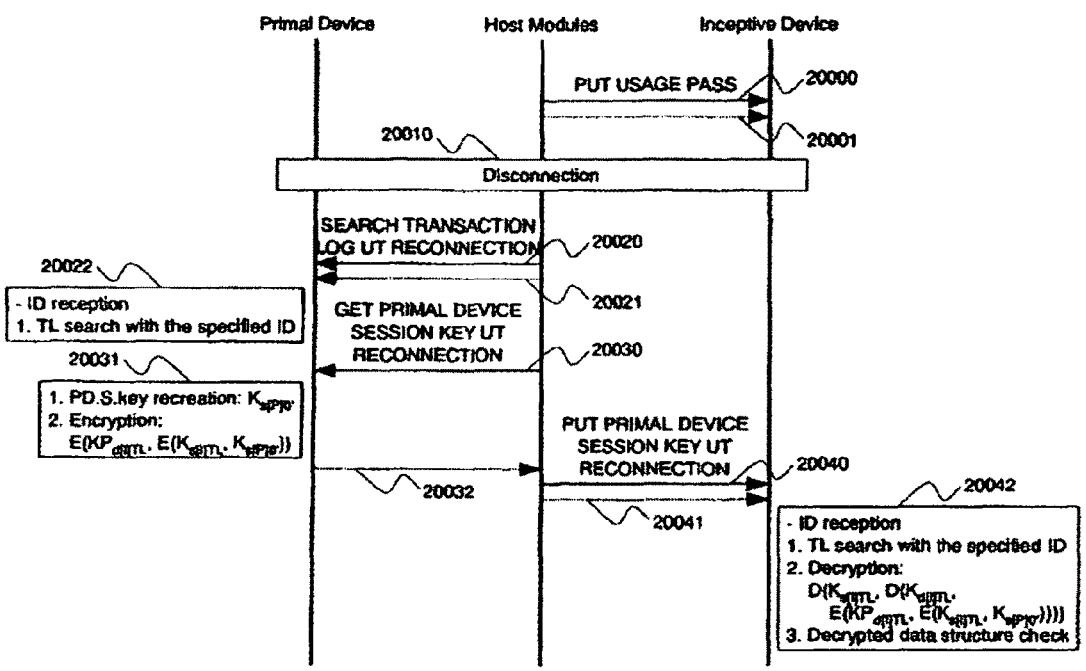
FIG. 20—A view showing a simplified mutual re-authentication process sequence performed between the recorder/player and the magnetic disk device in accordance with UT mode in an embodiment.

Next, the mutual re-authentication process will be described by use of FIG. 20. Incidentally, this process stage in the UT mode will be hereinafter called a UT Reconnection Stage.

First, it is supposed that a situation is such that in the UT Transfer Stage, the Inceptive Device receives PUT USAGE PASS command 20000 and Usage Pass 20001 subsequently thereto. Then, it is assumed that before the reception process of the Usage Pass is completely completed, separation occurs between the Primal Device and the Inceptive Device due to the occurrence of an abnormality, and the Session Key K_s[1] and the Shared Device Public Key *KP_d[1] used for encryption of the Usage Pass flowing in 20001 are lost from both the Devices (20010).

In the above case, the Host Module 110 first issues SEARCH TRANSACTION LOG RECONNECTION command 20020 to the Primal Device. And subsequently to the command, the Usage Pass identifier of the usage Pass that was being sent in 20001 is sent (20021).

When receiving the identifier, the Primal Device executes the following one process indicated by 20022.

Process 3.1.1: In the protected information area, a search is made for Transaction Log in which the same identifier value as the identifier is recorded.

When process UT3.1.1 is being executed, the Host Module 110 estimates a timing when the process is ended, and issues GET PRIMAL SESSION KEY UT RECONNECTION command 20030 at a suitable timing. When receiving the command, the Primal Device executes the following two processes shown in 20031.

Process UT3.2.1: A new 0th-order Session Key K_s[P]0' is created.

Process UT3.2.2: K_s[P]0' created in process UT3.2.1 is encrypted with the Session Key K_s[1]TL recorded in its own Transaction Log found in process UT3.1.1 and the Device Public Key KP_d[1]TL. The key K_s[1]TL and KP_d[1]TL indicate that they are the key data recorded in Transaction Log. The finally obtained data is E(KP_d[1]TL, E(K_s[1]TL, K_s[P]0')).

When the encryption in process UT3.2.2 is ended, the Primal Device sends the encrypted data to the Host Module (20032).

When receiving E(KP_d[1]TL, E(K_s[1]TL, K_s[P]0')), the Host Module 110 issues PUT PRIMAL SESSION KEY UT RECONNECTION command 20040 to the Inceptive Device, and then concatenates the received data with the same identifier as the Usage Pass identifier sent to the Primal Device in 20021, and sends them to the Inceptive Device (20041).

When receiving E(KP_d[1]TL, E(K_s[1]TL, K_s[P]0')), the Inceptive Device executes the following three processes indicated by 20042.

Process UT3.3.1: In the protected information area, a search is made for Transaction Log in which the same identifier value as the identifier is recorded.

Process UT3.3.2: The received data is decrypted. The decryption is K_d[1] embedded in its own protected information area and Session Key K_s[1]TL included in the Transaction Log found in process UT3.3.1.

Process UT3.3.3: As a result of process UT3.3.2, it is confirmed whether Ks[P]0' has been included in the valid form. Means for confirmation is the same as that described in process UT1.3.3.

When process UT3.3.2 is completed, sharing of *KP_d[1] (identical to *K_d[1]) and K_s[P]0' is completed. In the case where UT Transfer Stage is executed subsequently to the process, K_s[1]TL is used as K_s[1]n−1.

Usage Pass Recovery Process Sequence in UT Mode

In the UT Transfer Stage, in the case where an abnormality such as power shutdown occurs in the recorder/player in the middle of movement of Usage Pass, and the Usage Pass is lost during the transfer process from the Primal Device and the Inceptive Device, or in the case where the Usage Pass transfer for playback is performed from the Primal Device to the Inceptive Device, and although the Play Count of the Usage Pass in the Primal Device is decreased, playback has not been executed in the Inceptive Device, it is meaningful to provide such a scheme that the Usage Pass can be recovered in the form with the Play Count of the Usage Pass originally existing in the Primal Device.

Figure 21:
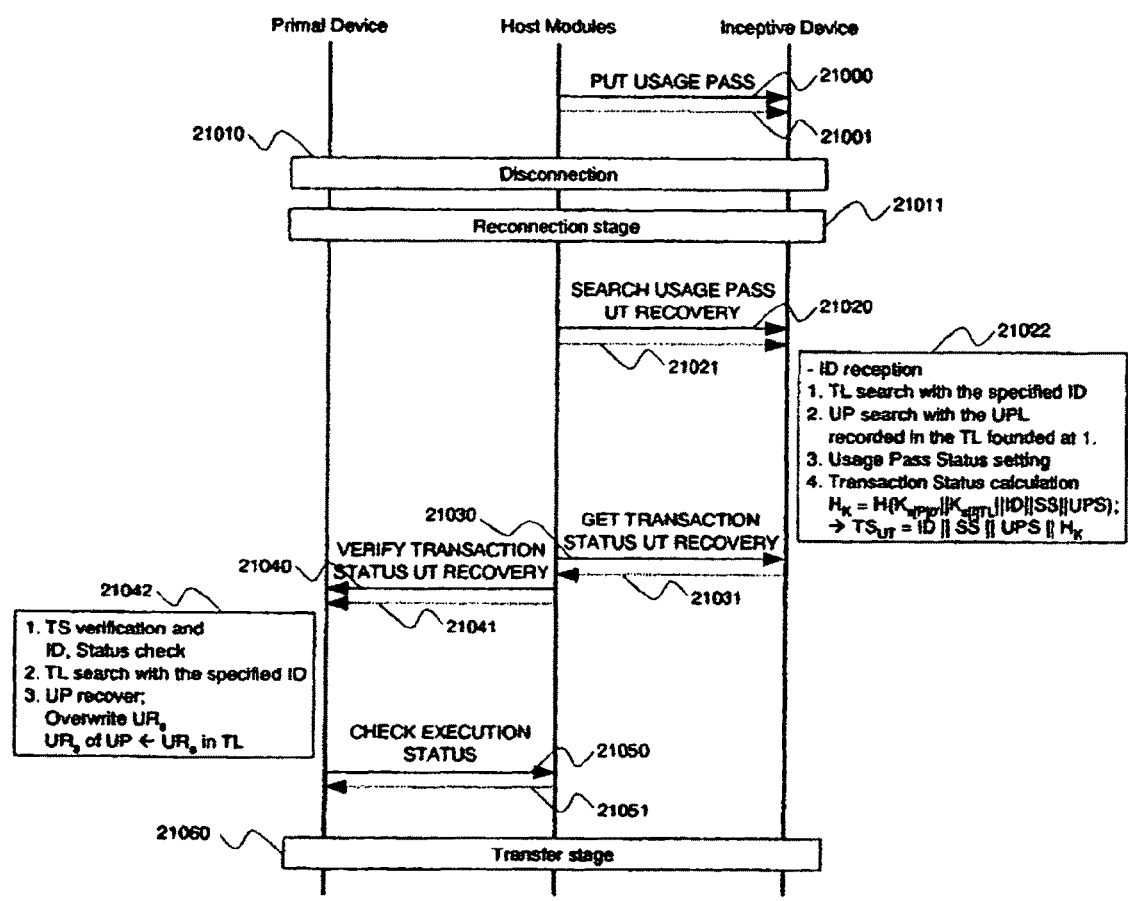
FIG. 21—A view showing a recovery process sequence of lost Usage Pass performed between the recorder/player and the magnetic disk device in accordance with UT mode in an embodiment.

Next, the Usage Pass recovery process as stated above will be described by use of FIG. 21. The process stage in the UT mode will be hereinafter called a UT recovery stage.

First, in the UT Transfer Stage, it is supposed that a situation is such that the Inceptive Device receives PUT USAGE PASS command 21000 and Usage Pass 21001 subsequently thereto. Then, it is assumed that before the reception process of the Usage Pass is completely completed, an abnormality occurs, separation occurs between the Primal Device and the Inceptive Device, and the Session Key K_s[1] used for encryption of the Usage Pass flowing in 21001 is lost from both the Devices (21010). In this case, first, the UT Reconnection Stage described in the previous section is executed, and *KP_d[1] (identical to *K_d[1]) and K_s[P]0' are newly shared.

When the UT Reconnection Stage is ended, the Host Module 110 first issues SEARCH USAGE PASS UT RECOVERY command 21020 to the Inceptive Device. Then, subsequently to the command, the Usage Pass identifier of the Usage Pass that was being sent in 21001 is sent (21021).

When receiving the identifier, the Primal Device executes four processes indicated in 21022.

Process UT4.1.1: In the protected information area, a search is made for Transaction Log in which the same identifier value as the identifier is recorded.

Process UT4.1.2: Usage Pass storage area in the qualified storage unit specified by the Usage Pass Location recorded in the Transaction Log found in process UT4.1.1 is searched.

Process UT4.1.3: With respect to the Usage Pass found in process UT4.1.2, the value of the effectiveness indication flag is checked, and a value of one of "effectiveness", "ineffectiveness", and "non-record" is set in the Usage Pass status.

Process UT4.1.4: Transaction Status for UT mode is created. The Transaction Status is UPID of recovery object Usage Pass∥Session Status recorded in Transaction Log∥Usage Pass Status set in process UT4.1.3 ∥Hash value. Here, the Hash value is calculated from K_s[P]0'∥K_s[1]TL∥UPID∥Session Status∥Usage Pass Status. The Transaction Status created in this process will be hereinafter called UT Transaction Status.

When the Inceptive Device is executing process UT4.1.1 to process UT4.1.4, the Host Module estimates a timing when the process is ended, and issues GET TRANSACTION STATUS UT RECOVERY command 21030 at a suitable timing.

When receiving the command, the Inceptive Device sends the UT Transaction Status created in process UT4.1.4 to the Host Module 110 (21031).

When receiving the Transaction Status, the Host Module 110 issues VERIFY TRANSACTION STATUS UT RECOVERY command 21040 to the Primal Device, and next sends the received data (21041). The data to be sent is the UT Transaction Status.

When receiving the UT Transaction Status, the Primal Device executes the following three processes indicated by 21042.

Process UT4.2.1: Verification of the UT Transaction Status and confirmation of the Usage Pass identifier included in the UT Transaction Status, the Session Status, and the Usage Pass status are performed. The verification of the UT Transaction Status is performed by calculating the Hash value included in the data from K_s[P]0' held by itself and K_s[1]TL. When the calculation result is consistent with the included Hash value, it is determined that no falsification is made on the data. Besides, the Usage Pass identifier is used for confirmation as to whether it is for the recovery object at this time, and the Session Status and Usage Pass status are used for determining whether or not the recovery can be performed. In the case where the Session Status is RP, or in the case where although the Session Status is RP, the Usage Pass status is "ineffectiveness" or "non-record", the recovery process (following process 4.2.2) in the Primal Device is performed.

Process UT4.2.2: In the protected information area, a search is made for Transaction Log in which the same identifier value as the identifier is recorded.

Process UT4.2.3: Usage Pass recovery process is executed. The recovery of the Usage Pass is achieved such that in the case where the effectiveness indication flag of the objective Usage Pass is "ineffectiveness", it is made "effectiveness", and UR_s of the Usage Pass of the recovery object is overwritten by UR_s recorded in the Transaction Log found in process UT4.2.2.

Thereafter, in order to confirm whether or not the recovery process of the Usage Pass in the Primal Device is normally ended, the Host Module may issue CHECK EXECUTION STATUS command 21050 to the Primal Device. An execution status is sent in 21051 from the Primal Device to the Host Module.

When process 4.2.2 is completed, the Usage Pass before sending comes to exist in the Primal Device.

Mutual Authentication Process Sequence Between Devices in BT Mode

Next, the process sequence in the case where mutual authentication is performed between the Primal Device and the Inceptive Device in the BT mode will be described with reference to FIG. 22. Incidentally, the mutual authentication process stage in the BT mode will be hereinafter called BT Connection Stage.

Figure 11:
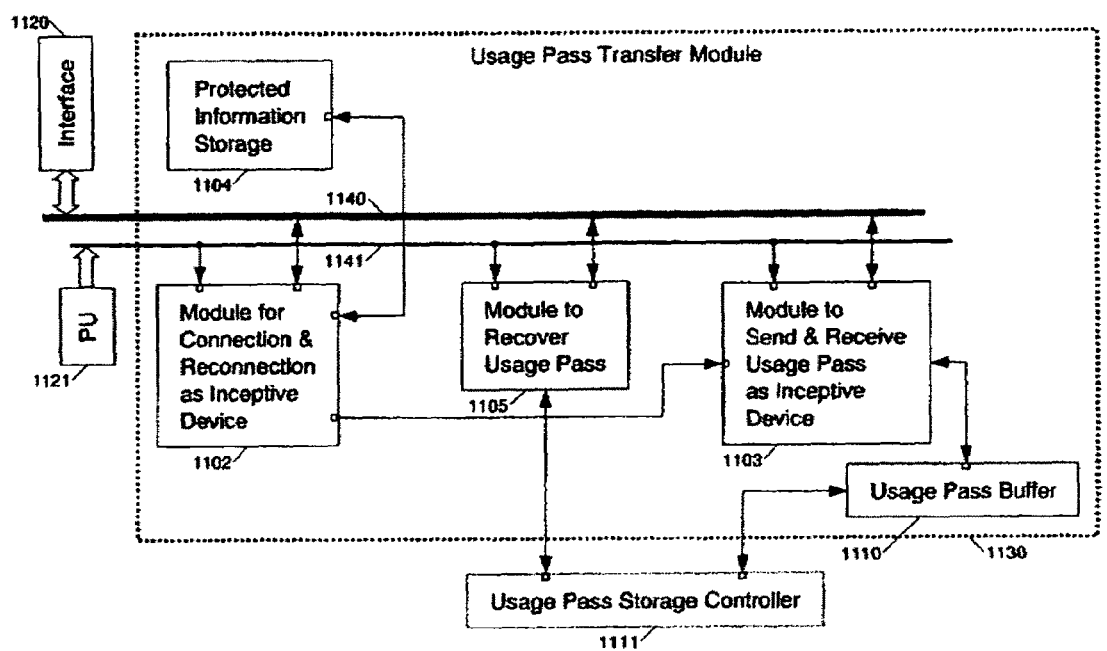
FIG. 11 A view showing a function module to realize Bidirectional Transfer (BT) mode in the magnetic disk device.
Figure 12:
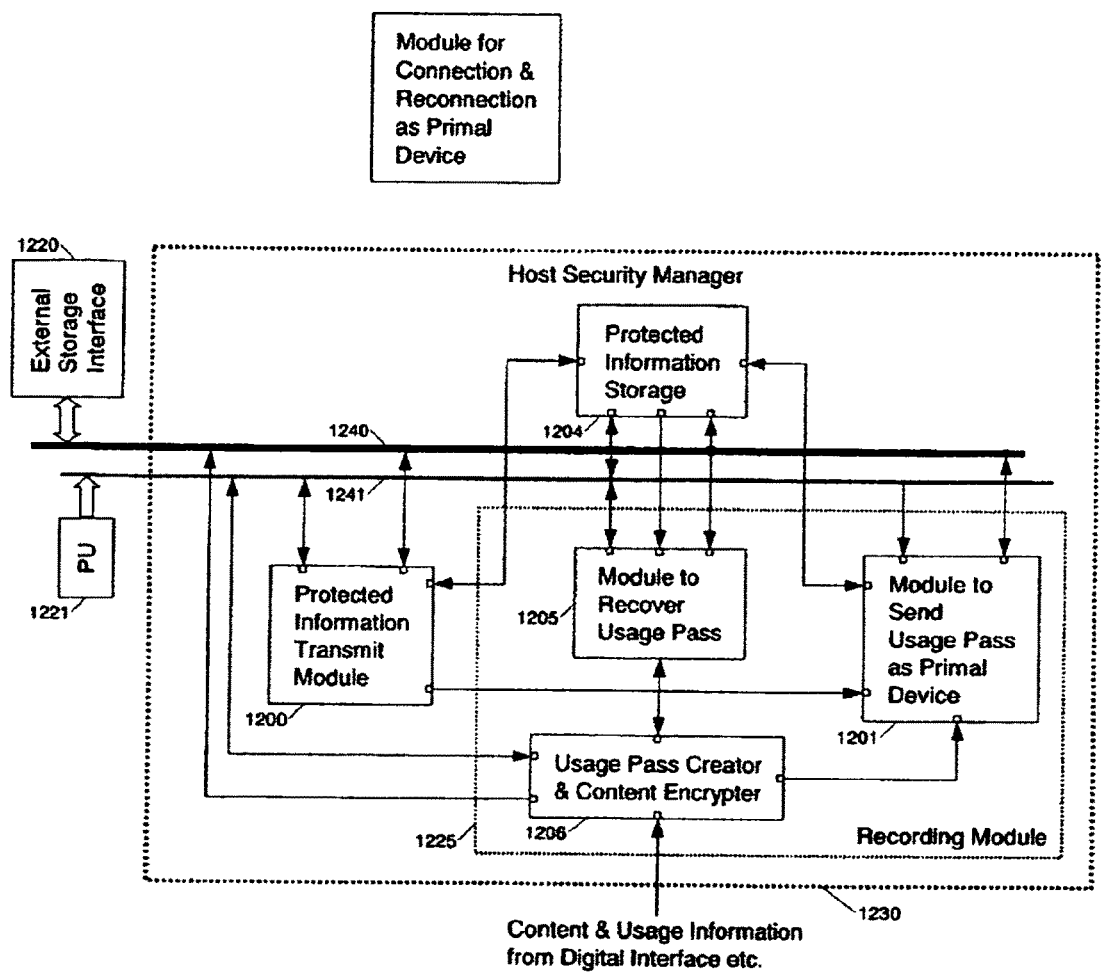
FIG. 12—A view showing a record-only function module to realize Usage Pass sending in accordance with BT mode in the recorder/player.
Figure 13:
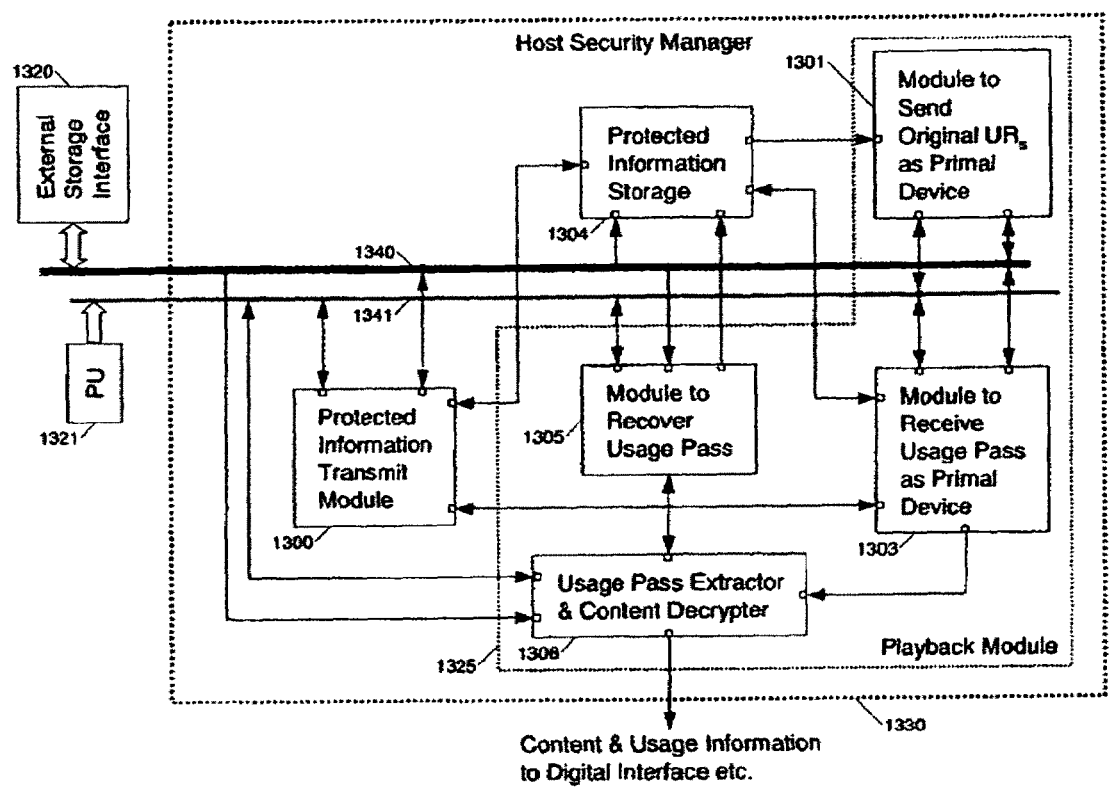
FIG. 13—A view showing a decryption-only function module to realize Usage Pass reception in accordance with BT mode in the recorder/player.

As described in the description of FIG. 11 to FIG. 13, in the BT mode, the Primal Device is the whole Host Security Manager 111 in the recorder/player. In modules included in the manager, the mutual authentication process is performed by the module 1400 in the protected information transfer module, and the sending and receiving of the Usage Pass is performed by the module 1201 and the module 1303 in the recording module and the playback module. Besides, the inceptive Device is the Usage Pass transfer module 130 in the magnetic disk device. The relation of these is the same also in the respective process sequences in the BT mode described in FIG. 22 to FIG. 27.

First, the Host Module 110 issues GET DEVICE CLASS CERTIFICATE command 22000 to the Inceptive Device.

Then, the Inceptive Device sends the Device Class certificate DCC(K_CA, KP_dc[1]) embedded in itself to the Host Module (22001). When receiving DCC(K_CA, KP_dc[1]), the Host Module 110 issues VERIFY DEVICE CLASS CERTIFICATE command 22010 to the Primal Device, and next sends DDC(K_CA, KP_dc[1]) to the Primal Device (22012).

When receiving DDC(K_CA, KP_dc[1]), the Primal Device executes the following four processes indicated by 22012.

Process BT1.1.1: DDC(K_CA, KP_dc[1]) is verified. It is verified whether or not falsification is made on the certificate, and whether or not a number to specify the included certificate is put on RDCL_[P] recorded in itself. The verification method is the same as the method described in UT1.1.1.

Process BT1.1.2: Challenge key K_ch[P] is created.

Process BT1.1.3: K_ch[P] created in process BT1.1.3 is encrypted with KP_dc[1] in DCC(K_CA, KP_dc[1]). The encryption system is public key encryption. The obtained data is E(KP_dc[1], K_ch[P]).

Process BT1.1.4: Device Class certificate embedded in itself is concatenated with the data obtained in process BT1.1.3. The obtained data is E(KP_dc[1], K_ch[P])||DCC(K_CA, KP_dc[P]).

When the Primal Device is executing process BT1.1.1 to process BT1.1.4, the Host Module 110 estimates a timing when the process is ended, and issues GET PRIMAL CHALLENGE KEY BT CONNECTION command 22030 to the Primal Device. When receiving the command, the Primal Device sends the data created by process BT1.1.4 to the Host Module (22031).

When receiving E(KP_dc[1], K_ch[P])||DCC(K_CA, KP_dc[P]), the Host Module 110 issues PUT PRIMAL CHALLENGE KEY BT CONNECTION command 22040 to the Inceptive Device, and then sends the received data to the Inceptive Device (22041).

When receiving E(KP_dc[1], K_ch[P])||DCC(K_CA, KP_dc[P]), the Primal Device executes the following three processes indicated by 22042.

Process BT1.2.1: DCC(K_CA, KP_dc[P]) is verified. Verification means is the same as the method described in process UT1.1.1. However, RDCL to be referred to is RDCL_[1].

Process BT1.2.2: From the received data, E(KP_dc[1], K_ch[P]) is separated and is decrypted. The decryption is performed by using K_dc[1] embedded in its own protected information area.

Process BT1.2.3: As a result of process BT1.2.2, it is confirmed whether K_ch[P] has been included in the valid form. The method of confirmation is the same as the method described in process UT1.3.3.

When process BT1.2.1 to process BT1.2.3 are being executed, the Host Module 110 estimates a timing when the process is ended, and issues GET INCEPTIVE CHALLENGE KEY BT CONNECTION command 22050 at a suitable timing. When receiving the command, the Inceptive Device executes the following two processes indicated by 22051.

Process BT1.3.1: Challenge key K_ch[1] is created.

Process BT1.3.2: K_ch[1] created in process BT1.3.1 is concatenated with the Device public key KP_d[1] embedded in itself and is encrypted with KP_dc[P] received in process BT1.2.1. The data obtained by the encryption is concatenated with RDCL_[1] recorded in itself, a Checksum on the whole obtained data is calculated, and the Checksum is concatenated with the data. Then, the whole obtained data is encrypted with K_ch[P] obtained in process BT1.2.3. The finally obtained data is E(K_ch[P], E(KP_dc[P], K_ch[1]||KP_d[1]||RDCL_[1]||CKS).

When E(K_ch[P], E(KP_dc[P], K_ch[1]||KP_d[1]||RDCL_[1]||CKS) is created in the Inceptive Device, the Device sends the created data to the Host Module (22052).

When receiving E(K_ch[P], E(KP_dc[P], K_ch[1]||KP_d[1]||RDCL_[1]||CKS), the Host Module 110 issues PUT INCEPTIVE CHALLENGE KEY BT CONNECTION command 22060 to the Primal Device, and then sends the received data to the Primal Device (22061).

When receiving E(K_ch[P], E(KP_dc[P], K_ch[1]||KP_d[1]||RDCL_[1]||CKS), the Primal Device executes the following seven processes indicated in 22062.

Process BT1.4.1: The received data is decrypted with K_ch[P]. K_ch[P] is a key created by itself in process BT1.1.2.

Process BT1.4.2: RDCL_[1] is separated from the result of process UT1.4.1, and it is confirmed whether RDCL_[1] has been included in the valid form. Means for confirmation is the same as the structure confirmation by Checksum calculation and that described in process UT1.3.3.

Process BT1.4.3: With respect to RDCL_[P] recorded in itself and sent RDCL_[1], date information of issuance of those are compared with each other. It is assumed that the issue date information of RDCL is included in the RDCL. In the case where the issue date information of the received RDCL_[1] is newer than the issue date information of the RDCL_[P] recorded in itself, the RDCL_[P] is overwritten by the RDCL_[1]

Process BT1.4.4: The remaining data E(KP_dc[P], K_ch[1]||KP_d[1]) is decrypted with K_dc[P].

Process BT1.4.5: With respect to the data obtained in process BT1.4.4, it is confirmed whether K_ch[1]||KP_d[1] has been included in the valid form. Means for confirmation is the same as that described in process UT1.2.3.

Process BT1.4.6: 0th-order Session Key K_s[P]0 is created.

Process BT1.4.7: K_s[P]0 created in process BT1.4.6 is concatenated with the Device Public Key KP_d[P] embedded in itself, and is encrypted with the Device public key KP_d[1] received in process BT1.4.5. The obtained data is E(KP_d[1], K_s[P]0||KP_d[P]). Here, as the result of comparison of issue date information of RDCL_[P] and RDCL_[1] in process BT1.4.3, in the case where the issue date of RDCL_[P] is newer, RDCL_[P] is concatenated with E(KP_d[1], K_s[P]0||KP_d[P]), and further, a Checksum on the whole obtained data is calculated and is concatenated. Thereafter, the whole obtained data is encrypted with K_ch[1] obtained in process BT1.4.5. The finally obtained data is E(K_ch[1], E(KP_d[1], K_s[P]0||KP_d[P])||RDCL_[P] CKS).

When the Primal Device is executing process BT1.4.1 to process BT1.4.7, the Host Module estimates a timing when the process is ended, and issues GET PRIMAL SESSION KEY BT CONNECTION command 22071 at a suitable timing. When receiving the command, the Primal Device sends E(K_ch[1], E(KP_d[1], K_s[P]0||KP_d[P])||RDCL_[P]||CKS) created in process BT1.4.7 to the Host Module (22071).

When receiving E(K_ch[1], E(KP_d[1], K_s[P]0||KP_d[P])||RDCL_[P]||CKS), the Host Module 110 issues PUT PRIMAL SESSION KEY BT CONNECTION command 22080 command to the Inceptive Device, and then sends the received data to the Device (22081).

When receiving E(K_ch[1], E(KP_d[1], K_s[P]0||KP_d[P])||RDCL_[P]||CKS), the Inceptive Device executes the following five processes indicated by 22082.

Process BT1.5.1: The received data is decrypted with K_ch[1]. K_ch[1] is key data created by itself in process BT1.3.1.

Process BT1.5.2: In the case where RDCL_[P] is included in the result of process BT1.5.1, the data is separated, and it is confirmed whether the data has been included in the valid form. Means for confirmation is the same as the structure confirmation by the Checksum calculation and that described in process UT1.3.3.

Process BT1.5.3: As a result of process BT1.5.1 and process BT1.5.2, in the case where RDCL_[P] is included in the received data, and confirmation can be made that it has been included in the valid form, RDCL_[1] recorded in itself is overwritten by received RDCL_[P]

Process BT1.5.4: The remaining data E(KP_d[1], K_s[P]0||KP_d[P]) is decrypted with K_d[1]0. K_d[1] is embedded in its own protected information area.

Process BT1.5.5: With respect to the data obtained in process UT1.5.4, it is confirmed whether K_s[P]0||KP_d[P] has been included in the valid form. Means for confirmation is the same as that described in process UT1.3.3.

When the Inceptive Device is executing process BT1.5.1 to process BT1.5.5, the Host Module estimates a timing when the process is ended, and issues GET INCEPTIVE SESSION KEY BT CONNECTION command 22090 at a suitable timing. When receiving the command, the Inceptive Device executes the follow three processes indicated by 22091.

Process BT1.6.1: 0th-order Session Key K_s[1]0 is created.

Process BT1.6.2: K_s[P]0 and KP_d[P] received in process BT1.5.5, K_s[1]0 created in process BT1.6.1, and Type Map TM_[P] of the Primal Device included in DCC(K_CA, KP_dc[P]) received in process BT1.2.1 are recorded in the Connection Log.

Process BT1.6.3: K_s[1]0 created in process BT1.6.1 is encrypted with K_s[P]0 and KP_d[P] received in process BT1.5.5. The obtained data is E(KP_d[P], E(K_s[P]0, K_s[1]0)).

When E(KP_d[P], E(K_s[P]0, K_s[1]0)) is created in the Inceptive Device, the Device sends the created data to the Host Module 110 (22092).

When receiving E(KP_d[P], E(K_s[P]0, K_s[1]0)), the Host Module 110 issues PUT INCEPTIVE SESSION KEY BT CONNECTION command 22100 to the Primal Device, and then sends the received data to the Device (22101).

When receiving E(KP_d[P], E(K_s[P]0, K_s[1]0)), the Primal Device executes the following three processes indicated by 22102.

Process BT1.7.1: The received data is decrypted with K_d[P] and K_s[P]0. K_d[P] is key data embedded in its own protected information area, and K_s[P]0 is key data created by itself in process BT1.4.6.

Process UT1.7.2: With respect to the data obtained in process UT1.7.1, it is confirmed whether K_s[1]0 has been included in the valid form. Means for confirmation is the same as that described in process UT1.3.3.

Process BT1.7.3. KP_d[1] received in process BT1.4.5, K_s[1]0 received in process BT1.7.2, K_s[P]0 created in process BT1.4.6, and Type Map TM_[1] of the Primal Device included in DCC(K_CA, KP_dc[1]) received in process BT1.1.1 are recorded in the Connection Log.

When the processes up to process BT1.7.3 are completed, sharing of the Shared Device Public Key *KP_d[P] (identical to Shared Device Private Key *K_d[P]), K_s[P]0 and K_s[1]0 is completed.

Usage Pass Transfer Process Sequence from Primal Device to Inceptive Device in BT Mode When the mutual authentication between the Primal Device and the Inceptive Device is completed in the BT mode, the Usage Pass can be transferred from the Primal Device to the Inceptive Device or in the opposite direction.

Figure 23:
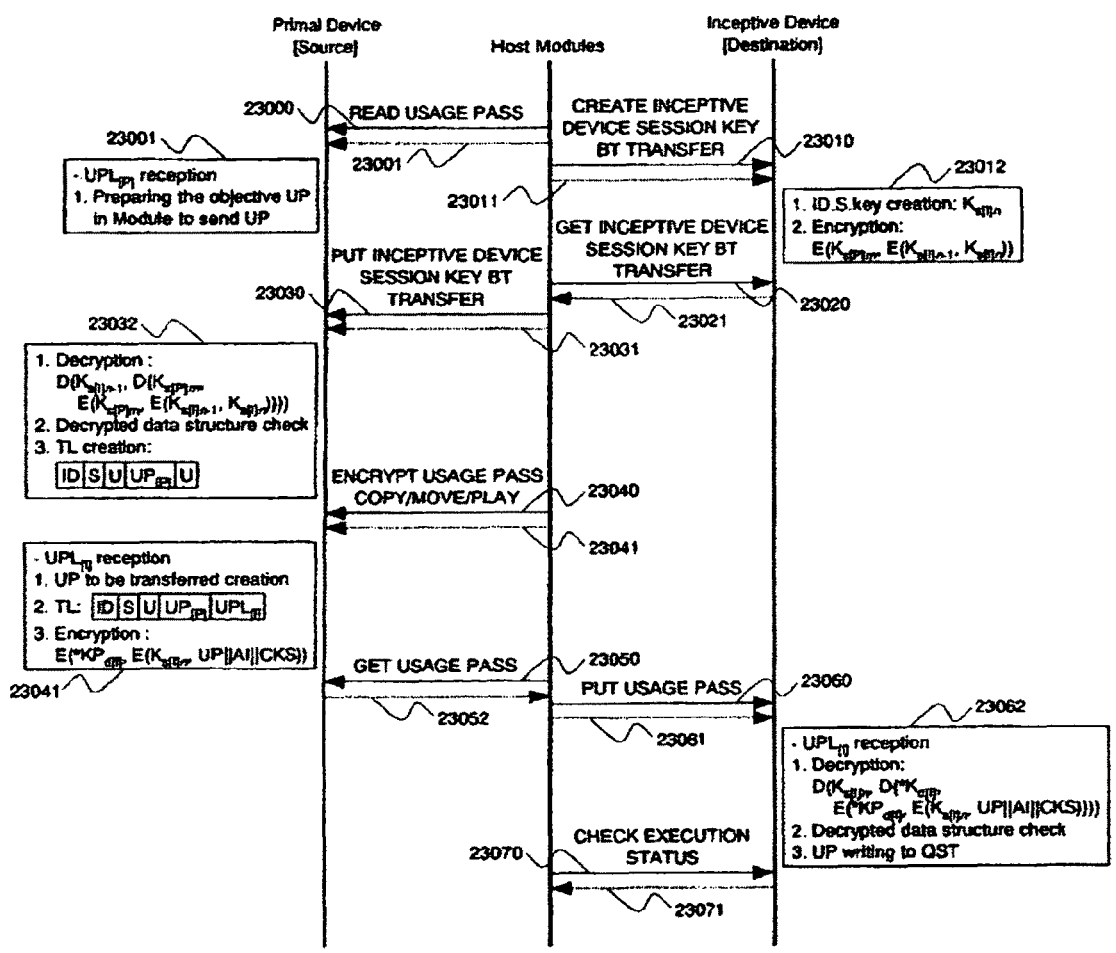
FIG. 23—A view showing a Usage Pass transfer process sequence in which sending is performed from the recorder/player to the magnetic disk device in accordance with BT mode in an embodiment.

First, a case where the Usage Pass is transferred from the Primal Device to the Inceptive Device will be described by use of FIG. 23. An example thereof is such that the recording module 102 is the Primal Device and the Usage Pass is transferred to the magnetic disk device. Incidentally, the Usage Pass transfer process stage from the Primal Device to the Inceptive Device in the BT mode will be hereinafter called BT PI Transfer Stage.

First, the Host Module 110 issues READ USAGE PASS command 23000 to the Primal Device. Subsequently to the command, a place where the Usage Pass is recorded and the number of Usage Passes to be read are notified to the Primal Device in 23001. When receiving the command and the information as to the place where the Usage Pass is recorded and the number of Usage Passes to be read, the Primal Device executes the following one process indicated by 23002.

Process BT2.1.1: The Usage Pass of a transfer object is prepared in the Usage Pass sending module. In the case where the Primal Device is the recording module, it is equivalent to such a process as to send the objective Usage Pass to the module 601 from the Usage Pass Creator and Content Encrypter 606.

While the Primal Device executes process BT2.1.1, the Host Module 110 issues CREATE INCEPTIVE DEVICE SESSION KEY UT TRANSFER command 19020 to the Inceptive Device. When receiving the command, the Inceptive Device executes the following two processes indicated by 23012.

Process BT2.2.1: Session key K_s[1]n is created. Here, n means that the process is the nth BT PI Transfer Stage after completion of the BT Connection Stage.

Process BT2.2.2: K_s[1]n created in process BT2.2.1 is encrypted by using the Session Key K_s[1]n−1 created at the time of the immediately preceding Usage Pass transfer execution and the newest Session Key K_s[P]m created in the Primal Device. K_s[P]m is created each time the Usage Pass transfer process is executed from the Inceptive Device to the Primal Device, and means that m transfer processes have been executed since the BT Connection Stage was completed. The details of the Usage Pass transfer sequence from the Inceptive Device to the Primal Device will be described later by use of FIG. 24. In the case where the Usage Pass transfer process has never been executed from the Inceptive Device to the Primal Device, the 0th-order Session Key K_s[P]0 shared in the BT Connection Stage is used as K_s[P]m. The obtained data is E(K_s[P]m, E(K_s[1]n−1, K_s[1]n)).

When the Inceptive Device is executing process BT2.2.1 and process BT2.2.2, the Host Module estimates a timing when the process is ended, and issues GET INCEPTIVE DEVICE SESSION KEY BT TRANSFER command 23020 at a suitable timing. When receiving the command, the Inceptive Device sends the data E(K_s[P]m, E(K_s[1]n−1, K_s[1]n)) created in process BT2.2.2 to the Host Module (23021).

When receiving E(K_s[P]m, E(K_s[1]n−1, K_s[1]n)), the Host Module 110 issues PUT INCEPTIVE SESSION KEY BT TRANSFER command 22030 to the Primal Device, and next sends the received data to the Primal Device (23031).

When receiving E(K_s[P]m, E(K_s[1]n−1, K_s[1]n)), the Primal Device executes the following three processes indicated by 23032.

Process BT2.3.1: The received data is decrypted with K_s[P]m and K_s[1]n−1.

Both the key data are as described in process BT2.2.2.

Process BT2.3.2: With respect to the data obtained in process BT2.3.1, it is confirmed whether K_s[1]n has been included in the normal form. Means for confirmation is the same as that described in process UT1.3.3.

Process BT2.3.3: Transaction Log is created. In the Usage Pass transfer process in the BT mode, only the Primal Device records the Transaction Log. Elements of the Transaction Log in the BT mode include the Usage Pass identifier of a transfer object Usage Pass, the role (that is, Usage Pass transfer source "Source" or transfer destination "Destination") of the Primal Device in the Usage Pass transfer process, UR_s before reception of the Usage Pass to be received only in the case where the Primal Device is the transfer destination of the Usage Pass, Usage Pass before sending of the Usage Pass to be sent only in the case where the Primal Device is the transfer source of the Usage Pass, Usage Pass Location (address of read source) in the transfer source in the case where the Primal Device is the transfer destination of the Usage Pass, and Usage Pass Location (address of record destination) in the transfer destination in the case where the Primal Device is the transfer source of the Usage Pass. Among them, the Usage Pass identifier of the transfer object Usage Pass, the role "Source" (abbreviation "S" in the drawing) of the Primal Device in the Usage Pass transfer process, the Usage Pass before sending of the sending object Usage Pass, and the Usage Pass Location (record destination address) of the Usage Pass are recorded here.

When the Primal Device is executing process BT2.3.1 to process BT2.3.3, the Host Module estimates a timing when the process is ended, and issues ENCRYPT USAGE PASS COPY or ENCRYPT USAGE PASS MOVE or ENCRYPT USAGE PASS PLAY command 23040 at a suitable timing. Subsequently to the command, the record destination address information of the Usage Pass to the Inceptive Device is sent to the Primal Device in 23041. Incidentally, similarly to the case of the UT mode, as to which Usage Pass of UR_s is sent in a case where which command is received, and how UR_s of Usage Pass remaining in the Primal Device must be modified in the case of copy or playback, it is assumed that all such things are regulated in advance. When the command is received, the Primal Device executes the following three processes shown in 23042.

Process BT2.4.1: Usage Pass to be sent to the Inceptive Device is created based on the Usage Pass prepared in the Usage Pass sending module in process BT2.1.1. In general, UPID, K_c and the like are copied as they are, and only UR_s is modified in accordance with the regulation.

Process BT2.4.2: The record destination address of the Usage Pass in the Inceptive Device received in 23041 is recorded in the Usage Pass Location in the Transaction Log.

Process BT2.4.3: An identifier information Action Indicator to indicate that for the sending Usage Pass created in process BT2.4.1, the received command is which of ENCRYPT USAGE PASS COPY/MOVE/PLAY, and a Checksum on Usage Pass||Action Indicator are calculated and concatenated. After the concatenation process, the obtained data is encrypted by using K_s[1]n and *KP_d[1]. That is, double encryption is performed by the symmetric key. The obtained data is E(*KP_d[1], E(K_s[1]n, Usage Pass||Action Indicator||Checksum)). The calculation of Checksum is as described in UT2.4.2.

When the Primal Device is executing process BT2.4.1 to process BT2.4.3, the Host Module estimates a timing when the process is ended, and issues GET USAGE PASS command 23050 at a suitable timing. When receiving the command, the Primal Device sends E(*KP_d[1], E(K_s[1]n, Usage Pass||Action Indicator||Checksum)) to the Host Module (23052).

When receiving E(*KP_d[1], E(K_s[1]n, Usage Pass||Action Indicator||Checksum)), the Host Module 110 issues PUT USAGE PASS command 23060 to the Inceptive Device, and next sends E(*KP_d[1], E(K_s[1]n, Usage Pass||Action Indicator||Checksum)) (23061).

When receiving the command and the data, the Inceptive Device executes the following three processes shown in 23062.

Process BT2.5.1: The received data is decrypted with *K_d[1] and K_s[1]n. *K_d[1] is a symmetric key obtained in process BT1.5.4. Besides, K_s[1]n is a Session Key created by itself in process BT2.2.1.

Process BT2.5.2: With respect to the data obtained in process UT2.5.1, it is confirmed whether Usage Pass||Action Indicator||Checksum has been included in the valid form. The confirmation is performed by verifying the Checksum and by use of means described in process UT1.3.3. The verification method by the Checksum is described in process UT2.4.2.

Process UT2.5.3: The received Usage Pass is recorded in the qualified storage unit. When the Usage Pass is recorded, the effectiveness indication flag is set to "effectiveness".

Thereafter, in order to confirm whether or not the recording of the Usage Pass into the qualified storage 223 in the Inceptive Device is normally ended, the Host Module may issue CHECK EXECUTION STATUS command 23070 to the Inceptive Device. An execution status is sent from the Inceptive Device to the Host Module in 23071.

By repeating the BT Transfer Stage as described above, even if the Connection Stage is not repeatedly performed, the Usage Pass transfer can be continuously performed from the Primal Device to the Inceptive Device.

Figure 24:
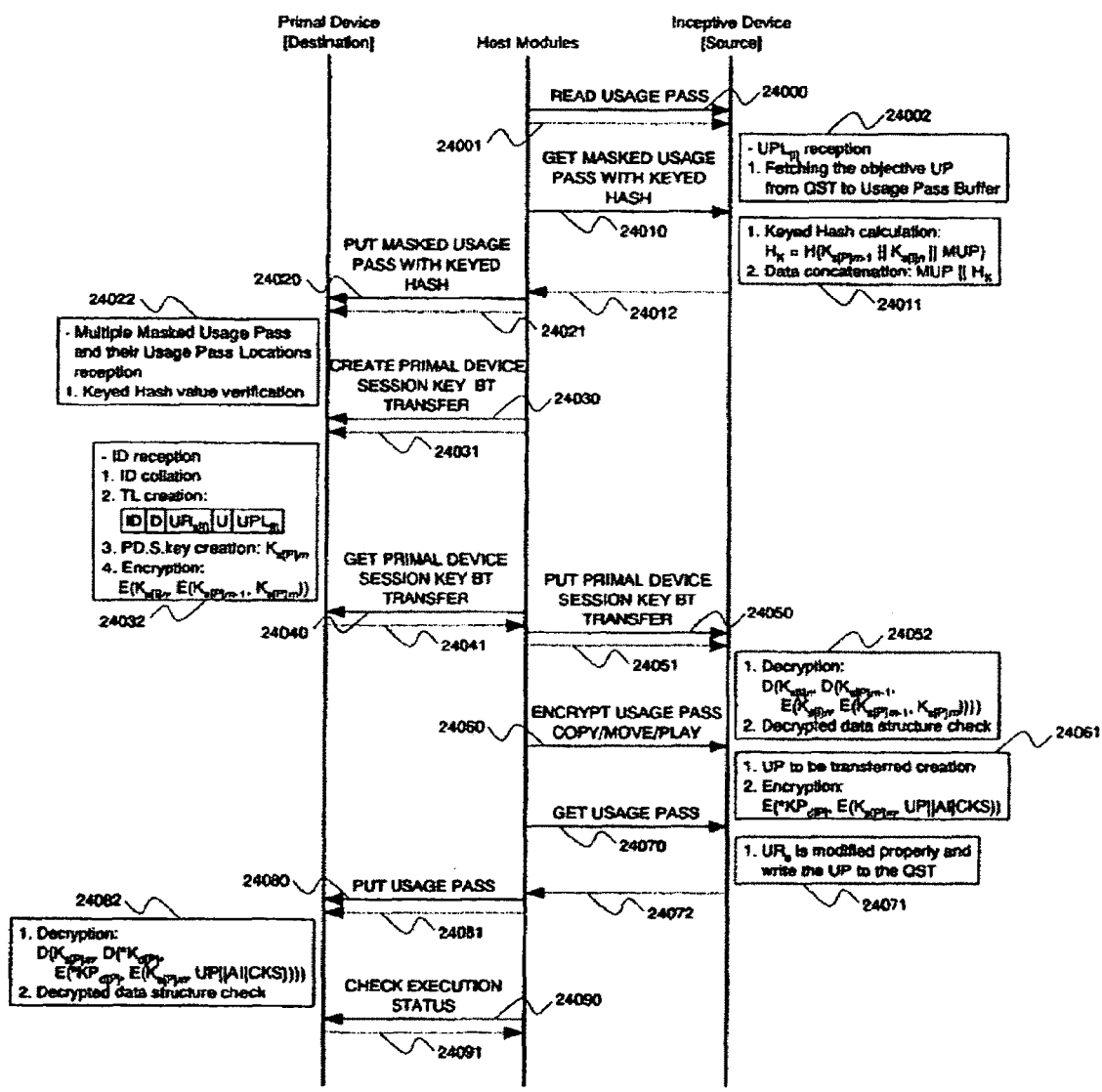
FIG. 24—A view showing a Usage Pass transfer process sequence in which sending is performed from the magnetic disk device to the recorder/player in accordance with BT mode in an embodiment.
Figure 25:
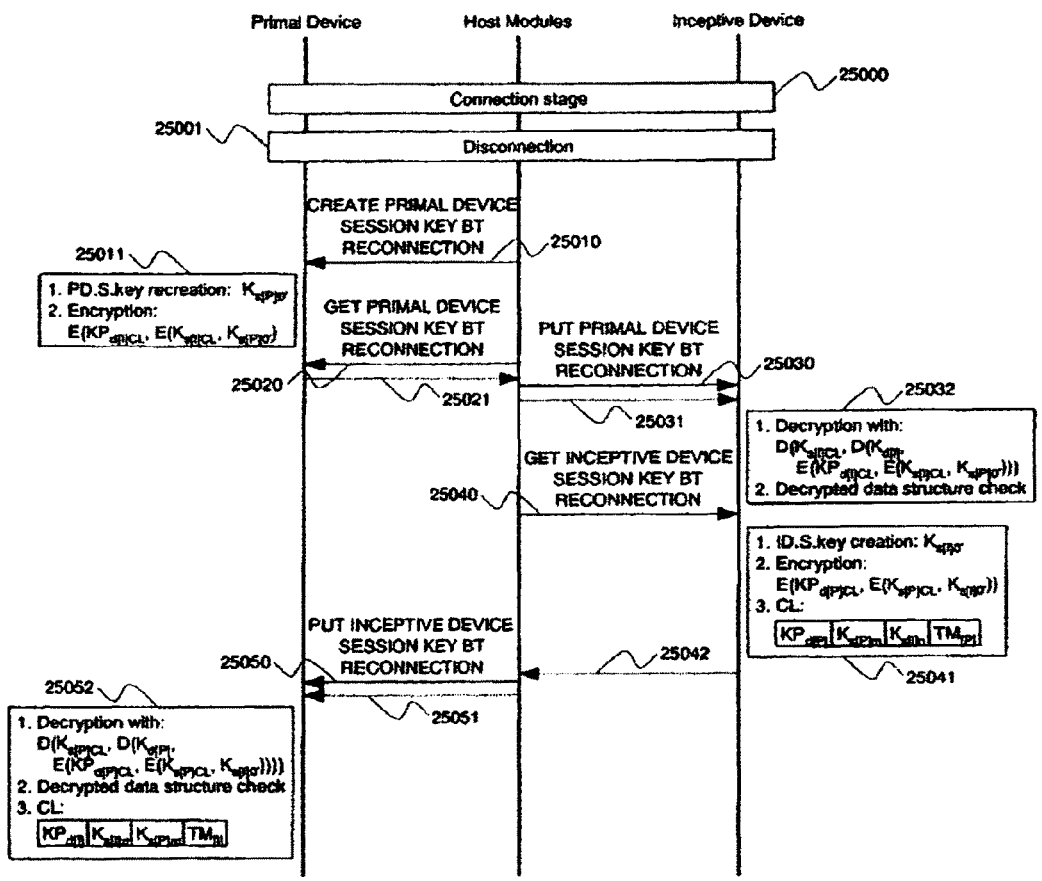
FIG. 25—A view showing a simplified mutual re-authentication process sequence performed between the recorder/player and the magnetic disk device in accordance with BT mode in an embodiment.
Figure 26:
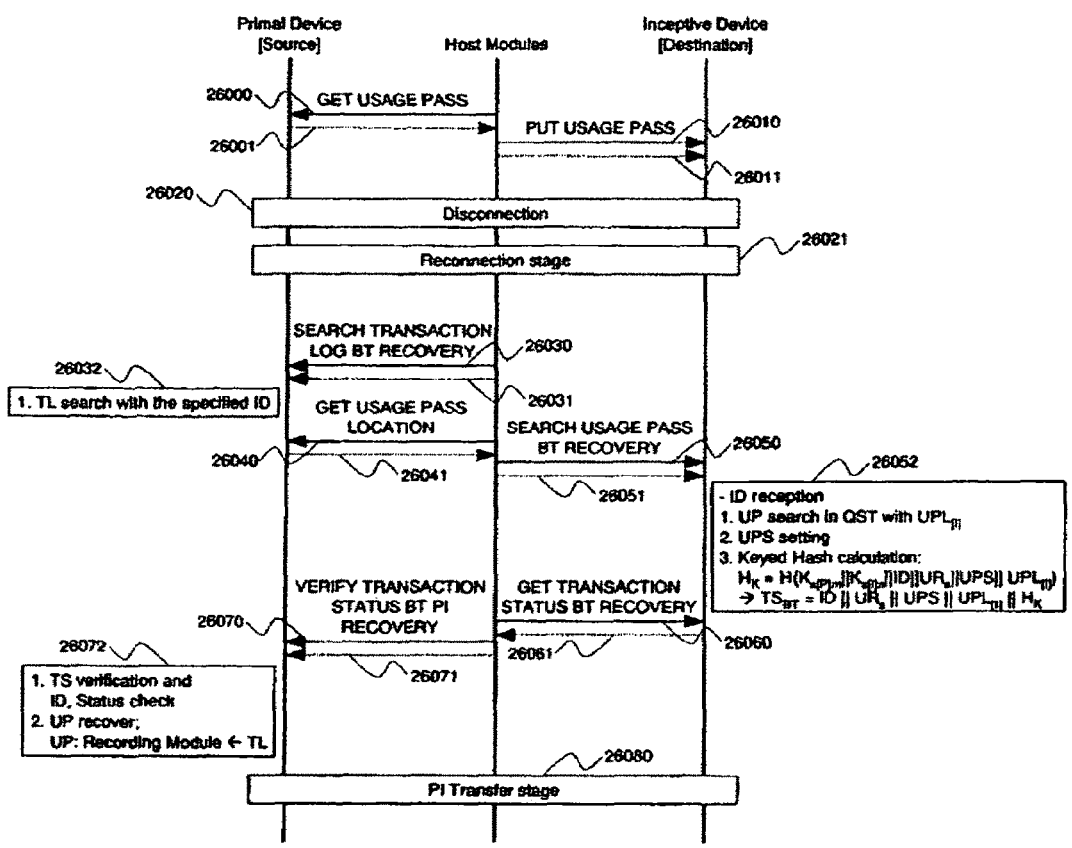
FIG. 26—A view showing, in a case where Usage Pass sent from the recorder/player to the magnetic disk device in accordance with BT mode is lost, a recovery process sequence of the lost Usage Pass in an embodiment.
Figure 27:
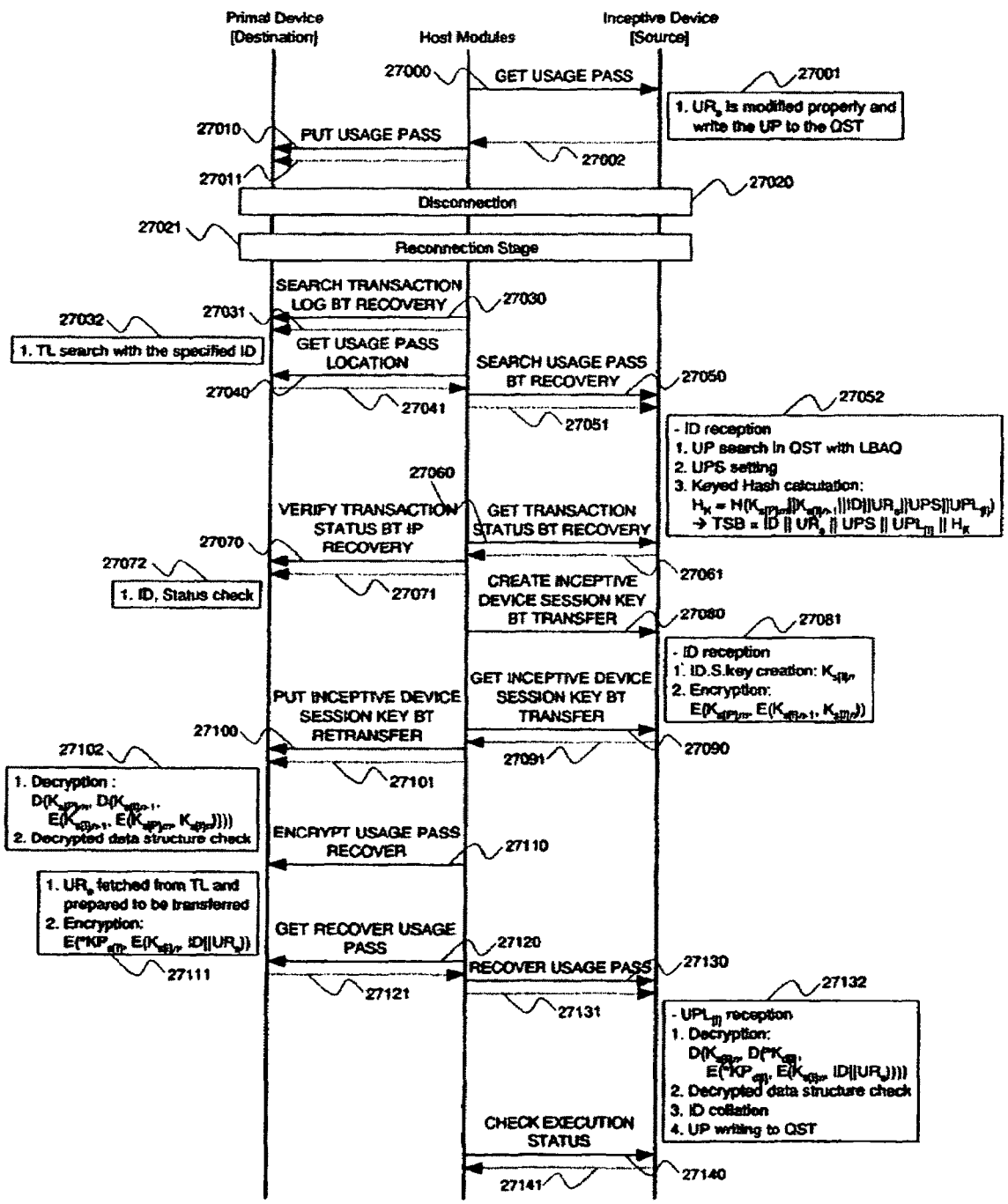
FIG. 27—A view showing, in a case where Usage Pass sent from the magnetic disk device to the recorder/player in accordance with BT mode is lost, a recovery process sequence of the lost Usage Pass in an embodiment.

Usage Pass Transfer Process Sequence from Inceptive Device to Primal Device in BT Mode Next, a case where Usage Pass is transferred from Inceptive Device to Primal Device will be described with reference to FIG. 24. An example thereof is a case where a magnetic disk device is the Primal Device and the Usage Pass is transferred to the playback module 104. Incidentally, the Usage Pass transfer process stage from the Inceptive Device to the Primal Device in the BT mode will be hereinafter called BT IP Transfer Stage.

First, the Host Module 110 issues READ USAGE PASS command 24000 to the Inceptive Device. Subsequently to this command, a place where the Usage Pass is recorded and the number of Usage Passes to be read are notified to the Primal Device in 24001. When receiving the command, and the information as to the place where the Usage Pass is recorded and the number of Usage Passes to be read, the Inceptive Device executes the following one process indicated by 24002.

Process BT3.1.1: The Usage Pass of the transfer object is read from the address specified in the qualified storage unit, and is sent to the Usage Pass Buffer 110.

When the Inceptive Device is executing process BT3.1.1 the Host Module estimates a timing when the process is ended, and issues GET MASKED USAGE PASS WITH KEYED HASH command 24010 to the Primal Device at a suitable timing. When receiving the command, the Inceptive Device executes the following two processes indicated by 24011.

Process BT3.2.1: The Masked Usage Pass is created from the Usage Pass read from the qualified storage unit by READ USAGE PASS command 24000, and a Hash value is calculated based on data in which it is concatenated with the newest Session Key K_s[P]m−1 at the time point when GET MASKED USAGE PASS WITH KEYED HASH command 24010 is received and K_s[1]n. In the case where plural Usage Passes are read at once by the command 24000, the Hash value is calculated for each of the Usage Passes.

Process BT3.2.2: Each Hash value created in process BT3.2.1 is concatenated with each Masked Usage Pass. The obtained data is MUP∥H(K_s[P]m−1∥K_s[1]n∥MUP).

When completing process BT3.2.2, the Inceptive Device sends the created data MUP∥H(K_s[P]m−1∥K_s[1]n∥MUP) to the Host Module (24012).

When receiving MUP∥H(K_s[P]m−1∥K_s[1]n∥MUP), the Host Module 10 issues PUT MASKED USAGE PASS WITH KEYED HASH command to the Primal Device, and next sends the data to the Primal Device.

When receiving the data, the Primal Device executes the following one process indicated by 24022.

Process BT3.3.1: With respect to the received data, it is verified whether or not falsification is made. The Hash value H(K_s[P]m−1∥K__[1]n∥MUP) is calculated using the Session Key K_s[P]m−1 owned by itself, K_s[1]n and the received MUP, and when it is consistent with the received Hash value, it is determined that no falsification is made.

When the Primal Device is executing process BT3.3.1, the Host Module estimates a timing when the process is ended, and issues CREATE PRIMAL SESSION KEY BT TRANSFER command 24030 to the Primal Device at a suitable timing, and next sends the Usage Pass identifier of the transfer object Usage Pass (24031).

When receiving the command and the data, the Primal Device executes the following four processes indicated by 24032.

Process BT3.4.1: It is confirmed whether the Usage Pass identifier received in 24031 and the Usage Pass identifier of the Masked Usage Pass received in 24021 are consistent with each other.

Process BT3.4.2: Transaction Log is created. Here, the Usage Pass identifier of the transfer object Usage Pass, the role "Distribution" (abbreviation "D" in the drawing) of the Primal Device in the Usage Pass transfer process, UR_s included in the Masked Usage Pass received in 24021, and the Usage Pass Location (record source address) in the qualified storage unit in the Inceptive Device are recorded.

Process BT3.4.3: Session key K_s[P]m is created. Here, m means that the Session Key is created in the mth BT IP Transfer Stage after completion of the BT Connection Stage.

Process BT3.4.4: K_s[P]m created in process BT3.4.3 is encrypted by using the Session Key K_s[P]m−1 created at the time of the immediately preceding Usage Pass transfer execution and the newest Session Key K_s[P]n created in the Inceptive Device. K_s[1]n is created each time the BT PI Transfer Stage is executed, and means that n transfer processes have been executed since the BT Connection Stage was completed. Incidentally, the BT PI Transfer Stage has already been described in the previous section by use of FIG. 23. In the case where the Usage Pass transfer process has never been executed from the Primal Device to the Inceptive Device, 0th-order Session Key K_s[1]0 shared in the BT Connection Stage is used as K_s[1]n. The obtained data is E(K_s[1]n, E(K_s[P]m−1, K_s[P]m)).

When the Primal Device is executing process BT3.4.1 to process BT3.4.4, the Host Module estimates a timing when the process is ended, and issues GET PRIMAL SESSION KEY BT TRANSFER command 24040 at a suitable timing. When receiving the command, the Primal Device sends the data created in process BT3.4.4 to the Host Module (24041).

When receiving E(K_s[1]n, E(K_s[P]m−1, K_s[P]m)), the Host Module 110 issues PUT PRIMAL SESSION KEY BT TRANSFER command 24050 to the Inceptive Device, and then sends the received data to the Inceptive Device (24051).

When receiving E(K_s[1]n, E(K_s[P]m−1, K_s[P]m)), the inceptive Device executes the following two processes indicated by 24052.

Process BT3.5.1: The received data is decrypted with K_s[1]n and K_s[P]m−1. Both the data are as described in process BT3.2.1 and process BT3.4.4.

Process BT3.5.2: With respect to the data obtained in process BT3.5.1, it is confirmed whether K_s[P]m has been included in the valid form. Means for confirmation is the same as that described in process UT1.3.3.

When the Inceptive Device is executing process BT3.5.1 and process BT3.5.2, the Host Module estimates a timing when the process is ended, and issues ENCRYPT USAGE PASS COPY or ENCRYPT USAGE PASS MOVE or ENCRYPT USAGE PASS PLAY command 24060 at a suitable timing. Incidentally, similarly to the case of the UT mode, as to which Usage Pass of UR_s is sent in a case where which command is received, and how UR_s of Usage Pass remaining in the Primal Device must be modified in the case of copy or playback, it is assumed that all such things are regulated in advance.

When receiving this command, the Inceptive Device executes the following two processes shown in 24062.

Process BT3.6.1: The Usage Pass to be sent to the Primal Device is created in the module 1103 based on the Usage Pass sent to the Usage Pass Buffer in process BT3.1.1. In general, UPID, K_c and the like are copied as they are, and only UR_s is modified in accordance with the regulation.

Process BT3.6.2: An identifier information Action Indicator to indicate that for the sending Usage Pass created in process BT3.6.1, the received command is which of ENCRYPT USAGE PASS COPY/MOVE/PLAY, and a Checksum on Usage Pass∥Action Indicator are calculated and concatenated. After the concatenation process, the obtained data is encrypted by using K_s[P]m and *KP_d[P]. That is, double encryption by the symmetric key is performed. The obtained data is E(*KP_d[P], E(K_s[P]m, Usage Pass∥Action Indicator∥Checksum)). The calculation of the Checksum is as described in UT2.4.2. When the Inceptive Device is executing process BT3.6.1 and process BT3.6.2, the Host Module estimates a timing when the process is ended, and issues GET USAGE PASS command 24070 at a suitable timing. When receiving the command, the Inceptive Device executes the following one process indicated by 24071.

Process BT3.7.1: UR_s of the Usage Pass in the Usage Pass Buffer is modified in accordance with the regulation. Then, the Usage Pass is overwritten in the place where the Usage Pass is originally recorded in the qualified storage unit. Incidentally, in the case where the command 24060 is ENCRYPT USAGE PASS MOVE, the value of the effectiveness indication flag is made "ineffectiveness".

When process BT3.7.1 is ended, the Inceptive Device sends the data created in the process to the Host Module (24072).

When receiving E(*KP_d[P], E(K_s[P]m, Usage Pass∥Action Indicator∥Checksum)), the Host Module 110 issues PUT USAGE PASS command 24080 to the Primal Device, and sends E(*KP_d[P], E(K_s[P]m, Usage Pass∥Action Indicator∥Checksum)) to the Device (24081).

When receiving the command and the data, the Inceptive Device executes the following two processes indicated by 24082.

Process BT3.8.1: The received data is decrypted with *K_d[P] and K_s[P]m. *K_d[P] is a symmetric key obtained in process BT1.7.1. K_s[P]m is a Session Key created by itself in process BT3.4.3.

Process BT3.8.2: With respect to the data obtained in process BT3.8.1, it is confirmed whether Usage Pass||Action Indicator||Checksum has been included in the normal form. The confirmation is performed by verifying the Checksum and by use of means described in process UT1.3.3. The verification method by the Checksum is as described in process UT2.4.2.

Thereafter, in order to confirm whether or not the reception of the Usage Pass in the Inceptive Device is normally ended, the Host Module may issue CHECK EXECUTION STATUS command 24090 to the Primal Device. An execution status is sent from the Primal Device to the Host Module in 24091.

By repeating the BT Transfer Stage described above, even if the Connection Stage is not repeatedly performed, the Usage Pass transfer can be continuously executed from the Inceptive Device to the Primal Device.

Mutual Re-Authentication Process Sequence Between Devices in BT Mode

The BT Connection Stage is performed once between the Primal Device and the Inceptive Device, and after sharing of mutual Shared Device Public Keys KP_d[P] and KP_d[1], and 0th-order Session Keys K_s[P]0 and K_s[1]0 between both the Devices, and recording of the keys into the Connection Log are ended, in the case where an abnormality such as power shutdown occurs in the recorder/player, and the Session Keys are lost from the Usage Pass sending module and the receiving module, the mutual authentication can be again completed by a small number of processes as compared with the Connection Stage. The mutual re-authentication process will be described by use of FIG. 25. Incidentally, the process stage in the BT mode will be hereinafter called BT Reconnection Stage.

First, it is assumed that after the BT Connection Stage is completed at 25000, separation occurs between the Primal Device and the Inceptive Device because of the occurrence of an abnormality, and the newest Session Keys K_s[P]m and K_s[1]n at the time point and the Shared Device Public Key *KP_d[P] and KP_d[1] are lost from both the Devices (25010).

In this case, the Host Module 110 first issues CREATE PRIMAL SESSION KEY BT RECONNECTION command 25010 to the Primal Device.

When receiving the command, the Primal Device executes the following two processes indicated by 25011.

Process BT4.1.1: New 0th-order Session Key K_s[P]0' is created.

Process BT4.1.2: K_s[P]0' created in process BT4.1.1 is encrypted with the session key K_s[1]CL recorded in its own Connection Log and Device Public Key KP_d[1]CL. The key K_s[1]CL and KP_d[1]CL indicate that the key data was stored in the Connection Log. The finally obtained data is E(KP_d[1]CL, E(K_s[1]CL, K_s[P]0')).

When process BT4.1.1 and process BT4.1.2 are being executed, the Host Module estimates a timing when the process is ended, and issues GET PRIMAL SESSION KEY BT RECONNECTION command 25020 at a suitable timing. When receiving the command, the Primal Device sends the data E(KP_d[1]CL, E(K_s[1]CL, K_s[P]0')) created in process BT4.1.2 to the Host Module.

When receiving E(KP_d[1]CL, E(K_s[1]CL, K_s[P]0')), the Host Module 110 issues PUT PRIMAL SESSION KEY BT RECONNECTION command 25030 to the Inceptive Device, and then sends the received data to the Inceptive Device (25031).

When receiving E(KP_d[1]CL, E(K_s[1]CL, K_s[P]0')), the Inceptive Device executes the following two processes indicated by 25032.

Process BT4.2.1: The received data is decrypted. The decryption is K_d[1] embedded in its own protected information area and the Session Key K_s[1]CL included in the Connection Log.

Process BT4.2.2: As a result of process BT4.2.1, it is confirmed whether K_s[P]0' has been included in the valid form. Means for confirmation is the same as that described in process UT1.3.3.

When process BT4.2.1 and process BT4.2.2 are being executed, the Host Module estimates a timing when the process is ended, and issues GET INCEPTIVE SESSION KEY BT RECONNECTION command 25040 at a suitable timing. When receiving the command, the Inceptive Device executes the following three processes indicated by 25041.

Process BT4.3.1: New 0th-order Session Key K_s[1]0' is created.

Process BT4.3.2: K_s[1]0' created in process BT4.3.1 is encrypted with Session Key K_s[P]CL recorded in its own Connection Log and device public key KP_d[P]CL. The keys K_s[P]CL and KP_d[P]CL indicate that the key data was recorded in the Connection Log. The finally obtained data is E(KP_d[P]CL, E(K_s[P]CL, K_s[1]0')).

Process BT4.3.3: K_s[P]0' received in process BT4.2.2 and K_s[1]0' created in process BT4.3.1 are overwritten and recorded in the Connection Log. KP_d[P] and TM_[P] are held as they are.

When process BT4.3.3 is ended, the Inceptive Device sends the data E(KP_d[P]CL, E(K_s[P]CL, K_s[1]0')) created in process BT4.3.2 to the Host Module (25040).

When receiving E(KP_d[P]CL, E(K_s[P]CL, K_s[1]0')), the Host Module 110 issues PUT INCEPTIVE SESSION KEY BT RECONNECTION command 25050 command to the Primal Device, and then sends the receives data to the Primal Device (25051).

When receiving E(KP_d[P]CL, E(K_s[P]CL, K_s[1]0')), the Primal Device executes the following three processes indicated by 25052.

Process BT4.4.1: The received data is decrypted. The decryption is K_d[P] embedded in its own protected information area and the Session Key K_s[P]CL included in the Connection Log.

Process BT4.4.2: As a result of process UBT4.4.1, it is confirmed whether K_s[1]0' has been included in the valid form. Means for confirmation is the same as that described in process UT1.3.3.

Process BT4.4.3: K_s[1]0' received in process BT4.4.2 and K_s[P]0' created in process BT4.1.1 are overwritten and recorded in the Connection Log. KP_d[1] and TM_[1] are held as they are.

When process UT4.4.3 is completed, sharing of *KP_d[P] (identical to *K_d[P]), *KP_d[1] (identical to *k_d[1]), K_s[P]0' and K_s[1]0' is completed. In the case where the BT PI Transfer Stage is executed subsequently to the above process, K_s[1]0' is used as K_s[1]n−1, and in the case where the BT IP Transfer Stage is executed, K_s[P]0' is used as K_s[P]m−1.

Usage Pass Recovery Process Sequence for BT PI Transfer Stage

In the BT PI Transfer Stage, in the case where an abnormality occurs in the recorder/player in the middle of movement of the Usage Pass, and Usage Pass under transfer process is lost from the Primal Device and the Inceptive Device, in the Primal Device, the Usage Pass is recovered in the form having the same UR_s as the original. The Usage Pass recovery process will be described by use of FIG. 26. The process stage in the BT mode will be hereinafter called BT PI Recovery Stage.

First, it is supposed that a situation is such that in the BT PI Transfer Stage, the Inceptive Device receives PUT USAGE PASS command 26010 and Usage Pass 26011 subsequently thereto. It is assumed that before the reception process of the Usage Pass is completely completed, an abnormality occurs, separation occurs between the Primal Device and the Inceptive Device, and Session Keys K_s[1]n and *KP_d[1] (K_d[1]) used for encrypting the Usage Pass flowing at 26011 are lost from both the Devices (26020). In this case, first, the BT Reconnection Stage described in the previous section is executed, and *KP_d[P] (identical to *K_d[P]), *KP_d[1] (identical to *K_d[1]), K_s[P]0' and K_s[1]0' are newly shared.

When the BT Reconnection Stage is ended, the Host Module 110 first issues SEARCH TRANSACTION LOG BT RECOVERY command 26030 to the Primal Device. Then, subsequently to the command, the Usage Pass identifier of the Usage Pass that was being sent in 21011 is sent (26031).

When receiving the identifier, the Primal Device executes the following one process indicated by 26032.

Process BT5.1.1: In the protected information area, a search is made for Transaction Log in which the same identifier value as the identifier is recorded.

When the Primal Device is executing process BT5.1.1, the Host Module estimates a timing when the process is ended, and issues GET USAGE PASS LOCATION command 26040 at a suitable timing. When receiving the command, the Primal Device sends the Usage Pass Location information recorded in the Transaction Log found in process BT5.1.1 to the Host Module (26041).

When receiving the Usage Pass Location information, the Host Module 110 issues SEARCH USAGE PASS BT RECOVERY command 26050 to the Inceptive Device, and next sends the received data (26051).

When receiving the Usage Pass Location information, the Inceptive Device executes the following three processes indicated by 26052.

Process BT5.2.1: In the qualified storage unit, the Usage Pass storage area in the qualified storage unit specified by the received Usage Pass Location is searched.

Process BT5.2.2: With respect to the Usage Pass found in process UT5.2.1, the value of the effectiveness indication flag is checked, and the value of one of "effectiveness" "ineffectiveness" "non-record" is set in the Usage Pass Status.

Process BT5.2.3: Transaction Status for BT mode is created. The Transaction Status is UPID of recovery object Usage Pass||UR_s of Usage Pass found in process BT 5.2.1||Usage Pass Status set in process BT5.2.2||Usage Pass Location received in 26041||Hash value. Here, the Hash value is calculated from K_s[P]m||K_s[1]n||UPID||UR_s||Usage Pass Status||Usage Pass Location. K_s[P]m and K_s[1]n used here are the newest Session Keys shared at that time point after completion of the connection Stage or the Reconnection Stage. This means that m BT PI Transfer Stages and n BT IP Transfer Stages have been executed since the stage was completed. The Transaction Status created in this process will be hereinafter called BT PI Transaction Status.

When the Inceptive Device is executing process BT5.2.1 to process BT5.2.3, the Host Module estimates a timing when the process is ended, and issues GET TRANSACTION STATUS BT RECOVERY command 26060 at a suitable timing. When receiving the command, the Inceptive Device sends the BT PI Transaction Status created in process BT5.2.3 to the Host Module (26061).

When receiving the BT PI Transaction Status, the Host Module 110 issues VERIFY TRANSACTION STATUS BT PI RECOVERY command 26070 to the Primal Device, and next sends the received BT PI Transaction Status (26071).

When receiving the BT PI Transaction Status, the Primal Device executes the following two processes indicated by 26072.

Process BT5.3.1: Verification of the BT PI Transaction Status, and confirmation of the Usage Pass identifier included in the BT PI Transaction Status, the Usage Pass Status and the Usage Pass Location are performed. The verification of the BT PI Transaction Status is performed such that the Hash value included in the data is calculated from K_s[P]m held by itself and K_s[1]n. When the calculation result is consistent with the included Hash value, it is determined that no falsification is made on the data. The Usage Pass identification is used for confirming whether it is for the recovery object at this time, the Usage Pass Status is used for determining whether the recovery can be performed, and the Usage Pass Location is used for confirming whether the Usage Pass storage area in the qualified storage unit specified by the Usage Pass Location recorded in itself is correctly searched. In the case where the Usage Pass status is "ineffectiveness" or "non-record", in the Primal Device, the recovery process of the Usage Pass is performed. On the other hand, in the case where the Usage Pass Location is different from one recorded in its own Transaction Log, the recovery process of the Usage Pass is not performed.

Process UT5.3.2: The Usage Pass recovery process is executed. The recovery of the Usage Pass is achieved such that in the case where the effectiveness indication flag of the objective Usage Pass is "ineffectiveness", it is made "effectiveness", and the Usage Pass of the recovery object is overwritten by the Usage Pass recorded in the Transaction Log.

When process BT5.3.2 is completed, the Usage Pass before sending comes to exist in the Primal Device.

Usage Pass Recovery Process Sequence for BT IP Transfer Stage

In the BT IP Transfer Stage, in the case where an abnormality occurs in the recorder/player in the middle of movement of Usage Pass, and the Usage Pass under transfer process is lost from both the Primal Device and the Inceptive Device, the Usage Pass can be recovered in the form with the same UR_s as the original in the Inceptive Device. The Usage Pass recovery process will be described by use of FIG. 27. The process stage in the BT mode will be hereinafter called BT IP Recovery Stage.

First, in the BT IP Transfer Stage, it is supposed that a situation is such that the Primal Device receives PUT USAGE PASS command 27010 and Usage Pass 27011 subsequently thereto. It is assumed that an abnormality occurs before the reception process of the Usage Pass is completely completed, separation occurs between the Primal Device and the Inceptive Device, and the Session Keys K_s[P]n and *KP_d[P] (K_d[P]) used for the encryption of the Usage Pass flowing in 27001 are lost from both the Devices (27020). In this case, the BT Reconnection Stage described in the previous section is first executed, and *KPd[P] (identical to *K_d[P]), *KP_d[1] (identical to *K_d[1]), K_s[P]0', K_s[1]0' are newly shared.

When the BT Reconnection Stage is ended, the Host Module first issues SEARCH TRANSACTION LOG BT RECOVERY command 27030 to the Primal Device. Then, subsequently to the command, the Usage Pass identifier of the Usage Pass that was being sent in 27011 is sent (27031).

When receiving the identifier, the Primal Device executes the following one process indicated by 27032.

Process BT6.1.1: In the protected information area, a search is made for Transaction Log in which the same identifier value as the identifier is recorded.

When the Primal Device is executing process BT6.1.1, the Host Module estimates a timing when the process is ended, and issues GET USAGE PASS LOCATION command 26040 at a suitable timing. When receiving the command, the Primal Device sends the Usage Pass Location information recorded in the Transaction Log found in process BT6.1.1 to the Host Module (27041).

When receiving the Usage Pass Location information, the Host Module 110 issues SEARCH USAGE PASS BT RECOVERY command 27050 to the Inceptive Device, and next sends the received data (27051).

When receiving the Usage Pass Location information, the Inceptive Device executes the following three processes indicated by 27052.

Process BT6.2.1: In the qualified storage unit, the Usage Pass storage area in the qualified storage unit specified by the received Usage Pass Location is searched.

Process BT6.2.2: With respect to the Usage Pass found in process UT6.2.1, the value of the effectiveness indication flag is checked, and the value of one of "effectiveness", "ineffectiveness", and "non-record" is set in the Usage Pass status.

Process BT6.2.3: The Transaction Status for BT mode is created. The Transaction Status is UPID of recovery object Usage Pass||UR_s of Usage Pass found in process BT6.2.1||Usage Pass status set in process BT6.2.2 Usage Pass Location received in 27041 Hash value. Here, the Hash value is calculated from K_s[P]m||K_s[1]n−1||UPID||UR_s||Usage Pass Status||Usage Pass Location. K_s[P]m and K_s[1]n−1 used here are the newest Session Keys shared at the time point after the completion of the Connection Stage or the Reconnection Stage. This means that m BT PI Transfer Stages and n−1 BT IP Transfer Stages have been executed since the completion of the Stage. The Transaction Status created in this process will be hereinafter called BT IP Transaction Status.

When the Inceptive Device is executing process BT6.2.1 to process BT6.2.3, the Host Module estimates a timing when the process is ended, and issues GET TRANSACTION STATUS BT RECOVERY command 27060 at a suitable timing. When receiving the command, the Inceptive Device sends the BT IP Transaction Status created in process BT6.2.3 to the Host Module (27061).

When receiving the BT IP Transaction Status, the Host Module 110 issues VERIFY TRANSACTION STATUS BT IP RECOVERY command 27070 to the Primal Device, and next sends the received BT IP Transaction Status (27071).

When receiving the BT IP Transaction Status, the Primal Device executes the following one process indicated by 27072.

Process BT6.3.1: Verification of the BT IP Transaction Status, and confirmation of the Usage Pass identifier included in the BT IP Transaction Status, UR_s, Usage Pass Status, and Usage Pass Location are performed. The verification of the BT IP Transaction Status is performed by calculating the Hash value included in the data from K_s[P]m and K_s[1]n−1 held by itself. When the calculation result is consistent with the included Hash value, it is determined that no falsification is made on the data. Besides, the Usage Pass identifier is used for confirming whether it is for the recovery object at this time, UR_s and Usage Pass Status are used for determining whether the recovery can be performed, and the Usage Pass Location is used for confirming whether the Usage Pass storage area in the qualified storage unit specified by the Usage Pass Location recorded in itself is correctly searched. In the case where the Usage Pass status is "ineffectiveness", or as a result that UR_s included in the BT IP Transaction Status is checked against UR_s recorded in the Transaction Log found in process BT6.1.1, it turns out that UR_s of the objective Usage Pass remaining in the Inceptive Device is modified, the following Usage Pass recovery process is executed.

When the Primal Device is executing process BT6.3.1, the Host Module 110 issues CREATE INCEPTIVE SESSION KEY BT TRANSFER command 27080 in parallel thereto.

When receiving the command, the Inceptive Device executes the following two processes indicated by 27081.

Process BT6.4.1: A Session Key K_s[1]n is created. Here, n means that this process is the nth BT IP Transfer Stage after the completion of the BT Connection Stage.

Process BT6.4.2: K_s[1]n created in process BT6.4.1 is encrypted by using the Session Key K_s[1]n−1 created at the time of the immediately preceding Usage Pass transfer execution, and the newest Session Key K_s[P]m created in the Primal Device. K_s[P]m means that m BT IP Transfer Stages have been executed since the BT Connection Stage was completed. In the case where the Usage Pass transfer process has never been executed from the Inceptive Device to the Primal Device, the 0th-order Session Key K_s[P]0' shared in the BT Reconnection Stage is used as K_s[P]m. The obtained data is E(K_s[P]m, E(K_s[1]n−1, K_s[1]n)).

When the Inceptive Device is executing process BT6.4.1 and process BT6.4.2, the Host Module estimates a timing when the process is ended, and issues GET INCEPTIVE DEVICE SESSION KEY BT TRANSFER command 27090 at a suitable timing. When receiving the command, the Inceptive Device sends the data E(K_s[P]m, E(K_s[1]n−1, K_s[1]n)) created in process BT6.4.2 to the Host Module (27091).

When receiving E(K_s[P]m, E(K_s[1]n−1, K_s[1]n)), the Host Module 110 issues PUT INCEPTIVE SESSION KEY BT RETRANSFER command 27100 to the Primal Device, and next sends the received data to the Primal Device (27101).

The Primal Device receives E(K_s[P]m, E(K_s[1]n−1, K_s[1]n)), and in process BT6.3.1, when it turns out that it is necessary to perform the recovery process of the Usage Pass in the Inceptive Device, the following two processes indicated by 27102 are executed.

Process BT6.5.1: The received data is decrypted with K_s[P]m and K_s[1]n−1. Both the key data are as described in process BT6.2.3.

Process BT6.5.2: With respect to the data obtained in process BT6.5.1, it is confirmed whether K_s[1]n has been included in the valid form. Means for confirmation is the same as that described in process UT1.3.3.

When the Primal Device is executing process BT6.5.1 and process BT6.5.2, the Host Module estimates a timing when the process is ended, and issues ENCRYPT USAGE PASS RECOVER command 27110 at a suitable timing. When receiving the command, the Primal Device executes the following two processes indicated by 27111.

Process BT6.6.1: UPID and UR_s recorded in the Transaction Log found in process BT6.5.1 are concatenated with each other, and are sent to the Usage Pass sending module 1301.

Process BT6.6.2: With respect to UPID||UR_s prepared for the Usage Pass sending module 1301 in process BT6.6.1, the Checksum is calculated and is concatenated to the data. The obtained data is encrypted by using K_s[1]n and *KP_d[1]. That is, double encryption by the symmetric key is performed. The obtained data is E(KP_d[1], E(K_s[1]n, UPID||UR_s||Checksum)). The calculation of the Checksum is as described in UT2.4.2.

When the Primal Device is executing process BT6.6.1 and process BT6.6.2, the Host Module estimates a timing when the process is ended, and issues GET RECOVER USAGE PASS command 27120 at a suitable timing. When receiving the command, the Primal Device sends E(*KP_d[1], E(K_s[1]n, UPID‖UR_s‖Checksum)) to the Host Module (27121).

When receiving E(*KP_d[1], E(K_s[1]n, UPID‖UR_s‖Checksum)), the Host Module 110 issues RECOVER USAGE PASS command 27130 to the Inceptive Device, and next sends E(*KP_d[1], E(K_s[1]n, UPID‖UR_s‖Checksum)) and Usage Pass Location of data writing destination (27131).

When receiving the command and the data, the Inceptive Device executes the following four processes indicated by 23062.

Process BT6.7.1: The received data E(*KP_d[1], E(K_s[1]n, UPID‖UR_s‖Checksum)) is decrypted with *K_d[1] and K_s[1]n. *K_d[1] is a symmetric key obtained in Reconnection Stage 27021. K_s[1]n is a Session Key created by itself in process BT6.4.1.

Process BT6.7.2: With respect to the data obtained in process BT6.7.1, it is confirmed whether UPID‖UR_s‖Checksum has been included in the valid form. The confirmation is performed by verifying the Checksum and by use of means described in process UT1.3.3. The verification method by the Checksum is described in process UT2.4.2.

Process BT6.7.3: The Usage Pass is read into the Usage Pass Buffer from a Usage Pass record area of the qualified storage unit specified by the received Usage Pass Location, and it is confirmed whether UPID of the Usage Pass is consistent with UPID obtained as the result of decryption in process BT6.7.2. In the case where they are not consistent with each other, the process is aborted.

Process BT6.7.4: The received Usage Pass is recorded in the qualified storage unit. When recording of the Usage Pass is performed, the effectiveness indication flag is set to "effectiveness".

Thereafter, in order to confirm whether or not recording of the Usage Pass into the qualified storage unit in the Inceptive Device is normally ended, the Host Module may issue CHECK EXECUTION STATUS command 27140 to the Inceptive Device. An execution status is sent from the Inceptive Device to the Host Module in 27141.

When process BT6.7.2 is completed, the Usage Pass before sending comes to exist in the Inceptive Device.

Area Division of Data Storage Area

Figure 28:
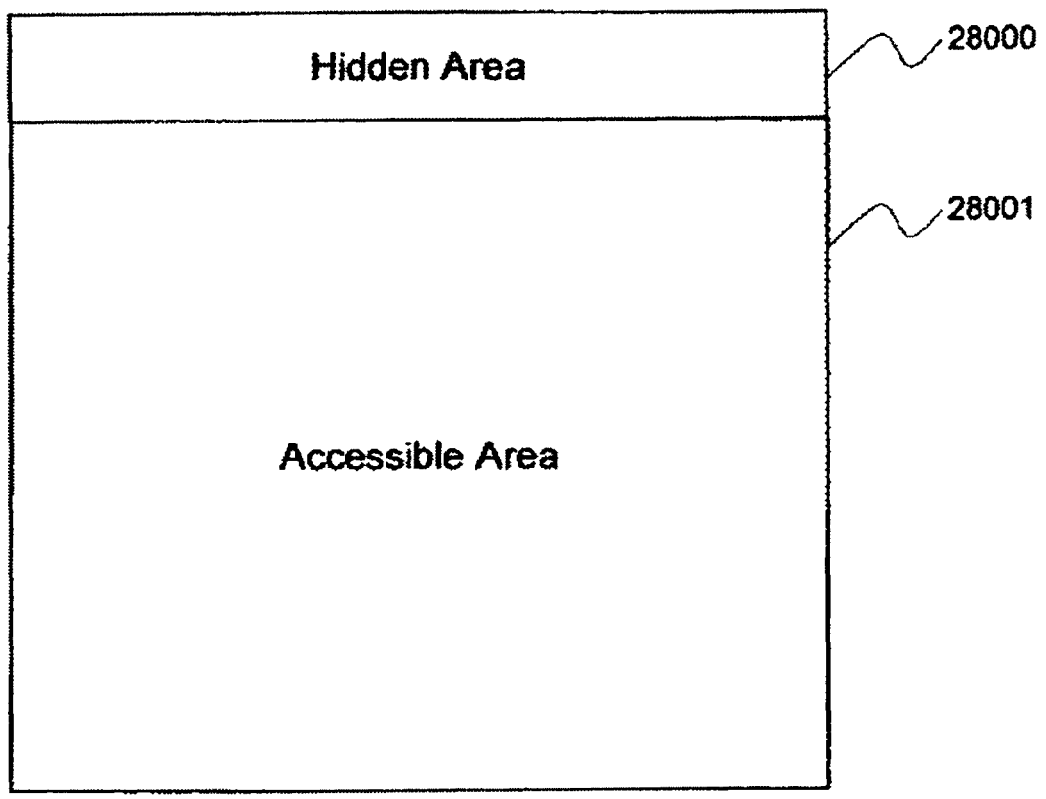
FIG. 28—A view showing a logical partition structure of a storage area of a storage medium 200.

A division method of a logical space on the storage medium 200 as a storage area of encrypted content data will be described by use of FIG. 28. The storage area configured on the storage medium 200 includes an accessible area 28001 in which content data itself can be written and read by setting an command specifying an address indicating the area into the Storage Interface Unit 220 and a hidden area 28000 which the user can not intentionally access. The hidden area 28000 may be provided on a separate medium physically different from the storage medium 200.

Figure 29:
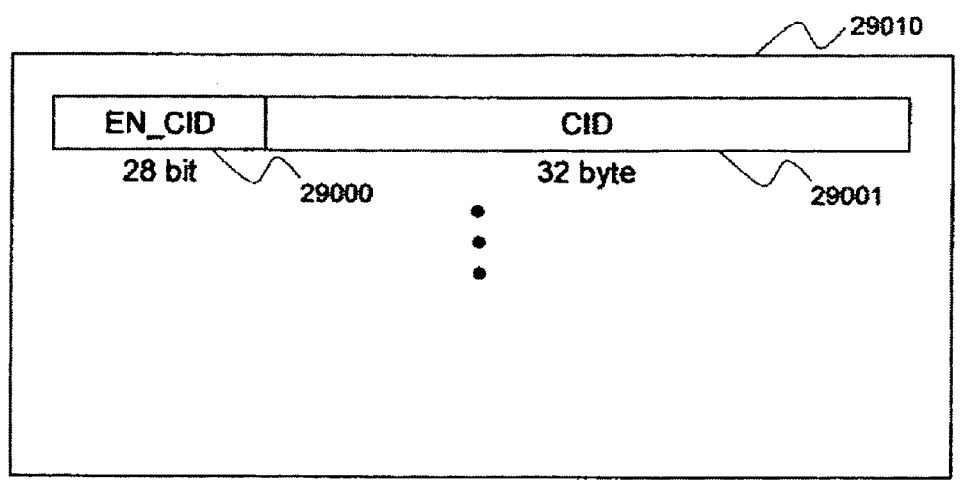
FIG. 29—A view showing a structure of data recorded in a hidden area 28000 of the storage area.

Next, data to be recorded in the hidden area 28000 will be described by use of FIG. 29. Plural entries can be recorded in a hidden area 29010. Each entry includes an area for recording a content identifier (CID, 29001) and an area (EN_CID, 29000) for recording an identifier to specify the entry in which the CID is recorded. Since the EN_CID has only specify the kind of the CID which the magnetic disk device can record, it may be short as compared with the length of a normal CID. For example, even in the case where content data in which all CIDs are different from each other are recorded in all sectors of a magnetic disk device of 1 terabyte in which the length of 1 sector is 512 bytes, all the CIDs can be discriminated by 31 bits. On the other hand, since the CID is the identifier uniquely assigned to all content data, a sufficient length is required. In this embodiment, the length is temporarily made 32 bytes.

Figure 30:
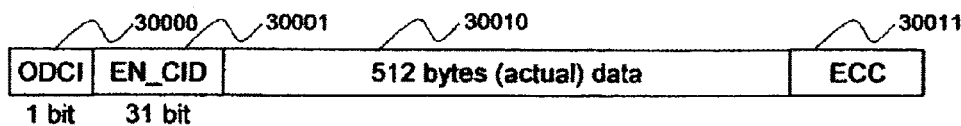
FIG. 30—A view showing a record format in the case where content data is recorded in a storage device.

On the other hand, in the case where content data is recorded in the accessible area 28001, as shown in FIG. 30, similarly to a normal magnetic disk device, the content data itself is recorded in each sector (normally 512 bytes.). The feature is that in each sector, in addition to a record area 30010 of the content data, there is provided an expansion area for recording additional data such as output control information (ODCI, 30000) of content data, and Entry Number (EN_CID, 30001; equivalent to one recorded in 29000) of CID to which the content data corresponds. It is assumed that the output control information 30000 has the following meaning:

0: the output of the content data recorded in the sector to an output destination device can be executed without limitation, 1: with respect to the output of the content data recorded in the sector to the output destination device, the output of the data can be performed only in the case where it is confirmed that Usage Pass for decrypting the data exists in the output destination device.

With respect to the expansion area, reading by a normal read command to a storage device and writing by a write command can not be executed. The reading of data recorded in this area or the writing of data into this area can be executed only by specific commands described below.

Transfer Process Sequence of Content Data Under One Connection

Figure 31:
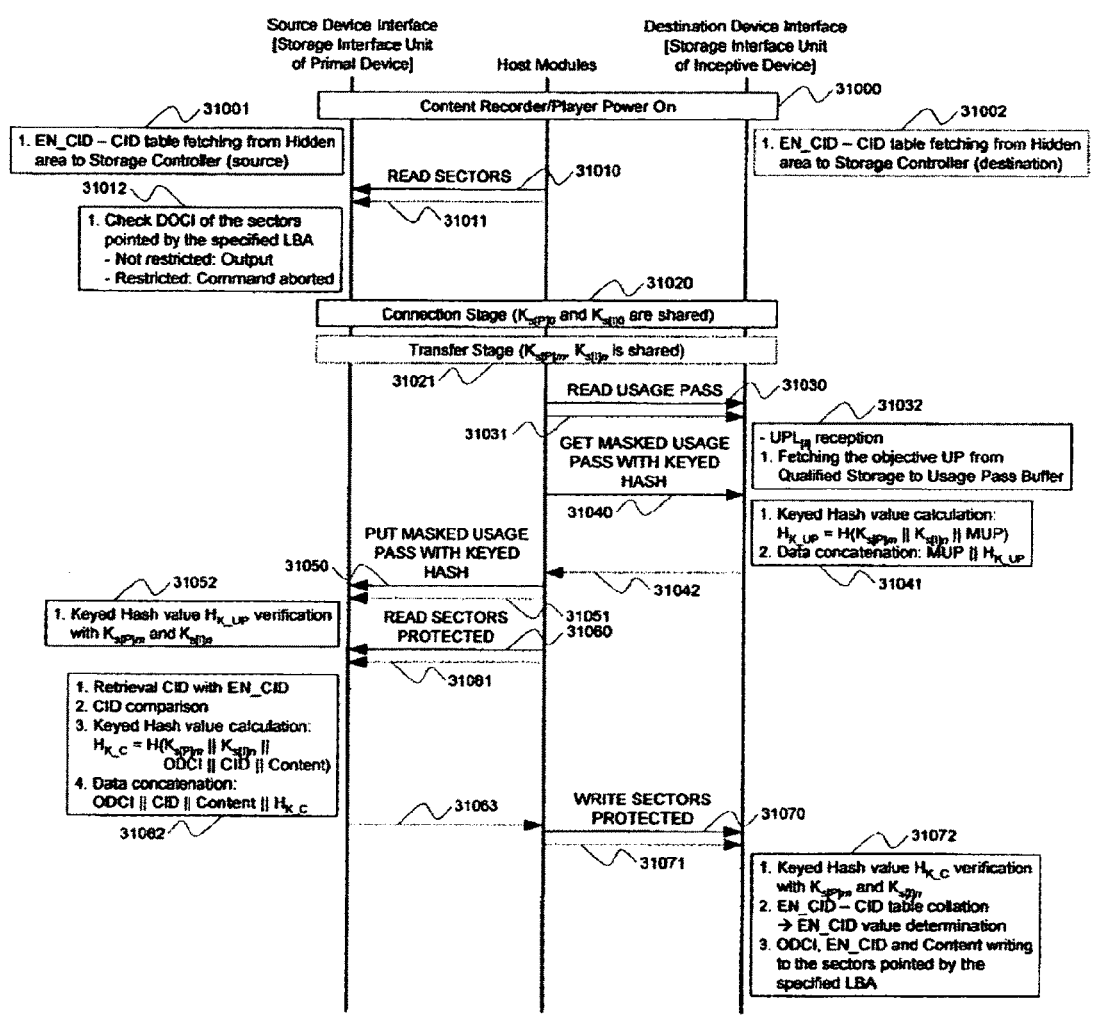
FIG. 31—A view showing an output process sequence from one equipment to the other equipment in the case where one connection is established with respect to content whose output control is required.

By mainly using FIG. 31 and appropriately using FIG. 28, FIG. 29, FIG. 30 and FIG. 18, a description will be given to a process sequence to transfer data from a device as a transfer source of content data (hereinafter referred to as a transfer source device) to a device as a transfer destination (hereinafter referred to as a transfer destination device) in the case where Connection is established in UT mode or BT mode through the Host Module 110 between the device (storage device) in which the objective content data is recorded or the device (recording device) which creates the content data and the output destination device (storage device or playback device) of the content data. Incidentally, the process sequence shown in FIG. 31 has the following two premises.

(1) Both the transfer source device and the transfer destination device are connected to one recorder/player as shown in FIG. 1.

(2) Both the transfer source device and the transfer destination device are storage devices.

In the following, based on the above two premises, the process sequence in the case where content data is transferred from the transfer source device to the transfer destination device will be described. As set forth in the premise (2), in the following, the description will be made on the premise that both the transfer source device and the transfer destination device are the storage devices, however, the transfer source device may be a recording device, or the transfer destination device may be a playback device. Such a case will be suitably described in the text.

First, when the content data recorder/player is started (31000), each of the transfer source device and the transfer destination device reads an EN_CID CID table recorded in the hidden area 28000 from the storage medium 200, and temporarily stores it in an SC Buffer in the storage controller 230, which can be accessed at high speed. The process in the transfer source device is denoted by 31001, and similarly, the process in the transfer destination device is denoted by 31002. Incidentally, it is not always necessary that the EN_CID CID table is read at the time of start and is held in the SC Buffer as stated above, but it may be read in the inside of the storage device each time the data recorded in the accessible area is read. Incidentally, in the case where neither device is the storage device, there is also a case where it is not necessary to execute the process of reading the EN_CID CID table from the hidden area to the SC Buffer. In such s device, the table is normally recorded in a temporal storage area in the device.

Next, consideration will be given to a case where the Host Module 110 sends READ SECTORS command 31010 to the transfer source device in order to perform transfer of the objective content data. It is assumed that this command is a conventionally regulated standard read command for reading data recorded in the transfer source device. In the case where the Host Module 110 sends this command to the transfer source device, address information of an area where data for reading is recorded is notified to the transfer source device in 31011. When receiving this command, the conventional storage device sends the data recorded in the area indicated by the address information specified in 31011 to the Host Module 110.

On the other hand, when receiving the command 31010 and the address information 31011 where the data is recorded, the storage device having the function according to embodiments of the invention confirms the output control information 30000 of the area in the inside of the device when the objective data is read from the area specified by the address information and is transferred to the storage controller 230. In the case where the output control information is 1, the process of the command is aborted. At this time, when the reason of the abort is notified as a parameter to the Host Module 110 from the storage device, there is a merit that the Host Module 110 can know the reason why the command is aborted, however, such a function is not essential. Actually, for example, in interface standards for magnetic disk device, such as AT Attachment, such a read command is not regulated.

Figure 18:
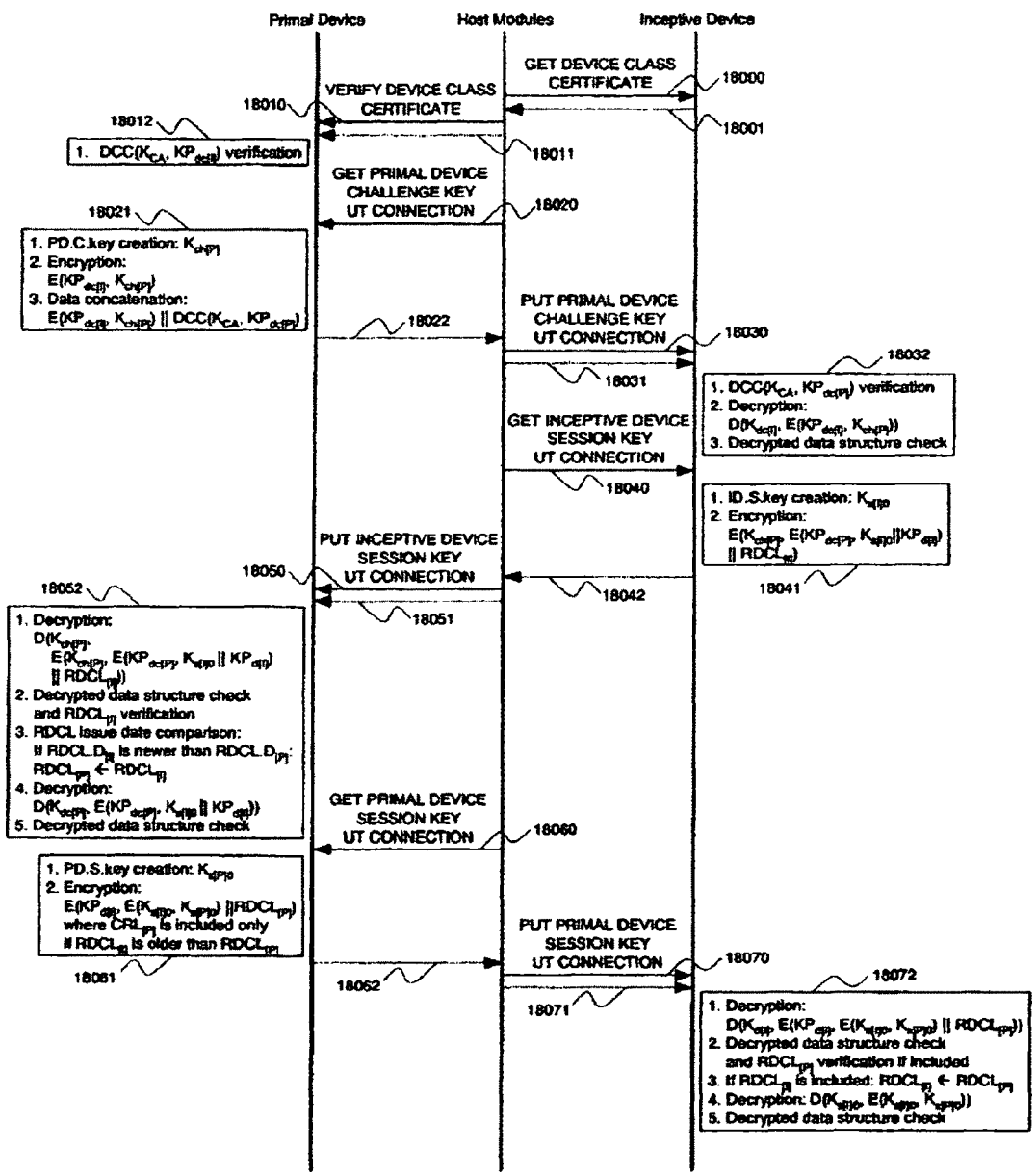
FIG. 18—A view showing a mutual authentication process sequence performed between the recorder/player and the storage device in accordance with UT mode in an embodiment.
Figure 19:
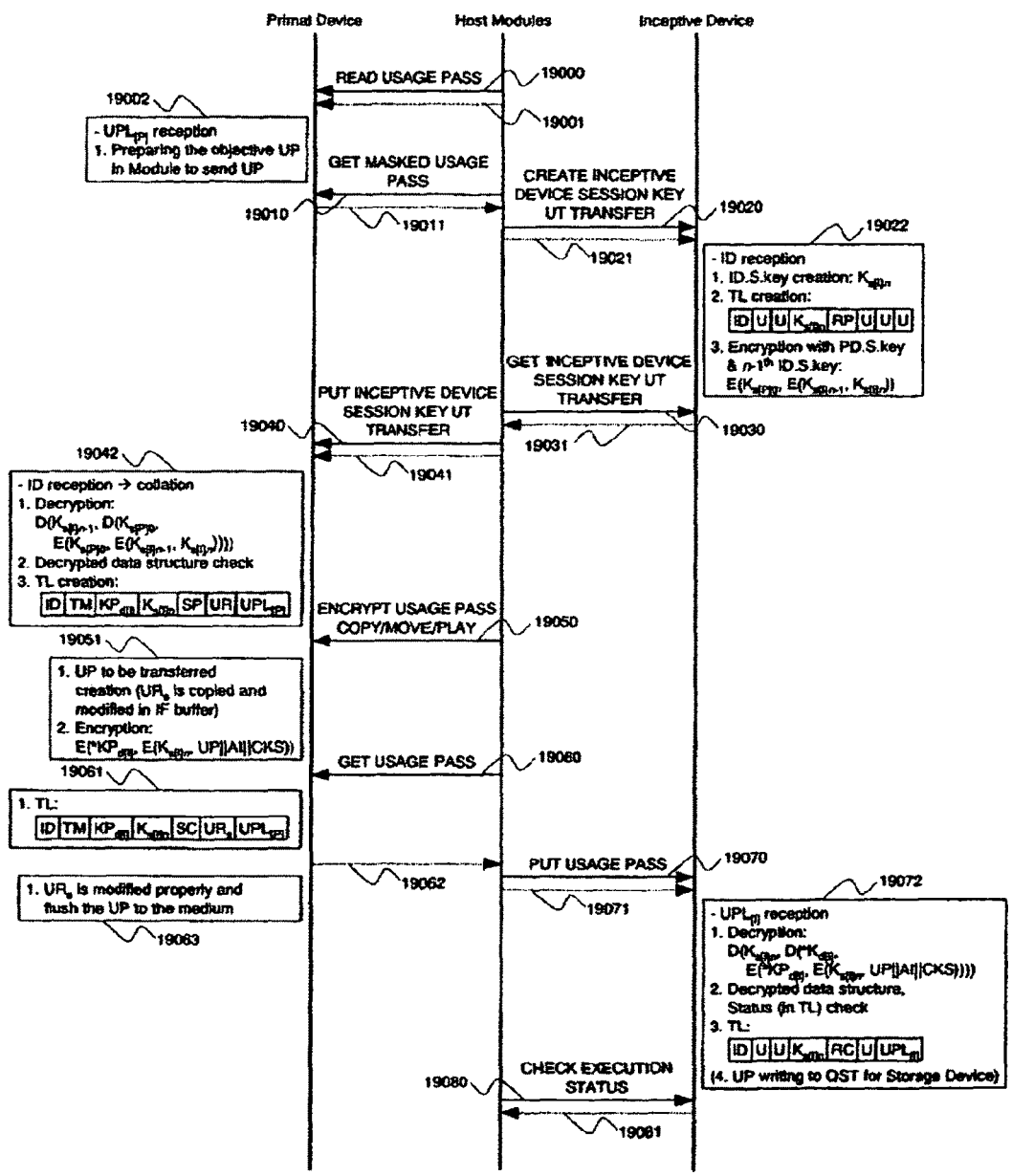
FIG. 19—A view showing a Usage Pass transfer process sequence performed between the recorder/player and the magnetic disk device in accordance with UT mode in an embodiment.

When the read command of the content data to the transfer source device is aborted by the storage device, the Host Module 110 causes the Connection Stage 31020 shown in FIG. 18 to be executed between the transfer source device and the transfer destination device.

Here, when the premise that the transfer source device and the transfer destination device are the storage devices is ignored, when the Connection Stage is executed, as the transfer source device and the transfer destination device, there are six kinds described below according to the role to be played and the method of the Connection.

(1CN_UT1) Connection in UT mode; transfer source device: Storage Security Manager (Primal Device); transfer destination device: Storage Security Manager (Inceptive Device)

(1CN_UT2) Connection in UT mode; transfer source device: Storage Security Manager (Inceptive Device); transfer destination device: Storage Security Manager (Primal Device)

(1CN_UT3) Connection in UT mode; transfer source device: Storage Security Manager (Primal Device); transfer destination device: Host Security Manager (Playback Module as Inceptive Device)

(1CN_UT4) Connection transfer source device in UT mode: Host Security Manager (Recording Module as Primal Device); transfer destination device: Storage Security Manager (Inceptive Device)

(1CN_BT1) Connection in BT mode; transfer source device: Storage Security Manager (Inceptive Device); transfer destination device: Host Security Manager (Playback Module as Primal Device)

(1CN_BT2) Connection in BT mode; transfer source device: Host Security Manager (Recording Module as Primal Device); transfer destination device: Storage Security Manager (Inceptive Device)

Even if the Connection Stage is completed in any of the above six kinds of methods, two 0th-order Session Keys $K\_s[P]0$ and $K\_s[1]0$ are shared between the transfer source device and the transfer destination device. Accordingly, even if the limitation that both the devices are the storage devices are attached, no limitation is added in the essential meaning.

After the Connection Stage 31020 is completed, when the Transfer Stage 31021 is executed n times in UT mode between the transfer source device and the transfer destination device (direction is arbitrary), since the Session Key created in the transfer destination device is created each time of transfer process, the finally shared Session Keys are $K\_s[P]0$ and $K\_s[1]n$. Similarly, when the Transfer Stage 31021 is executed n times in BT mode from the transfer destination device to the transfer source device and is performed m times in the reverse direction, the finally shared Session Keys are $K\_s[P]m$ and $K\_s[1]n$. Then, in 32021, the finally shared Session Keys are temporarily designated as $K\_s[P]m$ and $K\_s[1]n$, however, in the case where the Transfer Stage has never been executed, the values of n and m remain 0.

When the Connection Stage is completed, the Host Module 110 sends READ USAGE PASS command 31030 to the transfer destination storage device. In this command, address 31031 to indicate the area where the Usage Pass is recorded is simultaneously sent to the transfer destination storage device. The object of the command is to read the Usage Pass, which can decrypt the content data to be transferred, from the Qualified Storage. The process in the storage device in the case where READ USAGE PASS command is received is the same as that described in 19000, 19001 and 19002 in FIG. 19 or 23000, 23001 and 23001 in FIG. 23. On the other hand, in the case where the transfer destination device is not the storage device, a process to read objective Usage Pass from the Qualified Storage is not performed, but only a process to specify necessary Usage Pass from Usage Pass held in the transfer destination device is performed.

Next, the Host Module 110 sends GET MASKED USAGE PASS WITH KEYED HASH command to the transfer destination storage device. In the transfer destination storage device, Masked Usage Pass is created from the Usage Pass read into the Usage Pass Buffer 510 by READ USAGE PASS command 31030. In parallel thereto, a keyed Hash value is calculated using the newest Session Keys $K\_s[P]m$ and $K\_s[1]n$ created in the Primal Device and the Inceptive Device. The obtained data is concatenated as described below, and sent to the Host Module 110 (31042): $MUP\|H(K\_s[P]m\|K\_s[1]n\|MUP)$. A process in the storage device in the case where GET MASKED USAGE PASS WITH KEYED HASH command is received is the same as that described in process BT3.2.1 and process BT3.2.2 except that the values of the shared newest Session Keys are different. Also in the case where the transfer destination device is not the storage device, Masked Usage Pass is created from the Usage Pass held in the inside similarly to the above.

When receiving the Masked Usage Pass with which the Keyed Hash is concatenated, the Host Module 110 sends the data as it is to the transfer source storage device (31051). The sending is performed by PUT MASKED USAGE PASS WITH KEYED HASH command 31050.

When receiving the Masked Usage Pass with which Keyed Hash is concatenated, the transfer source storage device verifies whether or not falsification is performed on the received data. The verification method is the same as that described in process BT3.3.1 except that the values of the shared newest Session Keys are different. Also in the case where the transfer source device is not the storage device, the same applies.

The Host Module 110 sends, subsequently to PUT MASKED USAGE PASS WITH KEYED HASH command 31050, READ SECTORS PROTECTED command 31060, together with the address information indicating the area where the objective content data is recorded and the transfer data length 31061, to the transfer source storage device. When the command and the address information are received, the storage controller 230 in the transfer source storage device executes the following processes.

Process ICN_CT1.1.1: The output control information 30000 recorded in the area indicated by the received address information and the EN_CID value 30001 are confirmed. In the case where the output control information is 1, the EN_CID value is confirmed, and it is grasped from the EN_CID CID table held in the SC Buffer that the data recorded in the specified area corresponds to which CID.

Process ICN_CT1.1.2: The content identifier to which the data recorded in the specified area corresponds, which can be grasped as a result of process ICN_CT1.1.1, is compared with the content identifier included in the Usage Pass sent from the transfer destination by PUT MASKED USAGE PASS WITH KEYED HASH command. In the case where the values of the content identifiers are consistent as the result of the comparison, it is confirmed that the Usage Pass for decrypting the content data exists in the transfer destination storage device, and the following process is continued. As the result of the comparison, in the case where the values of the content identifiers are not consistent, the process is aborted.

Process ICN_CT1.1.3: The two newest Session Keys K_s[P]m and K_s[1]n shared at the time point, the output control information 30000 relating to the data, the CID 29001, and the data to be outputted are concatenated, and a Keyed Hash value is calculated. The content identifier is decided by referring to the EN_CID CID table.

Process ICN CT1.1.4: The output control information 30000, the CID, and the Keyed Hash value obtained in Process ICN_CT1.1.3 are concatenated. The obtained data is ODCI||CID||Content data||H(K_s[P]m||K_s[1]n||ODCI||CID|| Content data). Here, the content data is the transfer object data actually recorded in the transfer source storage device.

With respect to process ICN_CT1.1.1 to ICN_CT1.1.4, also in the case where the transfer source device is not the storage device, they are basically the same except that places where the output control information and the objective content data are recorded or held are different.

When completing process ICN_CT1.1.4, the transfer source storage device sends the created data ODCI||CID||Content data||H(K_s[P]m||K_s[1]n||ODCI||CID|| Content data) to the Host Module. Incidentally, in 31061, the transfer data length specified by the Host Module may be the length of only the content data. Also in this case, there is no problem as long as an operation is made such that the lengths of the output control information and the content identifier are fixed, and in the case where the storage device receives READ SECTORS PROTECTED command, the content data with which the data is concatenated is outputted. This applies to WRITE SECTORS PROTECTED described below.

When receiving response data to READ SECTOR PROTECTED command, the Host Module 110 sends the data to the transfer destination storage device as it is subsequently to WRITE SECTORS PROTECTED command 31070 (31071). At this time, in 31071, the address information indicating the recording destination area is also specified. When the command and the address information are received, the storage controller 230 in the transfer destination storage device performs the following processes.

Process ICN_CT1.2.1: The verification of the Keyed Hash value is performed using the received data and the newest two Session Keys K_s[P]m and K_s[1]n held in itself. The keyed Hash value is calculated from the received output control information, the content identifier, the content data and the two Session Keys, and when it is consistent with the received Keyed Hash value, it is determined that no falsification is made. In the case where the Keyed Hash values are not consistent, the process is aborted.

Process ICN_CT1.2.2: The EN_CID CID table is searched using the received content identifier. In the case where there is an entry in which the content identifier is recorded, the EN_CID value is assigned and in the case where there is no entry, a new EN_CID CID entry is created in the table, and the EN_CID value is assigned to the received content data.

Process ICN_CT1.2.3: The received content data, the output control information and EN_CID information determined in process ICN_CT1.2.2 are added to the area specified by the address information specified in 31071, and the data is recorded in the form as shown in FIG. 30. In the case where the transfer destination device is not the storage device, this writing process is not executed.

Incidentally, when the transfer destination device completes Connection Stage 31020, with respect to the write command, in the case where a normal write command other than a specific command such as WRITE SECTORS PROTECTED is received, the process is aborted. By this, after the Host Module 110 receives the output control information, the content identifier and the content data with Keyed Hash as the result of READ SECTORS PROTECTED, a process to delete the control information, the identifier and the Keyed Hash and to send or record them to the transfer destination can not be executed.

Besides, in the above, according to the value of the output control information or after the completion of the Connection Stage, the read command and write command are not executed except for the expansion command (READ SECTORS PROTECTED, WRITE SECTORS PROTECTED), however, a standard command such as READ SECTORS 31010 may be made executable. However, in this case, it is necessary to provide such a regulation that after the completion of the Connection Stage, output control information, a content identifier, and a Keyed Hash value are always included at a specified position in data to be transferred. Such an example is shown in FIG. 34.

Figure 34:
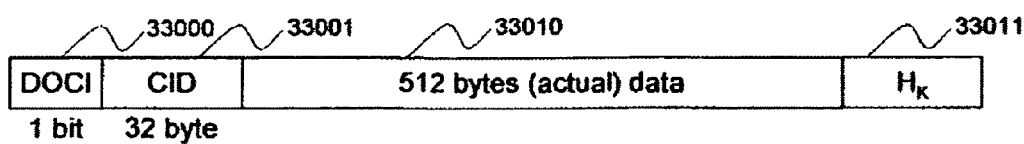
FIG. 34—A view showing a format of data in the case where data whose output control is required is transferred from one equipment to the other equipment by standard read and write commands.

FIG. 34 shows a data structure in the case where data of one sector is read a the standard command after the Connection Stage is completed. Each sector includes output control information (ODCI) 33000, a content identifier (CID) 33001, content data 33010, and a keyed Hash value 33011. The transfer destination device having received the standard write command specifies the position where the Keyed Hash value is embedded, and verifies the keyed Hash value. When the verification fails, the process is aborted.

In the above, although the description has been given to the case where the transfer source device and the transfer destination device establish one connection, the state may be such that the respective devices are connected to individual recorder/players, and both the recorder/players are connected through a network. In this case, in the drawing, the Host Module 110 is divided into two parts, and the network interface unit 100 to control network communication is provided between both. In that case, the provided network interface unit merely transfers data with respect to the Host Security Manager and the Storage Security Manager as the transfer source and the transfer destination through the Host Modules to which those are connected.

By the method described above, even in the encrypted content data, in the case where there is no information for decrypting the content data in the transfer destination storage device, the output of the content data from the transfer source storage device can be stopped.

Transfer Process Sequence of Content Data Under Two Connections

Figure 32:
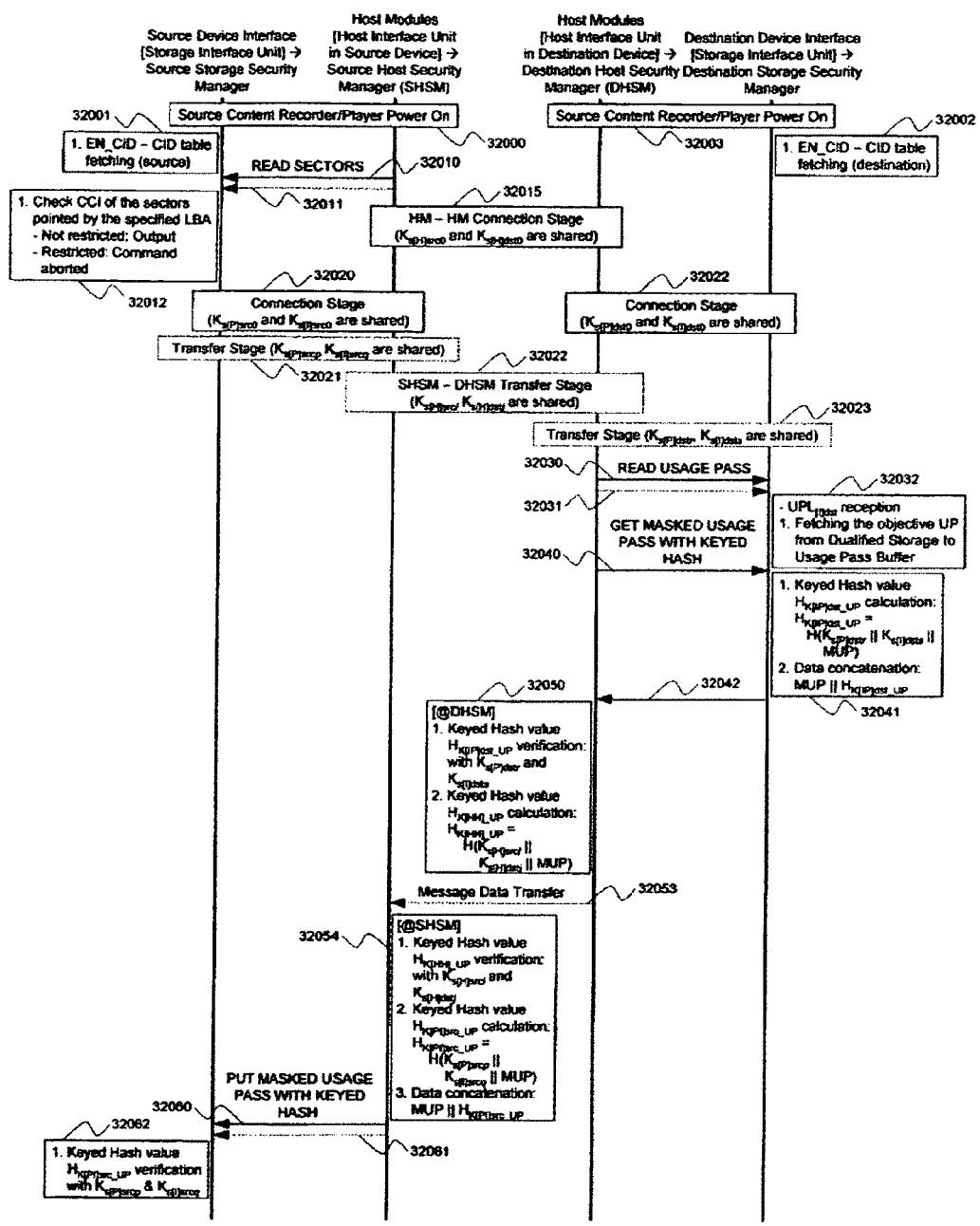
FIG. 32—A view showing an output process sequence from one equipment to the other equipment in the case where two Connections are established with respect to content whose output control is required.
Figure 33:
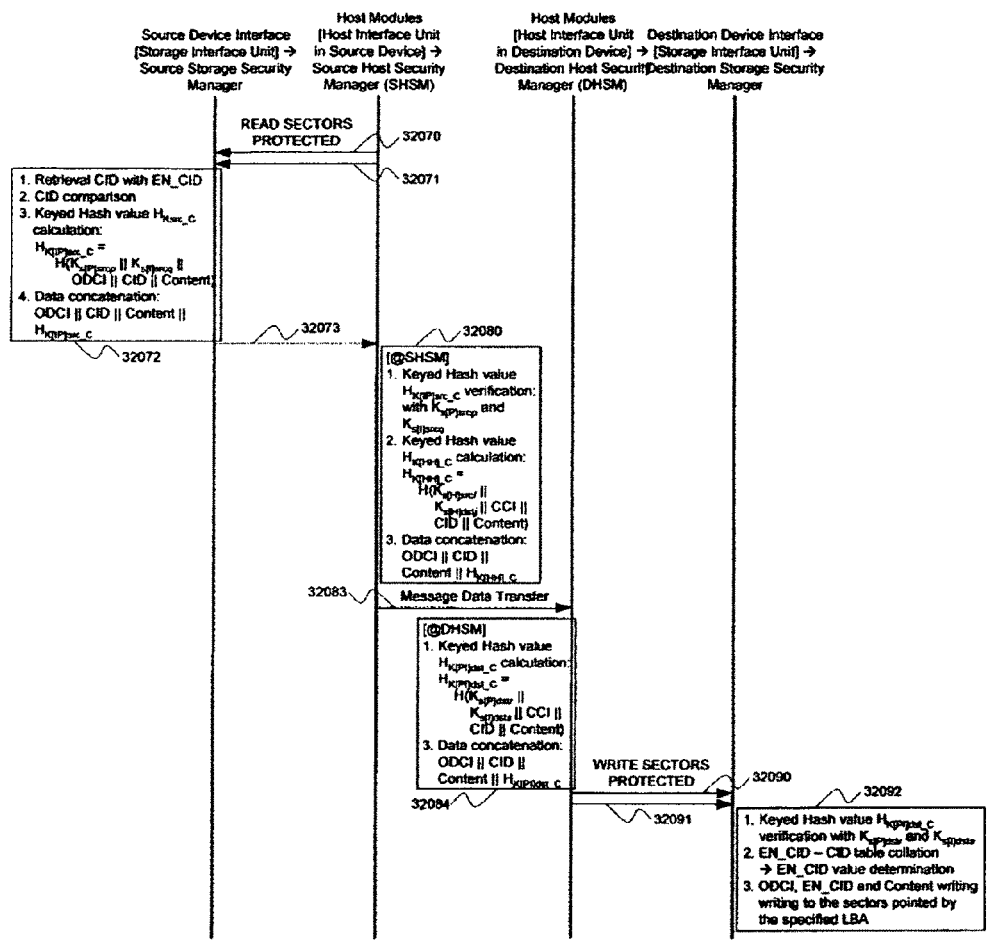
FIG. 33—A view showing an output process sequence from one equipment to the other equipment in the case where two Connections are established with respect to content whose output control is required.

By mainly referring to FIG. 32 and FIG. 33 and appropriately referring to FIG. 28, FIG. 29, FIG. 30 and FIG. 22, a description will be given to a process sequence to transfer content data from a device (hereinafter referred to as a transfer source device) as a transfer source of the content data to a device (hereinafter referred to as a transfer destination device) as a transfer destination in the case where two different connections are established between the device (storage device) in which the objective content data is recorded or the device (recording device) to create the content data and the output destination device (storage device or playback device) of the content data. Incidentally, the process sequence shown in FIG. 32 and FIG. 33 has the following two premises.

(1) Two different connections exist between a transfer source device and a transfer destination device.

(2) Both the transfer source device and the transfer destination device are storage devices.

In the following, a description will be given to a process sequence in the case where transfer of content data is performed from the transfer source device to the transfer destination device based on the above two premises. In the following, the description will be made on the premise that both the transfer source device and the transfer destination device are storage devices.

First, when the transfer source device and the transfer destination device are started (32000, 32003), each of the transfer source storage device and the transfer destination storage device reads an EN_CID CID table recorded in the hidden area 28000 from the storage medium 200, and temporally stores it in the SC Buffer in the storage controller 230, which can be accessed at high speed. The process in the transfer source storage device is denoted by 32001, and similarly, the process in the transfer destination storage device is denoted by 32002. Incidentally, the EN_CID CID table is not necessarily read at the time of start and is stored in the SC Buffer as stated above, but may be read out in the storage device each time the data stored in the accessible area is read.

Next, consideration will be given to the case where, in order to transfer the objective content data, the transfer source Host Module sends READ SECTORS command 31010 to the transfer source storage device. It is assumed that this command is a conventionally regulated standard read command to read data recorded in the transfer source storage device. In the case where the Host Module sends this command to the transfer source storage device, address information of the area where the data to be read is recorded is notified to the transfer source device in 32011. When receiving the command, the conventional storage device sends the data recorded in the area specified by the address information specified in 32011 to the Host Module.

On the other hand, when the storage device having the function according to embodiments of the invention receives the command 32010 and the address information 32011 in which data is recorded, when objective data is read from an area specified by the address information and is transferred to the storage controller 230, the output control information 30000 of the area is confirmed in the inside of the device. In the case where the output control information is 1, the process of the command is aborted. At this time, when the reason of the abort is notified as a parameter to the Host Module from the storage device, there is a merit that the Host Module can know the reason why the command is aborted, however, such a function is not essential. Actually, for example, in interface standards for magnetic disk device, such as AT Attachment, such a read command is not regulated.

Figure 22:
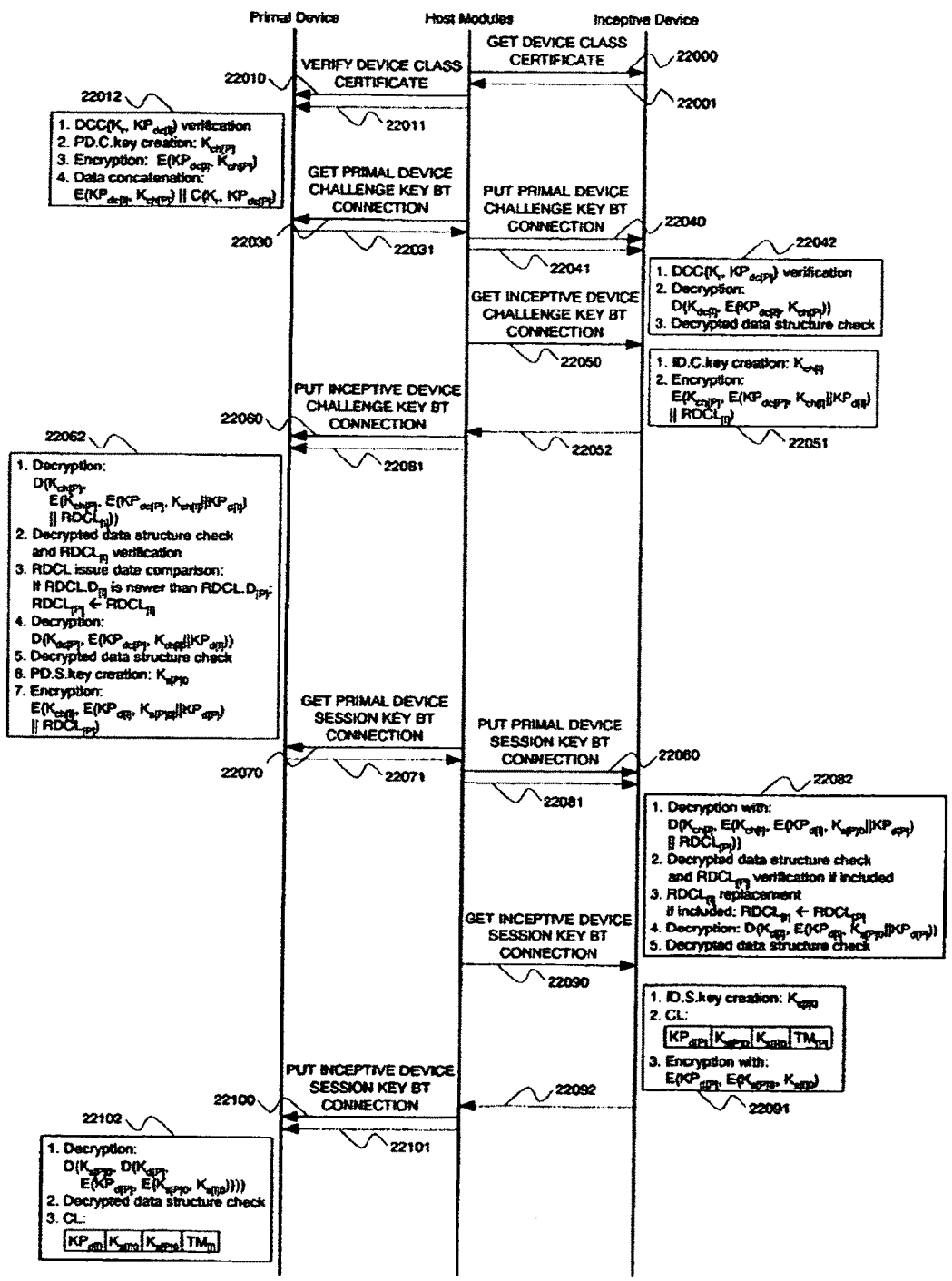
FIG. 22—A view showing a mutual authentication process sequence performed between the recorder/player and the magnetic disk device in accordance with BT mode in an embodiment.

When the read command of the content data to the transfer source storage device is aborted by the storage device, the transfer source Host Module causes the Connection Stage 32020 shown in FIG. 22 to be executed between the Host Security Module in the transfer source device and the storage security module in the transfer source storage device. Similarly, the transfer destination Host Module causes the Connection Stage 32022 to be executed between the Host Security Module in the transfer destination device and the Storage Security Module in the transfer destination storage device. Besides, the Connection Stage 32015 is executed between the Host Security Module in the transfer source device and the Host Security Module in the transfer destination device. In such a case, there are the following nine kinds of connections established between the Host Security Manager and the Storage Security Manager in the transfer source device and the transfer destination device.

(2CN_UTUT1) Connection in UT mode; in transfer source device: Storage Security Manager (Primal Device), Host Security Manger (Inceptive Device); in transfer destination device: Host Security Manager (Primal Device), Storage Security Manager (Inceptive Device)

(2CN_UTUT2Connection in UT mode; in transfer source device: Storage Security Manager (Primal Device), Host Security Manager (Inceptive Device); in transfer destination device: Host Security manager (Inceptive Device), Storage Security Manager (Primal Device)

(2CN_UTUT3) Connection in UT mode; in transfer source device: Storage Security Manager (Inceptive Device), Host Security Manager (Primal Device); in transfer destination device: Host Security Manager (Primal Device), Storage Security Manager (Inceptive Device)

(2CN_UTUT4) Connection in UT mode; in transfer source device: Storage Security Manager (Inceptive Device), Host Security Manager (Primal Device); in transfer destination device: Host Security Manager (Inceptive Device), Storage Security Manager (Primal Device)

(2H_CNBTBT1) Connection in BT mode; in transfer source device: Storage Security Manager (Inceptive Device), Host Security Manager (Primal Device); in transfer destination device: Host Security Manager (Primal Device), Storage Security Manager (Inceptive Device)

(2H_CNUTBT1) in transfer source device: Connection in UT mode; Storage Security Manager (Primal Device), Host Security Manager (Inceptive Device); in transfer destination device: Connection in BT mode; Host Security Manager (Primal Device), Storage Security Manager (Inceptive Device)

(2CN_UTBT2) in transfer source device: Connection in UT mode; Storage Security Manager (Inceptive Device), Host Security Manager (Primal Device); in transfer destination device: Connection in BT mode; Host Security Manager (Primal Device), Storage Security Manager (Inceptive Device)

(2CN_BTUT1) in transfer source device: Connection in BT mode; Storage Security Manager (Inceptive Device), Host Security Manager (Primal Device); in transfer destination device: Connection in UT mode; Host Security Manager (Primal Device), Storage Security Manager (Inceptive Device)

(2CN_BTUT2) in transfer source device: Connection in BT mode; Storage Security Manager (Inceptive Device), Host Security Manager (Primal Device); in transfer destination device: Connection in UT mode; Host Security Manager (Inceptive Device), Storage Security Manager (Primal Device)

Even if the Connection Stage is completed by any of the nine kinds of methods, two 0th-order Session Keys K_s[P]scr0 and K_s[1]scr0, K_s[P]dst0 and K_s[1]dst0 are shared between the Storage Security Manager and the Host Security Manager in the transfer source device and the transfer destination device. Incidentally, the SHSM DHSM Connection Stage 32015 executed between the Host Security Manager in the transfer source device and the Host Security Manager in the transfer destination device may be realized by well-known DTCP (http://www.dtcp.com/) or SSL (http://wp-.netscape.com/eng/ss13/). Alternatively, apart from an command system, a form may be such that message data is exchanged by the same method as the method described in FIG. 18 or FIG. 22, so that authentication is completed between both devices, and secret information is shared. In any method, it is assumed that at the time point when the Connection Stage 32015 is completed, sharing of K_s[H]src0 and K_s[H]dst0 is completed between the Host Security Manager in the transfer source device and the Host Security Manager in the transfer destination device.

After the Connection Stage 32020 in the transfer source device and the Connection Stage 32022 in the transfer destination device are completed, when the Transfer Stage 32021 and 32023 are respectively executed n times and m times in the UT mode in the transfer source device or the transfer destination device (direction is arbitrary), Session Keys finally shared in the transfer source device become K_s[P]src0 and K_s[1]srcn, and finally shared Session Keys in the transfer destination device become K_s[P]dst0 and K_s[1]dstm. On the other hand, in the transfer source device, in the BT mode, when the Transfer Stage 32021 from the Primal Device to the Inceptive Device is executed p times, and the Transfer Stage 32021 from the Inceptive Device to the Primal Device is executed q times, the finally shared Session Keys in the transfer source device become K_s[P]srcp and K_s[1]srcq. Similarly, in the transfer destination device, in the BT mode, when the Transfer Stage 32023 from the Primal Device to the Inceptive Device is executed r times, and the Transfer Stage 32023 from the Inceptive Device to the Primal Device is executed s times, the finally shared Session Keys in the transfer source device become K_s[P]dstr and K_s[1]dsts.

From the above, as a result of 32021 and 32023, the finally shared Session Keys are temporally made K_s[P]scrp, K_s[1]srcq, K_s[P]dstr and K_s[1]dsts, however, in the case where the Transfer Stage has never been executed, the values of p, q, r and s remain 0. With respect to the SHSM DHSM Transfer Stage 32022 executed between both the devices in order to connect the Transfer Stage 32021 executed in the transfer source device and the Transfer Stage 32023 executed in the transfer destination device, the objective Usage Pass transfer may be realized by exchanging message data by DTCP, SSL or the same method as the method described by use of FIG. 19 or FIG. 24 as described above. In any method, it is assumed that at the time point when the SHSM DHSM Transfer Stage is completed, sharing of K_s[H]srci and K_s[H]dstj is completed between the Host Security Manager in the transfer source device and the Host Security Manager in the transfer destination device. Incidentally, according to the method, there is a case where even if the Usage Pass transfer process is repeated, the values of i and j continue to be constant, and the update of the key data is not performed.

When the Connection Stage is completed, the transfer destination Host Module sends READ USAGE PASS command 32030 to the transfer destination storage device. In this command, the address 32031 indicating the area where the usage Pass is recorded is simultaneously sent to the storage device. The object of the command is to read the Usage Pass, which can decrypt the content data to be transferred, from the Qualified Storage. The process in the storage device in the case where READ USAGE PASS command is received is the same as that described in 19000, 19001 and 19002 in FIG. 19 or 23000, 23001 and 23001 in FIG. 23. On the other hand, in the case where the transfer destination device is not the storage device, a process to read the objective Usage Pass from the Qualified Storage is not performed, but only a process to specify necessary Usage Pass from Usage Pass held in the transfer destination device is performed.

Next, the transfer destination Host Module sends GET MASKED USAGE PASS WITH KEYED HASH command to the transfer destination storage device. In the transfer destination storage device, the Masked Usage Pass is created from the Usage Pass read out to the Usage Pass Buffer 510 by READ USAGE PASS command 32030. In parallel thereto, a keyed Hash value is calculated by using the newest Session Keys K_s[P]dstr and K_[1]dsts created respectively in the Primal Device and the Inceptive Device. The obtained data is concatenated as set forth below, and are sent to the transfer destination Host Module 32042: MUP∥H(K_s[P]dstr∥K_[1]dsts∥MUP). The process in the storage device in the case where GET MASKED USAGE PASS WITH KEYED HASH command is received is the same as that described in process BT3.2.1 and process BT3.2.2 except that the values of the shared newest Session Keys are different. Also in the case were the transfer destination device is not the storage device, the Masked Usage Pass is created from the Usage Pass held in the inside similarly to the above.

When receiving the Masked Usage Pass with which the Keyed Hash is concatenated, the transfer destination Host Module sends the data as it is to the Host Security Manager. Next, the Host Security Manager verifies whether or not falsification is made on the received data. The verification method is the same as that described in process BT3.3.1 except that the values of the shared newest Session Keys are different. When the verification is completed, Keyed Hash is calculated by the same method using the newest Session Keys K_s[H]srci and K_s[H]dstj shared between the Host Security Manager and the Host Security Manager in the transfer source device, and is concatenated with the received Masked Usage Pass. The obtained data is MUP∥H(K_s[H]srci∥K_s[H]dstj∥MUP) (32050). The message data is sent to the transfer source device (32053).

When receiving the Masked Usage Pass with which the Keyed Hash is concatenated, the transfer source device verifies whether or not falsification is made on the received data in the Host Security Manager. The verification method is the same as that described in process BT3.3.1 except that the values of the shared newest Session Keys are different. When the verification is completed, the Keyed Hash is calculated by the same method using the newest Session Keys K_s[P]srcp and K_s[1]srcq shared between the Host Security Manager and the Storage Security Manager, and is concatenated with the received Masked Usage Pass. The obtained data is MUP∥H(K_s[P]srcp∥K_s[1]srcq∥MUP) (32054).

When the creation of the Masked Usage Pass with which the Keyed Hash is concatenated is completed, the transfer source Host Module sends the data to the transfer source storage device (32061). The sending is executed by PUT MASKED USAGE PASS WITH KEYED HASH command 32060.

When receiving the Masked Usage Pass with which the Keyed Hash is concatenated, the transfer source storage device verifies whether or not falsification is made on the received data. The verification method is the same as that described in process BT3.3.1 except that the values of the shared newest Session Keys are different. Also in the case where the transfer source device is not the storage device; the same applies.

Subsequently to PUT MASKED USAGE PASS WITH KEYED HASH command 31060, the transfer source Host Module sends READ SECTORS PROTECTED command 32070, together with the address information indicating the area where the objective content data is recorded and the transfer data length 31071, to the transfer source storage device. When receiving the command and the address information, the storage controller 230 in the transfer source storage device performs the following processes.

Process 2CN_CT1.1.1: The output control information 30000 recorded in the area indicated by the received address information and EN_CID value 30001 are confirmed. In the case where the output control information is 1, the EN_CID value is confirmed, and it is grasped from the EN_CID table held in the SC Buffer that the data recorded in the specified area corresponds to which CID.

Process 2CN_CT1.1.2: The content identifier corresponding to the data recorded in the specified area, which can be grasped as the result of process 2CN_CT1.1.1, is compared with the content identifier included in the Usage Pass sent from the transfer destination by PUT MASKED USAGE PASS WITH KEYED HASH command. As a result of the comparison, in the case where the values of the content identifiers are consistent with each other, this means that it is confirmed that the Usage Pass for decrypting the content data exists in the transfer destination storage device, and the subsequent process is continued. As a result of the comparison, in the case where the values of the content identifiers are not consistent with each other, the process is aborted.

Process 2CN_CT1.1.3: The two newest Session Keys K_s[P]srcp and K_s[1]srcq shared at the time point, the output control information 30000 relating to the data, CID 29001, and the data to be outputted are concatenated, and a Keyed Hash value is calculated. The content identifier is decided by referring to the EN_CID CID table.

Process 2CN_CT1.1.4: The output control information 30000, the CID, and the Keyed Hash value obtained in process 2CN_CT1.1.3 are concatenated. The obtained data is ODCI||CID||Content data||H(K_s[P]srcp||K_s[1]srcq||ODCI||CID||Content data). Here, the Content data is the transfer object data actually recorded in the transfer source storage device.

When completing process 2CN_CT1.1.4, the transfer source storage device sends the created data ODCI||CID||Content data||H(K_s[P]srcp||K_s[1]srcq||ODCI||CID Content data) to the transfer source Host Module. Incidentally, the transfer data length specified by the transfer source Host Module in 32071 may be the length of only the content data. Also in this case, there is no problem as long as the operation is made such that the lengths of the output control information and the content identifier are fixed, and in the case where the storage device receives READ SECTORS PROTECTED command, the content data with which the data is concatenated is outputted. This applies to WRITE SECTORS PROTECTED described later.

When receiving ODCI||CID||Content data with which the Keyed Hash is concatenated, the transfer source device verifies, in the Host Security Manager, whether or not falsification is made on the received data. The verification method is the same as that described in process BT3.3.1 except that the values of the shared newest Session Keys are different. When the verification is completed, the Keyed Hash is calculated by the same method using the newest Session Keys K_s[P]srcp and K_s[1]srcq shared between the Host Security Manager and the Storage Security Manager, and is concatenated with the received ODCI||CID||Content data. The obtained data is ODCI||CID||Content data||H(K_s[H]srci||K_s[H]dstj||ODCI||CID||Content data) (32080). The message data is sent to the transfer source device (32083).

When receiving ODCI||CID||Content data with which the Keyed hash is concatenated, the transfer destination Host Security Manager verifies whether or not falsification is made on the received data. The verification method is the same as that described in process BT3.3.1 except that the values of the shared newest Session Keys are different. When the verification is completed, Keyed Hash is calculated by the same method using the newest Session Keys shared between the Host Security Manager and the Storage Security Manager, and is concatenated with the received ODCI||CID||Content data. The obtained data is ODCI||CID||Content data||H(K_s[P]dstr||K_s[1]dsts||ODCI||CID||Content data) (32080).

The transfer destination Host Module sends the created data ODCI||CID||Content data||H(K_s[P]dstr||K_s[1]dsts||ODCI||CID||Content data) to the transfer destination storage device subsequently to WRITE SECTORS PROTECTED command 32090 (32091). At this time, in 31091, the address information indicating the record destination area is also specified. When receiving the command and the address information, the storage controller 230 in the transfer destination storage device performs the following processes.

Process 2CN_CT1.2.1: The verification of the Keyed Hash value is performed using the received data and the two newest Session Keys K_s[P]dstr and K_s[1]dsts held by itself. The Keyed Hash value is calculated from the received output control information, the content identifier, the content data and the two session keys, and when it is consistent with the received Keyed Hash value, it is determined that no falsification is made. In the case where the Keyed Hash values are not consistent with each other, the process is aborted.

Process 2CN_CT1.2.2: The EN_CID CID table is searched by using the received content identifier. In the case where there is an entry in which the content identifier is recorded, the EN_CID value is assigned, and in the case where there is no entry, a new EN_CID CID entry is created in the table, and the EN_CID value is assigned to the received content data.

Process 2CN_CT1.2.3: The received content data, the output control information, and EN_CID information decided in process 2CN_CT1.2.2 are added to the area specified by the address information specified in 31071, and the data is recorded in the form as shown in FIG. 30. In the case where the transfer destination device is not the storage device, the write process is not executed.

Incidentally, when the transfer destination device completes the Connection Stage 31020, with respect to the write command, in the case where a normal write command other than a specific command such as WRITE SECTORS PROTECTED is received, the process is aborted. By this, after the Host Module receives the output control information, the content identifier and the content data with Keyed hash as the result of READ SECTORS PROTECTED, a process to delete the control information, the identifier, and the Keyed Hash and to send or record them to the transfer destination can not be executed.

In the above, according to the value of the output control information or after the completion of the Connection Stage, the read command and the write command are not executed except for the expansion command (READ SECTORS PROTECTED, WRITE SECTORS PROTECTED), however, a standard command such as READ SECTORS 31010 may be executed. However, in this case, it is necessary to provide such a regulation that after the completion of the Connection Stage, the output control information, the content identifier and the Keyed Hash value are always included at a specific position in the data to be transferred. Such an example is shown in FIG. 34.

Although the description has been given to the case where the transfer source device and the transfer destination device establish one connection, the state may be such that the respective devices are connected to individual recorder/players, and both the recorder/players are connected through a network. In this case, in the drawing, a portion where commands and data flow is formed between the transfer source Host Module and the transfer destination Host Module. In this case, the Connection Stage is executed between the transfer source Host Security Manager and the transfer destination Host Security Manager (mode may be UT mode or BT mode), and Session Keys shared only between them are shared. The Keyed Hash value is calculated in 32050 and 32080 using the shared Session Keys, and is sent to the Host Module of the communication partner, and after verification, Keyed Hash calculation is newly again performed using the Session Keys shared between the transfer source device and the transfer destination storage device.

By the above method, even in the encrypted content data, in the case where information to decrypt the content data does not exist in the transfer destination storage device, the output of the content data from the transfer source storage device can be stopped.

In the above, although particular embodiments have been described, the invention is not limited to the embodiments described above. Besides, embodiments of the invention could be variously modified and carried out, or could be applied to another device and system. For example, the names of the commands and the modules described in the embodiments are merely an example, and no limitation is made to the above embodiments. For example, there is also a case where the Usage Pass in one embodiment is called license information or confidential information.

Besides, in the above embodiments, although the security management of the content data in the system including the recorder/player and the magnetic disk device has been described, as a system and its component device according to another embodiment, an application can be made to a device other than the recorder/player and the magnetic disk device. That is, as long as the characteristic process function to deal with the control information for managing the decryption of the content data is included, no limitation is made to the recorder/player and the magnetic disk device. As long as the characteristic process function is included, for example, the storage device may be one other than the magnetic disk device, for example, a semiconductor memory, and the recorder/player may be a host computer to which a storage device is connected.

Besides, in another modified example, as long as tamper resistant features are logically ensured, it is not always necessary that the protected storage area to store the key data and the like of the embodiment is the memory physically having the tamper resistant features.

What is claimed is:

1. A content data management system for transferring encrypted content data stored in a storage area of a storage device, the content data management system comprising:
   a storage device, the storage device comprising:
      a storage area, the storage area comprising:
         an accessible area, the accessible area including a data area and an extension area, wherein the data area can be accessed from outside by address specification and where the encrypted content data is recorded, and wherein the extension area cannot be accessed from outside by address specification and is accessed autonomously inside the storage according to a predetermined procedure whenever a corresponding encrypted content data is accessed; and
         a hidden area, wherein the hidden area can be accessed from outside only in a case where a predetermined authentication is completed, and in which content identifier assigned to the content data and an identifier to identify the data area where the content identifier is recorded, is recorded as one entry,
      wherein within the extension area, control information to control output of the content data and the identifier recorded together with the content identifier for the content data in an entry in the hidden area and the control information includes information comprising:
         a first mode in which output of the content data to a use device is allowed in accordance with a predetermined protocol in a case where there is information to decrypt the content data is in the use device; and
         a second mode in which the output of the content is allowed without limitation, wherein the content data management system is further characterized in that an authentication process of validity is mutually performed between the storage device (second device) and the use device (first device) to use content data outputted from the storage device, key data (symmetric key data) is shared between the first and the second device in a valid case as a result of the authentication process; and
      a processing unit coupled with the storage device, the processing unit configured for using the symmetric key data to verify data to be transferred between the first and the second device, and confirming whether there is an entry relating to the content identifier recorded in the hidden area,
   wherein the second device receives a read command, confirms whether the control information recorded in the accessible area is the first mode or the second mode, aborts a process in a case where the read command is a normal command, calculates a Hash value from the symmetric key data in a case where the read command is a specific command, concatenates the Hash value with the control information, the content identifier, and the content data to be read, and outputs the control information, the content identifier, and the content data to be read, and wherein the first device receives a write command, confirms an entry including the content identifier in a case where verification of the Hash value included in received data is successful, correlates entry identification information with the content identifier and records the entry identification information and the content identifier in a sector for recording the content data.

2. The content data management system according to claim 1, characterized in that in the valid case as the result of the authentication process, two session keys are shared between the first and the second device, wherein hash data is created from masked Usage Pass (Masked Usage Pass) including at least the two session keys that are shared and the entry identification information and the content identifier, and the Hash data is concatenated with the Masked Usage Pass, and is sent to the first or the second device as a transfer source, wherein the first or the second device as the transfer source verifies received data, and uses the content identifier included in the Masked Usage Pass to confirm a relation between the entry identification information and the content identifier.

3. The content data management system according to claim 1, characterized in that an inquiry is made to both the first and the second device as to a data transfer function of the first and second device by control of a process unit, as a result of the inquiry, with respect to data transfer between both the devices, a transfer mode is set to one of a first transfer mode in which transfer of the control information is performed in one direction from the first device to the second device, and a second transfer mode in which transfer of the control information is performed in both directions between both the devices, an authentication process of validity is mutually performed between the first and the second device, key data (symmetric key data) is shared between the first and the second device in a valid case as a result of the authentication process, wherein the symmetric key data is used to perform an encryption process of the control information by the first or the second device, wherein the control information encrypted by one of the devices is transferred to the other device in accordance with the set first or second transfer mode, and the first device having received the control information decrypts the control information by using the symmetric key data, and decrypts the content data by using the decrypted control information.

4. The content data management system according to claim 1 characterized in that: in transfer of the control information in the second transfer mode, the first device creates a transaction log relating to a process of the control information, and stores it in the first protected storage area, in a case where a process is not normally performed at a time of transfer of the control information, the first device refers to the transaction log stored in the first protected storage area to create symmetric key data, and sends it to the second device.

5. A content data management system for transferring encrypted content data stored in a storage area of a storage device, the content data management system comprising:
a storage device comprising:
a storage area, the storage area comprising:
an accessible area, the accessible area including a data area and an extension area, wherein the data area can be accessed from outside by address specification and where the encrypted content data is recorded, and wherein the extension area cannot be accessed from outside by address specification and is accessed autonomously inside the storage according to a predetermined procedure whenever a corresponding encrypted content data is accessed; and a hidden area, which can be accessed from outside only in a case where a predetermined authentication is completed, and in which content identifier assigned to the content data and an identifier to identify the data area where the content identifier is recorded, is recorded as one entry,
wherein within the extension area, control information to control output of the content data and the identifier recorded together with the content identifier for the content data in an entry in the hidden area and the control information includes information comprising:
a first mode in which output of the content data to a use device is allowed in accordance with a predetermined protocol in a case where there is information to decrypt the content data is in the use device; and
a second mode in which the output of the content is allowed without limitation,
wherein the first device includes a buffer to read the entry of entry identification information and the field of the content identifier from the hidden area and to store it in a table form; and
a processing unit coupled with the storage device, the processing unit configured for:
searching a table to confirm whether there is an entry in which a relevant content identifier is recorded, the content data management system further characterized in that an authentication process of validity is mutually performed between the storage device (second device) and the use device (first device) to use content data outputted from the storage device, key data (symmetric key data) is shared between the first and the second device in a valid case as a result of the authentication process;
using the symmetric key data to verify data to be transferred between the first and the second device; and
confirming whether there is an entry relating to the content identifier recorded in the hidden area,
wherein the second device receives a read command, confirms whether the control information recorded in the accessible area is the first mode or the second mode, aborts a process in a case where the read command is a normal command, calculates a Hash value from the symmetric key data in a case where the read command is a specific command, concatenates the Hash value with the control information, the content identifier, and the content data to be read, and outputs the control information, the content identifier, and the content data to be read, and
wherein the first device receives a write command, confirms an entry including the content identifier in a case where verification of the Hash value included in received data is successful, correlates the entry identification information with the content identifier and records the entry identification information and the content identifier in a sector for recording the content data.

6. The content data management system according to claim 5, characterized in that in the valid case as the result of the authentication process, two session keys are shared between the first and the second device, wherein hash data is created from masked Usage Pass (Masked Usage Pass) including at least the two session keys that are shared and the entry identification information and the content identifier, and the Hash data is concatenated with the Masked Usage Pass, and is sent to the first or the second device as a transfer source, wherein the first or the second device as the transfer source verifies received data, and uses the content identifier included in the Masked Usage Pass to confirm a relation between the entry identification information and the content identifier.

7. The content data management system according to claim 5, characterized in that an inquiry is made to both the first and the second device as to a data transfer function of the first and second device by control of a process unit, as a result of the inquiry, with respect to data transfer between both the devices, a transfer mode is set to one of a first transfer mode in which transfer of the control information is performed in one direction from the first device to the second device, and a second transfer mode in which transfer of the control information is performed in both directions between both the devices, an authentication process of validity is mutually performed between the first and the second device, key data (symmetric key data) is shared between the first and the second device in a valid case as a result of the authentication process, wherein the symmetric key data is used to perform an encryption process of the control information by the first or the second device, wherein the control information encrypted by one of the devices is transferred to the other device in accordance with the set first or second transfer mode, and the first device having received the control information decrypts the control information by using the symmetric key data, and decrypts the content data by using decrypted control information.

8. The content data management system according to claim 5 characterized in that: in transfer of the control information in the second transfer mode, the first device creates a transaction log relating to a process of the control information, and stores it in the first protected storage area, in a case where a process is not normally performed at a time of transfer of the control information, the first device refers to the transaction log stored in the first protected storage area to create symmetric key data, and sends it to the second device.

9. A content data management system for transferring encrypted content data stored in a storage area of a storage device, the content data management system comprising:
a storage device comprising:
a storage area, the storage area comprising:
an accessible area, the accessible area including a data area and an extension area, wherein the data area can be accessed from outside by address specification and where the encrypted content data is recorded, and wherein the extension area cannot be accessed from outside by address specification and is accessed autonomously inside the storage according to a predetermined procedure whenever a corresponding encrypted content data is accessed; and
a hidden area, which can be accessed from outside only in a case where a predetermined authentication is completed, and in which content identifier assigned to the content data and an identifier to identify the data area where the content identifier is recorded, is recorded as one entry,
wherein within the extension area, control information to control output of the content data and the identifier recorded together with the content identifier for the content data in an entry in the hidden area and the control information includes information comprising:
a first mode in which output of the content data to a use device is allowed in accordance with a predetermined protocol in a case where there is information to decrypt the content data is in the use device; and
a second mode in which the output of the content is allowed without limitation,
wherein the first device comprises:
an interface to connect the second device;
a recording module to perform a process for recording the acquired content data;
a playback module to perform a process for playing back the content data sent from outside or from the second device through the interface;
a first protected storage area to hold key data used for encrypting at least the content data;
a Host Security Manager to create control information including key data for decrypting the encrypted content data and a condition for decrypting the content data; and
a host process unit to control data transfer performed with respect to the second device,
wherein the second device comprises:
a content storage unit to store at least the content data sent from the first device through the interface;
the accessible area to hold at least the control information; and
a transfer module to perform transfer control of information transferred to and from the first device through the interface,
wherein the host process unit inquires of the recording module or the playback module and the second device about a data transfer function of the device, and sets, as a result of the inquiry, with respect to data transfer between the first and the second device, a transfer mode of one of a first transfer mode, in which transfer of the control information is performed in one direction from the first device to the second device, and a second transfer mode, in which transfer of the control information is performed in both directions between both the devices,
wherein the Host Security Manager verifies information relating to characteristics of the second device to perform authentication,
wherein the transfer module of the second device verifies information relating to characteristics of the recording module of the first device or the playback module and performs authentication, and in a valid case as a result of the authentication process, key data (common data) is shared between the first device and the second device,
wherein in a case where the first transfer mode is set, the Host Security Manager encrypts the created control information by using the symmetric key data, and transfers the encrypted control information to the second device through the interface,
wherein in a case where the second transfer mode is set, the Host Security Manager encrypts the created control information by using the symmetric key data, and transfers the encrypted control information to the second device through the interface, or the transfer module encrypts the control information by using the symmetric key data, and transfers the encrypted control information to the first device through the interface, and
wherein the playback module of the first device decrypts the received control information by using the symmetric key data, and decrypts the content data by using the decrypted control information.

10. The content data management system according to claim 9, characterized in that an authentication process of validity is mutually performed between the storage device (second device) and a use device (first device) to use content data outputted from the storage device, key data (symmetric key data) is shared between the first and the second device in a valid case as a result of the authentication process, wherein a processing unit uses the symmetric key data to verify data to be transferred between the first and the second device, and confirms whether there is an entry relating to the content identifier recorded in the hidden area, wherein the second device receives a read command, confirms whether the control information recorded in the accessible area is the first mode or the second mode, aborts a process in a case where the read command is a normal command, calculates a Hash value from the symmetric key data in a case where the read command is a specific command, concatenates the Hash value with the control information, the content identifier, and the content data to be read, and outputs them, wherein the first device receives a write command, confirms an entry including the content identifier in a case where verification of the Hash value included in received data is successful, correlates the entry identification information with the content identifier and records them in a sector for recording the content data.

11. The content data management system according to claim 9, characterized in that in the valid case as the result of the authentication process, two session keys are shared between the first and the second device, wherein hash data is created from masked Usage Pass (Masked Usage Pass) including at least the two session keys that are shared and the entry identification information and the content identifier, and the Hash data is concatenated with the Masked Usage Pass, and is sent to the first or the second device as a transfer source, wherein the first or the second device as the transfer source verifies received data, and uses the content identifier included in the Masked Usage Pass to confirm a relation between the entry identification information and the content identifier.

12. The content data management system according to claim 9, characterized in that an inquiry is made to both the first and the second device as to a data transfer function of the first and the second device by control of a process unit, as a result of the inquiry, with respect to data transfer between both the devices, a transfer mode is set to one of a first transfer mode in which transfer of the control information is performed in one direction from the first device to the second device, and a second transfer mode in which transfer of the control information is performed in both directions between both the devices, an authentication process of validity is mutually performed between the first and the second device, key data (symmetric key data) is shared between the first and the second device in a valid case as a result of the authentication process, wherein the symmetric key data is used to perform an encryption process of the control information by the first or the second device, wherein the control information encrypted by one of the devices is transferred to the other device in accordance with the set first or second transfer mode, and the first device having received the control information decrypts the control information by using the symmetric key data, and decrypts the content data by using decrypted control information.

13. The content data management system according to claim 9, characterized in that in transfer of the control information in the second transfer mode, the first device creates a transaction log relating to a process of the control information, and stores it in the first protected storage area, in a case where a process is not normally performed at a time of transfer of the control information, the first device refers to the transaction log stored in the first protected storage area to create symmetric key data, and sends it to the second device.

14. A content data management method for transferring encrypted content data stored in a storage area of a storage device, the content data management method comprising:
providing a storage area comprising an accessible area accessible from outside by address specification;
providing a hidden area which can be accessed from outside only in a case where an authentication condition is satisfied;
storing control information to control output of the content data and entry identification information in the accessible area;
storing in the hidden area an entry including the entry identification information and a field of a content identifier to identify content data;
allowing, in accordance with a predetermined protocol, the output of control information capable of decrypting the content data to a use device, wherein the control information includes information to control a first mode;
allowing the output without limitation in a second mode;
mutually performing, between the storage device (second device) and the use device (first device), an authentication process of validity to use the content data outputted from the storage device;
sharing key data (symmetric key data) between the first and the second device in a valid case as a result of the authentication process;
using the symmetric key data, by a processing unit, to verify data to be transferred between the first and the second device;
confirming, by the processing unit, whether there is an entry relating to the content identifier recorded in the hidden area;
receiving, by the second device, a read command;
confirming, by the second device, whether the control information recorded in the accessible area is the first mode or the second mode;
aborting, by the second device, a process in a case where the read command is a normal command;
calculating, by the second device, a Hash value from the symmetric key data in a case where the read command is a specific command;
concatenating, by the second device, the Hash value with the control information, the content identifier, and the content data to be read;
outputting, by the second device, the Hash value with the control information, the content identifier, and the content data to be read;
receiving, by the first device, a write command;
confirming, by the first device, an entry including the content identifier in a case where verification of the Hash value included in received data is successful;
correlating, by the first device, the entry identification information with the content identifier; and
recording the entry identification information and the content identifier in a sector for recording the content data

* * * * *